United States Patent [19]
Takagi et al.

[11] Patent Number: 5,956,465
[45] Date of Patent: Sep. 21, 1999

[54] PRODUCTION FACILITY WITH AUTOMATIC MOVABLE BODY FOR MAN-MACHINE COOPERATION

[75] Inventors: Yoshiyuki Takagi; Teruo Takeshita; Masayasu Ota; Fumio Kishida; Takamasa Nakamura; Hitoshi Sekiguchi, all of Kanagawa-ken, Japan

[73] Assignee: Nissan Motor Co., Ltd., Kanagawa-ken, Japan

[21] Appl. No.: 08/826,590

[22] Filed: Apr. 3, 1997

[30] Foreign Application Priority Data

| Apr. 4, 1996 | [JP] | Japan | 8-082671 |
| Jul. 11, 1996 | [JP] | Japan | 8-182468 |
| Aug. 29, 1996 | [JP] | Japan | 8-228651 |
| Sep. 4, 1996 | [JP] | Japan | 8-233744 |
| Nov. 8, 1996 | [JP] | Japan | 8-296678 |

[51] Int. Cl.⁶ .................................................. G06F 19/00
[52] U.S. Cl. ........................... 395/90; 364/474.2; 395/99; 395/83
[58] Field of Search ................... 395/99, 90, 82, 395/83, 84, 91; 318/568.13, 568.14; 901/3–5, 7; 364/474.2, 167.02, 167.07, 167.11, 190, 191, 192, 193, 188, 189

[56] References Cited

U.S. PATENT DOCUMENTS

| 4,338,672 | 7/1982 | Perzley et al. | 901/7 X |
| 4,998,050 | 3/1991 | Nishiyama et al. | 364/191 X |
| 5,021,969 | 6/1991 | Okamura et al. | 395/99 |
| 5,046,022 | 9/1991 | Conway et al. | 395/99 X |
| 5,105,367 | 4/1992 | Tsuchihashi et al. | 395/99 |

*Primary Examiner*—Joseph Ruggiero
*Attorney, Agent, or Firm*—McDermott, Will & Emery

[57] ABSTRACT

For a combination of a first movable body adaptive for an automatic motion to provide an equivalent service to a required service, and a second movable body capable of exercising a voluntary motion and to cooperate with the first movable body to provide the voluntary motion as one of assistance and teaching to the first movable body to sophisticate the automatic motion, there are provided a first controller operative in a first mode for controlling the first moving body to exercise the automatic motion and in a second mode for adapting the first movable body to cooperate with the second movable body so that the automatic motion is sophisticated to be capable of achieving an equivalent service to the required service in a sophisticated manner, and a second controller for selecting one of the first and second modes.

64 Claims, 40 Drawing Sheets

INSTALLATION SITE
P0

| WHOLE WORK | WORKER A (SUB-ASSEMBLY) | WORKER B (WORK IN VEHICLE) | ASSIST ARM | |
|---|---|---|---|---|
| | | | AUTO MODE | MANUAL MODE |
| SUB-ASSEMBLY | ASSEMBLING WORK TO BE INSTALLED IN VEHICLE,ON STAND THEREFOR | STAYING IN VEHICLE FOR OTHER WORK | PREPARATION IN (SERVO ON) WAITING AT ORIGINAL POSITION | |
| STARTING | TURNS ON START BUTTON FOR ENTERING AUTOMATIC OPERATION | | MOVES FROM ORIGINAL POSITION TO WORK ASSEMBLY STAND. (DETECTS WORKER'S ACCESS BY SENSOR DURING OPERATION) | |
| HOLDING WORK AT ASSEMBLY STAND | | | HOLDS WORK AT ASSEMBLY STAND(DETECTS WORKER'S ACCESS BY SENSOR DURING OPERATION) | |
| TRANSFERRING WORK INTO VEHICLE | | | TRANSFERS WORK FROM ASSEMBLY STAND INTO VEHICLE, AVOIDING INTERFERENCES | |
| CHANGING OVER TO MANUAL MODE | | | AUTOMATICALLY CHANGES AT MANUAL MODE CHANGEOVER TEACHING POINT, FROM POSITIONING MODE (AUTO) TO ASSIST MODE (MANUAL) | |
| POSITIONING WORK TO VEHICLE | | DETERMINE POSITION TO VEHICLE, HOLDING HAND | | BALANCER |
| FIXING WORK | | FIX WORK TO VEHICLE | | |
| COMPLETING INSTALLATION | | PUSH START BUTTON | RETURNS TO AUTO MODE | |
| RESETTING | | | RETURNS TO ORIGINAL POSITION | |

…

PRODUCTION FACILITY WITH AUTOMATIC MOVABLE BODY FOR MAN-MACHINE COOPERATION

BACKGROUND OF THE INVENTION

1. Field of the Invention

The present invention generally relates to a production facility adaptive for a man-machine cooperation, and particularly, it relates to a production facility with an automatic movable body for a man-machine cooperation.

Moreover, the invention relates to a transfer assist arm device with a restricted motion range.

Further, the invention relates to a power-aided transfer assist arm device.

Still more, the invention relates to a transfer assist arm device with a work positioning function.

Yet more, the invention relates to a positioning assist arm device mounted on a follower.

The invention further relates to a positioning assist arm device with a relaxed clearance.

2. Description of Relevant Art

FIG. 1 illustrates a conventional automatic production facility built as a factory F0 in a local installation site P0. The factory F0 has a parabolic antenna f0 standing on the rooftop.

As shown in FIG. 2, the factory F0 has a management section F01 communicating with an unshown main office via the antenna f0, a labor section F02 such as for research, development, design and engineering, a man-machine section F03 such as for operation and maintenance, and an automatic machine section F04 controlled from the man-machine section F03, such as for material control, work transfer and article production.

The automatic machine section F04 includes a movable robot R0 with an interference region R01 enclosed by a safety fence C01. The interference region R01 has an entrance door whose open-close action is responsive to a command from a robot controller C02 provided with operation switches C03 in the man-machine section F03.

The fence C01, controller C02 and switches C03 constitute a safety control system C0 for protecting the robot R0 from undesirable interferences. For entry into the interference region R01, some switches C03 must be operated to interrupt a robot action and open the fence entrance door, which door must be closed to restart the robot action.

The robot R0 is sophisticated, exercising a complete sequence of full automatic handling actions such as for work transfer and positioning with a tight tolerance of e.g. ±0.05 mm, as well as for a fabrication that sometimes needs a higher accuracy.

The cost of installing and maintaining such production facility F0 is very high.

To reduce the cost, the complete sequence of full automatic actions had a portion thereof substituted by competent worker actions.

However, such substitution constituted an obstacle to a harmonized progress of work, resulting in reduced production efficiency.

Still worse, the worker actions included troublesome door open-close operations, causing more reduced production efficiency.

SUMMARY OF THE INVENTION

It appeared to the inventors that the substitutable subsequence of automatic actions might constitute a service concurrently sharable between a less sophisticated robot and a competent worker.

If such sharing were effected, a resultant automatic service may have a relaxed tolerance which a robot can do in an inexpensive manner, where it may be assisted by a worker or vice versa.

In this connection, such robot may be replaced by one of a plurality of assistant devices such as a transfer assist arm device with a restricted motion range, a power-aided transfer assist arm device, a transfer assist arm device with a work positioning function, a positioning assist arm device mounted on a follower, a positioning assist arm device with a relaxed clearance for which less sophistication is needed.

The present invention has been achieved with such points in mind.

It therefore is a first object of the invention to provide a production facility with a controlled movable body to be cooperative with an uncontrolled movable body, permitting secured production efficiency with reduced cost.

It is a second object of the invention to provide a production facility with a movable body, such as an assist arm, sufficiently sophisticated to be adaptive for a required service.

It is a third object of the invention to provide a transfer assist arm device with a restricted motion range, permitting man-machine cooperation for sufficient sophistication.

It is a fourth object of the invention to provide a power-aided transfer assist arm device, permitting man-machine cooperation for sufficient sophistication.

It is a fifth object of the invention to provide a transfer assist arm device with a work positioning function, permitting man-machine cooperation for sufficient sophistication.

It is a sixth object of the invention to provide a positioning assist arm device mounted on a follower, permitting man-machine cooperation for sufficient sophistication.

It is a seventh object of the invention to provide a positioning assist arm device with a flexible clearance up to e.g. ±10 mm, permitting man-machine cooperation for sufficient sophistication.

To achieve the first object, a first aspect of the invention provides a production facility comprising: a man-machine section (F22) requiring one of a movement service, a handling service and a production service to be provided in one of a first manner and a second manner more sophisticated than the first manner, the man-machine section including a first movable body (R1) adaptive for an automatic motion to provide an equivalent service to the required service in the first manner, and a second movable body (M) competent to exercise a voluntary motion and to cooperate with the first movable body for providing the voluntary motion as one of an assistance and teaching to the first movable body to sophisticate the automatic motion; first control means (1,3,4) operative in a first mode thereof for controlling the first moving body to exercise the automatic motion and in a second mode thereof for adapting the first movable body to cooperate with the second movable body so that the automatic motion is sophisticated to be capable of achieving an equivalent service to the required service in the second manner; and second control means (2) for controlling the first control means to select one of the first and second modes.

According to the first aspect, a first movable body is adapted in a second mode of a first control means, for a cooperation with a second movable body, where it (or its program) makes use of a voluntary motion of the second moving body as an assistance (e.g. action) thereof or teaching (i.e. taught information) therefrom to thereby learn how to perform, so that its automatic motion is sufficiently sophisticated (i.e. refined and/or intricate) to achieve a service equivalent to a required service in a sophisticated manner. Then, the first movable body is controlled in a first mode of the first control means to exercise the sophisticated automatic motion. A second control means permits such learning and exercise steps to be repeated in a growing and modifiable adaptive manner.

Moreover, to achieve the first object, a second aspect of the invention provides a production facility comprising: a man-machine section (F22) requiring one of a movement service, a handling service and a production service to be provided in one of a first manner and a second manner more sophisticated than the first manner, the man-machine section including a first movable body (R1) adaptive for an automatic motion to provide an equivalent service to the required service in the first manner, and a second movable body (M) competent to exercise a voluntary motion combinable with the automatic motion to provide an equivalent service to the required service in the second manner; first control means (1,3,4) operative in a first mode thereof for controlling the first moving body to exercise the automatic motion and in a second mode thereof for adapting the first movable body to cooperate with the second movable body so that the automatic motion is combined with the voluntary motion; and second control means (2) for controlling the first control means to select one of the first and second modes.

According to the second aspect, a first movable body is adapted in a second mode of a first control means, for cooperation with a second movable body, where its automatic motion is combined with a voluntary motion of the second moving body to provide an equivalent service to a required service in a sophisticated manner. In a first mode of the first control means, the first moving body is always controlled to simply exercise the automatic motion. A second control means permits one of such ordinary and sophisticated services to be selected.

Moreover, to achieve the first object, a third aspect of the invention provides a production facility comprising: a man-machine section (F22) requiring one of a movement service, a handling service and a production service to be provided in one of a first manner and a second manner more sophisticated than the first manner, the man-machine section including a first movable body (R1) adaptive to exercise an automatic motion, and a second movable body (M) competent to exercise a voluntary motion for an equivalent service to the required service in the first manner and to cooperate with the first movable body for employing the automatic motion as one of an assistance and teaching to sophisticate the voluntary motion; first control means (1,3,4) operative in a first mode thereof for controlling the first moving body to exercise the automatic motion and in a second mode thereof for adapting the first movable body to cooperate with the second movable body so that the voluntary motion is sophisticated to be capable of achieving an equivalent service to the required service in the second manner; and second control means (2) for controlling the first control means to select one of the first and second modes.

According to the third aspect, a first movable body is adapted in a second mode of a first control means, for a cooperation with a second movable body, where its automatic motion is employed as an assistance (e.g. power) or teaching (e.g. sign) to make a voluntary motion of the second moving body sophisticated enough to provide an equivalent service to a required service in a sophisticated manner. In a first mode of the first control means, the first moving body is controlled to simply exercise the automatic motion that may provide an unconcerned service. A second control means permits one of ordinary and sophisticated services to be selected.

According to a fourth aspect of the invention, as it depends from any of the first to the third aspect: the first movable body (R1=50+60($i$)) has a first motion range (R51) defined for the automatic motion, including a first clearance ($\alpha$) thereof and a first allowance ($\beta$) therefor; the second movable body (M=70($j$)+80($k$)) has a second motion range (R71($k$)) defined for the voluntary motion, including a second allowance ($\gamma$) therefor; and the first control means (1, 3, 4) includes safety control means (1$b$, 3) for recognizing an interference region (R53) in which the first and second motion ranges interfere with each other, detecting an intersection between the interference region and the second motion range, and responding to the detected intersection to provide a detection signal.

According to the fourth aspect, a first motion range is permitted to cover an inherent motion and a relaxed clearance of a first movable body, with a first allowance to permit e.g. a delayed response to be safe, and a second motion range is permitted to cover an inherent motion of a second movable body, with a second allowance to permit e.g. a delayed escape to be safe.

According to a fifth aspect of the invention, as it depends from the fourth aspect, the first control means (1,3,4) is responsible in the first mode to process the detection signal for stopping the first movable body.

According to the fifth aspect, a first movable body is allowed to freely move irrespective of a second movable body in a cooperative second mode, and to carefully move in an automatic first mode in which the second movable body may invade an interference region that is not enclosed by a fence.

According to a sixth aspect of the invention, as it depends from the fourth aspect, the interference region (R53) is kept constant, as the first movable body (R1) has a stationary part (51) fixed in position.

According to a seventh aspect of the invention, as it depends from the fourth aspect, the interference region (R53) is variable, as the first movable body (R1) travels.

According to an eighth aspect of the invention, as it depends from the fourth aspect, the safety control means (1$b$, 3) includes sensor means (3) for sensing a position (V($i,j,k$)) of the second movable body.

According to a ninth aspect of the invention, as it depends from the eighth aspect, the sensor means (3) comprises a transmitter (30) and a receiver (31).

According to a tenth aspect of the invention, as it depends from the ninth aspect, the transmitter (30) is carried by the second movable body (M).

According to an eleven aspect of the invention, as it depends from the eighth aspect, the sensor means (3) comprises a two-dimensional array of sensing elements.

According to a twelfth aspect of the invention, as it depends from the eleventh aspect, the two-dimensional array of sensing elements covers the interference region (R53).

According to a thirteenth aspect of the invention, as it depends from the eleventh aspect, the sensing elements each comprise a sensible matt.

According to a fourteenth aspect of the invention, as it depends from the eleventh aspect, the sensing elements each comprise a photo-electric sensor.

According to a fifteenth aspect of the invention, as it depends from the eleventh aspect, the sensor means (3) comprises an array of a plurality of unit sensors each comprised of the two-dimensional array of sensing elements.

According to a sixteenth aspect of the invention, as it depends from the eighth aspect, the position (V($i,j,k$)) of the second movable body (M) is defined in a coordinate system associated with the interference region (R53).

According to a seventeenth aspect of the invention, as it depends from the fourth aspect: the first movable body (50) comprises a first member (52) rotatable about a first center fixed to a representative part (51) of the first movable body, with a far-most end (52$a$) thereof describing a first arc (R50$a$–$\alpha$1–$\beta$1); and the first motion range (R50) comprises a first sum of a first inherent range defined by the first arc, a first fraction ($\alpha$1) of clearance and a first fraction ($\beta$1) of allowance.

According to the seventeenth aspect, a first fraction of clearance is identical to a first clearance, and a first fraction of allowance is identical to a first allowance.

According to an eighteenth aspect of the invention, as it depends from the seventeenth aspect: the first movable body (R1) further comprises a second member (60($i$)) rotatable about a second center (52$b$) fixed to the first member (52) inside the first arc (R50$a$–$\alpha$1–$\beta$1), with a far-most end (62($i$)) thereof describing a second arc (R60$a$($i$)$\alpha$2–$\beta$2); and the first motion range (R51) comprises a total of the first sum (R50) and a second sum (R60($i$)) of a second inherent range defined by the second arc, a second fraction ($\alpha$2) of clearance and a second fraction ($\beta$2) of allowance.

According to the eighteenth aspect, a first clearance is equivalent to a sum of a first and a second fraction of clearance, and a first allowance is equivalent to a sum of a first and a second fraction of allowance.

According to a nineteenth aspect of the invention, as it depends from the eighteenth aspect: the second member (60($i$)) comprises a third member rotatable about the second center (52$b$), and a work the third member is handing, the work having a free end thereof as the far-most end (62($i$)) of the second member.

According to a 20th aspect of the invention, as it depends from the eighteenth aspect: the second movable body (70($j$)) comprises a flexible body (70($j$)) with a possibility of fall about a third center as a foot part thereof, with an arm part part thereof stretched to have a finger end lying on a first circle (R70$a$($j$)–$\gamma$1); and the second motion range (R70($j$)) comprises a third sum of a first probable range defined by the first circle and a first probable fraction ($\gamma$1) of allowance.

According to the 20th aspect, a first probable fraction of allowance is identical to a second allowance.

According to a 21st aspect of the invention, as it depends from the 20th aspect: the second movable body (M) further comprises a tool member (80($k$)) with a possibility of rotational drop about a fourth center as a hand part of the flexible body (70($j$)) within a second circle (R80$a$($k$)$\gamma$2); and the second motion range (R71($k$))) comprises a total of the third sum(R70($j$)) and a fourth sum of a second probable range defined by the second circle and a second probable fraction ($\gamma$2) of allowance.

According to the 21st aspect, a second allowance is equivalent to a sum of a first and a second probable fraction of allowance.

Further, to achieve the second object, according to a 22nd aspect of the invention depending from the 21st aspect, the first control means (1,3,4) includes memory means (1, 4) for storing first data on a radius of curvature of the first arc (R50$a$–$\alpha$1–$\beta$1) of the first member (52), a second data on a distance (L50) between the first center (51) and the second center (52$b$), third data on a radius of curvature of the second arc (R60$a$($i$)–$\alpha$2–$\beta$2) of a respective kind ($i$) of the second member (60($i$)), fourth data on a radius of the first circle (R70$a$($j$)–$\gamma$1) of a respective kind ($j$) of the flexible body (70($j$)), fifth data on a radius of the second circle (R80$a$($k$)–$\gamma$2) of a respective kind ($k$) of the tool member (80($k$)), sixth data on the first fraction ($\alpha$1) of clearance of the first member, seventh data on the second fraction ($\alpha$2) of clearance of the respective kind ($i$) of the second member, eighth data on the first fraction ($\beta$1) of allowance of the first member, ninth data on the second fraction ($\beta$2) of allowance of the respective kind ($i$) of the second member, tenth data on the first probable fraction ($\gamma$1) of allowance of the respective kind ($j$) of the flexible body, and eleventh data on the second probable fraction ($\gamma$2) of allowance of the respective kind ($k$) of the tool members.

According to a 23rd aspect of the invention, as it depends from the 22nd aspect, the first control means (1,3,4) includes processor means (1, 4) responsible to a current position of the first center for processing the first, the sixth and the eighth data to calculate a radius (V0) of curvature of a boundary (R50$a$) of the first motion range (R50).

According to a 24th aspect of the invention, as it depends from the 23rd aspect, the processor means (1, 4) is responsible to an identified kind ($i$) of the second member (60($i$)) for additionally processing the second, the third, the seventh and the ninth data to calculate a radius (V($i$)) of curvature of a boundary (R51$a$) of the first motion range (R51).

According to a 25th aspect of the invention, as it depends from the 24th aspect, the processor means (1, 4) is responsible to an identified kind ($j$) of the flexible body (70($j$)) for additionally processing the fourth and the tenth data to calculate a radius (Y($j$)) of curvature of a boundary (R70$a$($j$)) of the second motion range (R70($j$)), and a radius (V($i, j$)) of curvature of a boundary (R52$a$) of the interference region (R52).

According to a 26th aspect of the invention, as it depends from the 25th aspect, the processor means (1, 4) is responsible to an identified kind ($j$) of the flexible body (70($j$)) for additionally processing the fourth and the tenth data to calculate a radius (Y($j$)) of curvature of a boundary (R70$a$($j$)) of the second motion range (R70($j$)), and a radius (V($i, j$)) of curvature of a boundary (R52$a$) of the interference region (R52).

According to a 27th aspect of the invention, as it depends from the 26th aspect, the processor means (1, 4) is responsible to an identified kind ($k$) of the tool member (80($k$)) for additionally processing the fifth and the eleventh data to calculate a radius (W($j,k$)) of curvature of a boundary (R71$a$($k$)) of the second motion range (R71($j$)), and a radius (V($i,j,k$)) of curvature of a boundary (R53$a$) of the interference region (R53).

Moreover, to achieve the second object, according to a 28th aspect of the invention depending from the second or the third aspect, the first control means (1,3,4) is adapted to learn a combination of the automatic motion and the voluntary motion so that the automatic motion provides a sophisticated service.

Moreover, to achieve the second object, according to a 29th aspect of the invention depending from the second or the third aspect, the first control means (1,3,4) is adapted to learn a difference between the automatic motion and the voluntary motion so that the automatic motion provides a sophisticated service.

According to a 30th aspect of the invention, as it depends from any of the first to the third aspect: the required service includes handling a work for one of a transfer assistance and a positioning assistance; and the first moving body comprises one of a first assist arm device (FIG. 8) adapted for the transfer assistance with a restricted motion range, a second assist arm device (FIG. 16) power-aided for the transfer assistance, a third assist arm device (FIG. 19) adapted for the positioning assistance, a fourth assist arm device (FIG. 27) adapted for the positioning assistance on a follower, and a fifth assist arm device (FIG. 36) adapted for the positioning assistance with a flexible clearance.

Further, to achieve the third object, according to a 31st aspect of the invention depending from the 30th aspect: the required service includes transferring the work along a route (R11a, R11b, R11c); the transfer assistance includes restricting loci of the work in a range (R11a+R11b+R11c) of the route; the first assist arm device comprises a plurality of arms (120, 130, 140, 150) having rotation ranges thereof; and the first control means (170, 180, 190; 120e, 130e, 140e, 150e; 126e, 128e, 136e, 138e, 146e, 148e, 156e, 158e; 100, 126, 128, 136, 138, 146, 148, 156, 158) is adapted to detect a transfer position of the work and control the rotation ranges depending on the transfer position.

According to the 31st aspect, a plurality of arms have their rotation ranges restricted in accordance with a transfer position of a work, which can thus be transferred within an envelope of combinations of the restricted rotation ranges. Therefore, a worker is permitted to transfer a work along a predetermined route, without paying careful attentions to obstacles lying outside the route, resulting in a decreased mental load and an increased working efficiency, as well as a reduced frequency of undesirable interferences.

Further, to achieve the third object, according to a 32nd aspect of the invention depending from the 30th aspect: the required service includes transferring the work long a route (R11a, R11b, R11c); the transfer assistance includes restricting loci of the work in a range (R11a+R11b+R11c) of the route; the first assist arm device comprises a plurality of arms (120, 130, 140, 150), first detecting means (120e, 130e, 140e, 150e) for detecting rotational positions of the plurality of arms, a restriction member (122, 124; 132, 134; 142, 144; 152, 154) for a mechanical restriction of one of the plurality of arms, second detection means (126e, 128e; 136e, 138e; 146e, 148e; 156e, 158e) for detecting a set position of the restriction member, and drive means (160, 162, 126, 128; 136, 138; 146, 148; 156, 158) for driving the restriction member; the first control means (170, 180, 190) includes calculation means (198) for calculating a transfer position of the work based on the rotational positions of the plurality of arms and memory means (194) for storing data on a relationship between the transfer position of the work and the set position of the restriction member; and the first control means (170, 180, 190) is responsible for the transfer position of the work to read the stored data from the memory means and control the drive means for setting the restriction member in a position in accordance with the read data.

According to the 32nd aspect, a current transfer position of a work is calculated in dependence on a combination of rotational positions of arms. At least one restriction member has its set position calculated on a basis of data stored in memory means, as they depend on the transfer position of the work. As a result, an associated arm has its rotational position restricted in accordance with the transfer position, so that the work may go along a transfer path, where it can be kept from hitting obstacles. Accordingly, a worker is permitted to transfer the work along a predetermined route, without paying careful attentions to obstacles lying outside the route, resulting in an increased working efficiency.

According to a 33rd aspect of the invention, as it depends from the 32nd aspect: the worker is competent to teach an ideal position of the work in the route; the first control means (170, 180, 190) has a teaching button (172) operative for the worker to teach the ideal position to the first control means and for the first control means to calculate therefrom a permissible motion range of the work about the ideal position; and the first control means is responsible for an operation of the teaching button to store data on the ideal position and the permissible motion range in the memory means (194).

According to the 33rd aspect, a teaching worker actually handles a work by hands, as the work is supported by a combination of arms set free from restrictions, with a teaching button operated. Data on a current transfer position of the work can thus be learned as a combination of associated rotational positions of the arms, which data are stored in memory means and further processed together with some initial data to calculate a permissible motion range of the work, whose data also are stored in the memory means. A possible manual teaching of a work position and a permissible motion range allows a facilitated setting and a facilitated change respectively of a work transfer route and a degree of restriction, such as when a layout is modified.

According to a 34th aspect of the invention, as it depends from the 33rd aspect: the first control means (170, 180, 190) has a mode select switch (182) for selecting one of a teaching mode and a running mode; and the first control means (170, 180, 190) is responsible for the teaching mode, as the teaching button (172) is operated, to store the data on the ideal position and the permissible motion range in the memory means (194) and for the running mode to respond to the transfer position to read the stored data from the memory means and control the drive means for setting the restriction member in a position in accordance with the read data.

According to the 34th aspect, stored data in memory means are updated in a teaching mode by new data on an ideal transfer route of a work, and the new data are processed for a restriction of a motion range of the work in a running mode. A mode select switch permits an easy, exact and simple selection.

Further, to achieve the fourth object, according to a 35th aspect of the invention depending from the 30th aspect: the second assist arm device comprises an arm member (210, 216, 215) for the transfer assistance of the work, weight balancing means (212) for balancing a weight (G) of the work with a gravity, sensor means (218) for detecting a force (F) exerted on the work by the second movable body, and drive means (213, 217, 220) for driving the arm; and the first control means (225, encoder-1 to -3) is adapted to be responsible for a magnitude and a direction of the detected force to control the drive means for aiding the exerted force.

According to the 35th aspect, when applying a force to a work, a worker is aided by an assist force in accordance with the applied force, so that directional inertial forces are cancelled, permitting a facilitated transfer of a weighty work.

Moreover, to achieve the fourth object, according to a 36th aspect of the invention depending from the 30th aspect: the second assist arm device comprises a plurality of arm members (210, 216, 215) for the transfer assistance of the work, weight balancing means (212) acting on one (210) of the plurality of arm members for balancing a weight (G) of the work with a gravity, sensor means (218) for detecting three-dimensional components of a moment (N) exerted on the work by the second movable body, and drive means (213, 217, 220) for individually driving the plurality of arms; and the first control means (225, encoder-1 to -3) is adapted to be responsible for magnitudes and directions of the detected components of the moment to control the drive means for aiding the exerted moment.

According to the 36th aspect, when applying a moment to a work, a worker is aided by an assist moment in accordance with the applied moment, so that tangential inertial forces are cancelled, permitting a facilitated transfer of a weighty work.

Moreover, to achieve the fourth object, according to a 37th aspect of the invention depending from the 30th aspect: the second assist arm device comprises a plurality of arm members (210, 216, 215) for the transfer assistance of the work, weight balancing means (212) acting on one (210) of the plurality of arm members for balancing a weight (G) of the work with a gravity, sensor means (218) for detecting three-dimensional components of a force (F) and a moment (N) exerted on the work by the second movable body, and drive means (213, 217, 220) for individually driving the plurality of arms; and the first control means (225, encoder-1 to -3) is adapted to be responsible for magnitudes and directions of the detected components of the force and the moment to control the drive means for aiding the exerted force and moment.

According to a 38th aspect of the invention, as it depends from the 35th aspect: the sensor means comprise a load cell member (218) attached to the arm member (215).

According to a 39th aspect of the invention, as it depends from the 35th aspect: the first control means (225) includes means for regulating a degree of said aiding the exerted force.

Further, to achieve the fifth object, according to a 40th aspect of the invention depending from the 30th aspect: the third assist arm device comprises an arm member (310, 316, 315) for transferring the work to a position, weight balancing means (312) for balancing a weight of the work with a gravity, and drive means (313, 317, 318, 320) for driving the arm member; and the firs control means (325, 319) has a positioning mode for connecting the arm member with the drive means to transfer the work and an assist mode for disconnecting the arm member from the drive means so that a worker can transfer the work.

According to the 40th aspect, a worker is permitted to selectively employ respective merits of an assist mode and a positioning mode.

Moreover, to achieve the fifth object, according to a 41st aspect of the invention depending from the 30th aspect: the third assist arm device comprises an arm member (310, 316, 315) for transferring the work to a position, weight balancing means (312) for balancing a weight of the work with a gravity, drive means (313, 317, 318, 320) for driving the arm member, and clutch means (322) for interconnecting the arm member and the drive means; the first control means (325, 319) includes memory means (357,358) for storing a transfer path, as it is taught, and switch means (351) for selecting a positioning mode; and the first control means (325, 319) is adaptive to be set, as the switch means is turned on, to the positioning mode for letting the clutch means in and for controlling the drive means to transfer the work along the transfer path stored in the memory means and, as the work has arrived the position, to an assist mode for letting the clutch means off.

According to the 41st aspect, as a switch is turned on, an assist arm device is put in a positioning mode, where it serves like a transfer robot and, when a transfer point is reached, it enters an inherent assist mode.

Moreover, to achieve the fifth object, according to a 42nd aspect of the invention depending from the 30th aspect: the third assist arm device comprises an arm member (310, 316, 315) for transferring the work to a position, eight balancing means (312) for balancing a weight of the work with a gravity, drive means (313, 317, 318, 320) including a servo motor for driving the arm member, and clutch means (322) for interconnecting the arm member and the drive means; the first control means (325, 319) includes memory means (357,358) for storing a transfer path, as it is taught, and switch means (351) for selecting a positioning mode; and the firs control means (325, 319) is adaptive to be set, as the switch means is turned on, to the positioning mode for letting the clutch means in and for controlling the servo motor to transfer the work along the transfer path stored in the memory means and, as the work has arrived the position, to an assist mode for letting the clutch means off and releasing the servo motor from a servo control.

According to the 42nd aspect, an assist arm device serves in a similar manner to the 41st aspect.

Moreover, to achieve the fifth object, according to a 43rd aspect of the invention depending from the 30th aspect: the third assist arm device comprises an arm member (310, 316, 315) for transferring the work to a position, weight balancing means (312) for balancing a weight of the work with a gravity, drive means (313, 317, 318, 320) for driving the arm member, and clutch means (322) for interconnecting the arm member and the drive means; the first control means (325, 319) includes memory means (357,358) for storing a transfer path, as it is taught, and switch means (351) for selecting a positioning mode; and the first control means (325, 319) is adaptive to be set, as the switch means is turned on, to the positioning mode for letting the clutch means in and for controlling the drive means to transfer the work along the transfer path stored in the memory means and, as the work has arrived the position, to an assist mode for letting the clutch means off, and further adaptive, as the switch means is turned on after the work has arrived the position, for letting the clutch means in and for pushing the work against an opponent member in a fixing thereof with a force in accordance with a current data stored in the memory means and, as the fixing is over, for letting the clutch means off.

According to the 43rd aspect, as a switch is turned on again, an assist arm device is cooperative with a worker in a complementing manner, such as when screwing.

Moreover, to achieve the fifth object, according to a 44th aspect of the invention depending from the 30th aspect: the third assist arm device comprises an arm member (310, 316, 315) for transferring the work to a position, weight balancing means (312) for balancing a weight of the work with a gravity, drive means (313, 317, 318, 320) including a servo motor for driving the arm member, auxiliary power means (327) for generating a force to pushing the work against an opponent member in a fixing thereof, and clutch means (322) for interconnecting the arm member and the drive means; the first control means (325, 319) includes memory means (357,358) for storing a transfer path, as it is taught, and switch means (351) for selecting a positioning mode; and the first control means (325, 319) is adaptive to be set, as the switch means is turned on, to the positioning mode for letting the clutch means in and for controlling the servo motor to transfer the work along the transfer path stored in the memory means and, as the work has arrived the position, to an assist mode for letting the clutch means off and releasing the servo motor from a servo control, and further adaptive, as the switch means is turned on after the work has arrived the position, for operating the auxiliary power means to push the work against the opponent member with a force and, as the fixing is over, for stopping the auxiliary power means.

According to the 44th, in an assist arm device similar to that of the 43rd aspect, a servo motor is permitted to have a limited power.

According to a 45th aspect of the invention, as it depends from the 44th aspect: the auxiliary power means comprises one a servo motor and an air motor (327).

According to a 46th aspect of the invention, as it depends from the 44th aspect: the first control means (325, 319) is adaptive, as the switch means is turned on after the work has arrived the position, for letting the clutch means in, pushing the work against the opponent member with force in accordance with a current data stored in the memory means, and operating the auxiliary power means to push the work against the opponent member and, as the fixing is over, for letting the clutch means off and stopping the auxiliary power means.

According to a 47th aspect of the invention, as it depends from the 40th aspect: the first control means (325, 319) has a teaching mode for storing loci of the arm member (310, 316, 315, 314) as a transfer path.

According to a 48th aspect of the invention, as it depends from the 43th aspect: the first control means (325, 319) is adapted, as the arm member (310, 316, 315, 314) is manually operated, to store in the memory means loci of the arm member as the transfer path.

Further, to achieve the sixth object, according to a 49th aspect of the invention depending from the 30th aspect: the fourth assist arm device (A) is mounted on the follower (B); the fourth assist arm device comprises an arm member (410, 416, 415) for transferring the work (D) to a position, weight balancing means (412) for balancing a weight of the work with a gravity, and drive means (413, 417, 418, 420) for driving the arm member; the first control means (425, 419) has a positioning mode for connecting the arm member with the drive means to transfer the work and an assist mode for disconnecting the arm member from the drive means so that a worker can transfer the work; and the first control means is connected to the drive means.

According to the 49th aspect, a worker moving with a follower is permitted to selectively employ respective merits of an assist mode and a positioning mode.

Moreover, to achieve the sixth object, according to a 50th aspect of the invention depending from the 30th aspect: the fourth assist arm device (A) is mounted on the follower (B); the fourth assist arm device comprises an arm member (410, 416, 415) for transferring the work (D) to a position, weight balancing means (412) for balancing a weight of the work with a gravity, drive means (413, 417, 418, 420) for driving the arm member, and clutch means for interconnecting the arm member and the drive means; the first control means (425, 419) includes memory means (457,458) for storing a transfer path, as it is taught, and switch means (451) for selecting a positioning mode; and the firs control means is adaptive to be set, as the switch means is turned on, to the positioning mode for letting the clutch means in and for controlling the drive means to transfer the work along the transfer path stored in the memory means and, as the work has arrived the position, to an assist mode for letting the clutch means off.

According to the 50th aspect, as a switch is turned on, an assist arm device is put in a positioning mode, where it serves like a transfer robot and, when a transfer point is reached, it enters an inherent assist mode.

Moreover, to achieve the sixth object, according to a 51st aspect of the invention depending from the 30th aspect: the fourth assist arm device (A) is mounted on the follower (B); the fourth assist arm device comprises an arm member (410, 416, 415) for transferring the work to a position, weight balancing means (412) for balancing a weight of the work with a gravity, drive means (413, 417, 418, 420) for driving the arm member, and clutch means for interconnecting the arm member and the drive means; the first control means (425, 419) includes memory means (457,458) for storing a transfer path, as it is taught, switch means (451) for selecting a positioning mode, and sensor means (430) for detecting a proximity of an obstacle; and the firs control means is adaptive to be set, as the switch means is turned on, to the positioning mode for letting the clutch means in and for controlling the servo motor to transfer the work along the transfer path stored in the memory means and, as the work has arrived the position or the proximity of the obstacle is detected by the sensor means, to an assist mode for letting the clutch means off.

According to the 51st aspect, an assist arm device enters an inherent assist mode when a proximal obstacle is detected.

According to a 52nd aspect of the invention, as it depends from the 49th aspect: the switch means is provided on an operation panel (419) disposed at a hand (415) and on a control panel (440) connected to the first control means.

According to a 53rd aspect of the invention, as it depends from the 51st aspect: the fourth assist arm device (A) has an emergency switch (453); and the first control means (425, 419) is adapted to enter the assist mode when the emergency switch is operated.

Further, to achieve the seventh object, according to a 54th aspect of the invention depending from the 30th aspect: the required service is for fitting the work (702)to an installation place (706) having a first clearance to the work; the fifth assist arm device has an arm member (506) for positioning the work to the installation place, the arm member being movable with a second clearance larger than the first clearance; and the first control means (510) enters the second mode when the arm member carrying the work has reached a vicinity of the installation place.

According to the 54th aspect, a worker is permitted to cooperate with an arm member to complete a rest of a required service.

According to a 55th aspect of the invention, as it depends from the 54th aspect, the vicinity comprises the interference region.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 34 is a work category table describing principal services of the assist arm device of FIG. 27;

DETAILED DESCRIPTION OF THE PREFERRED EMBODIMENTS

Figure 1:
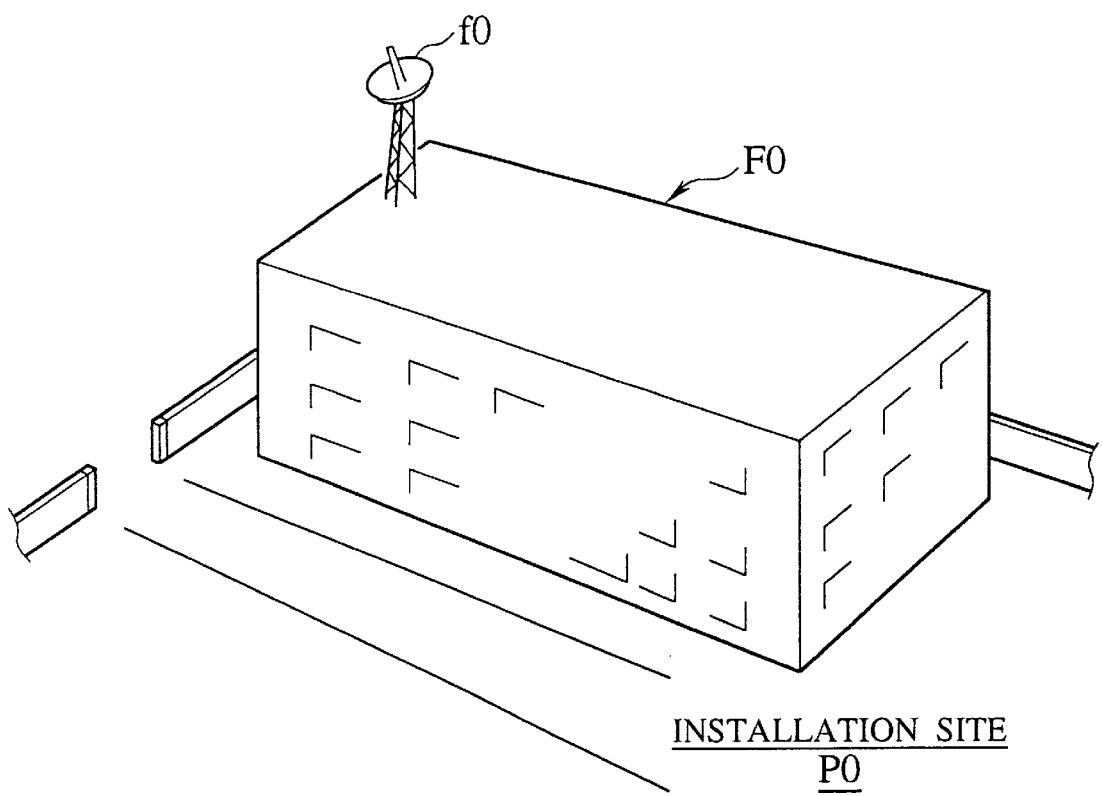
FIG. 1 illustrates a conventional production facility.
Figure 2:
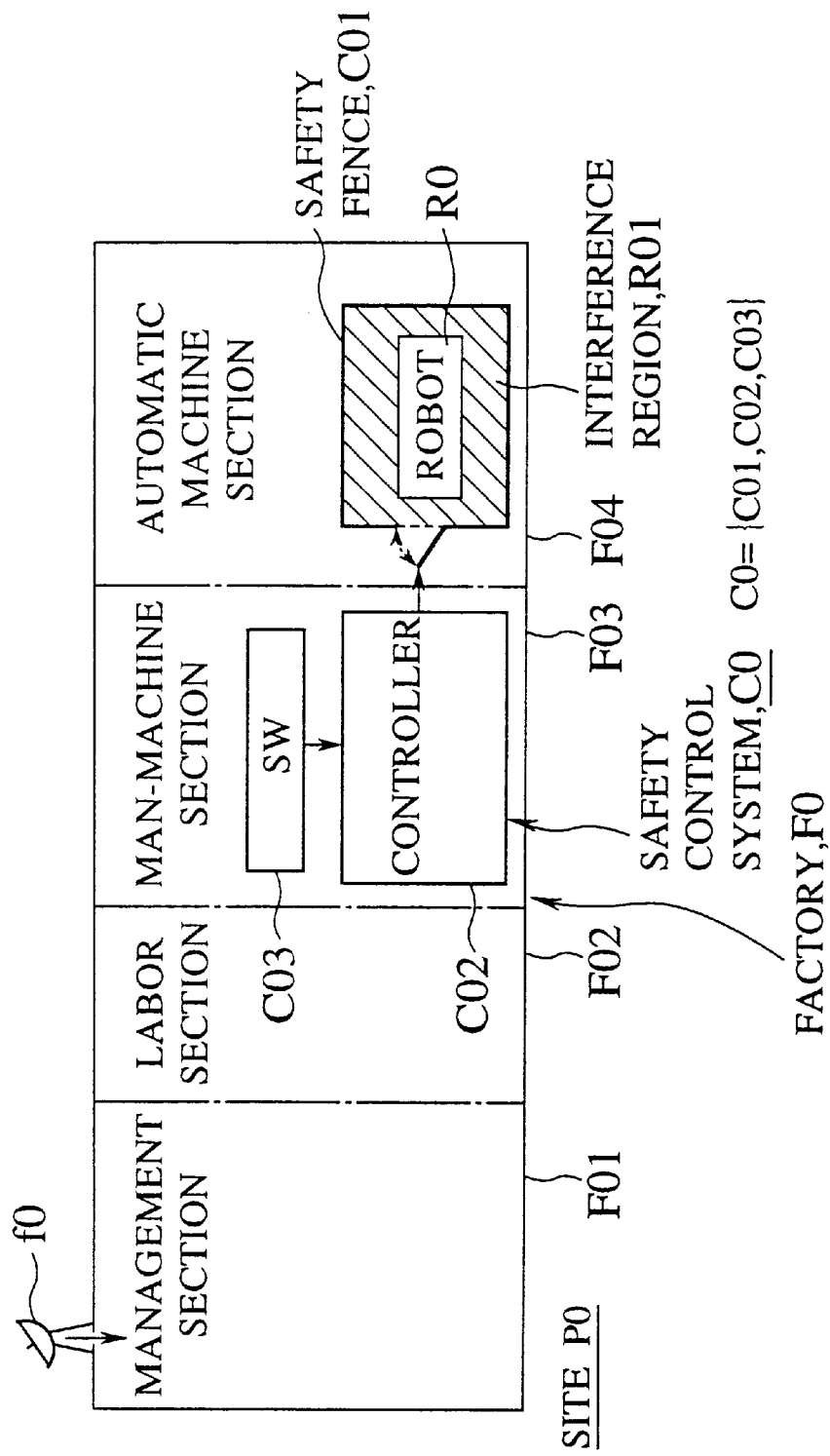
FIG. 2 is a functional block diagram of the facility of FIG. 1, including a conventional robot and a safety control system.

There will be detailed below the preferred embodiments of the present invention with reference to the accompanying drawings. Like members are designated by like reference characters.

Figure 3:
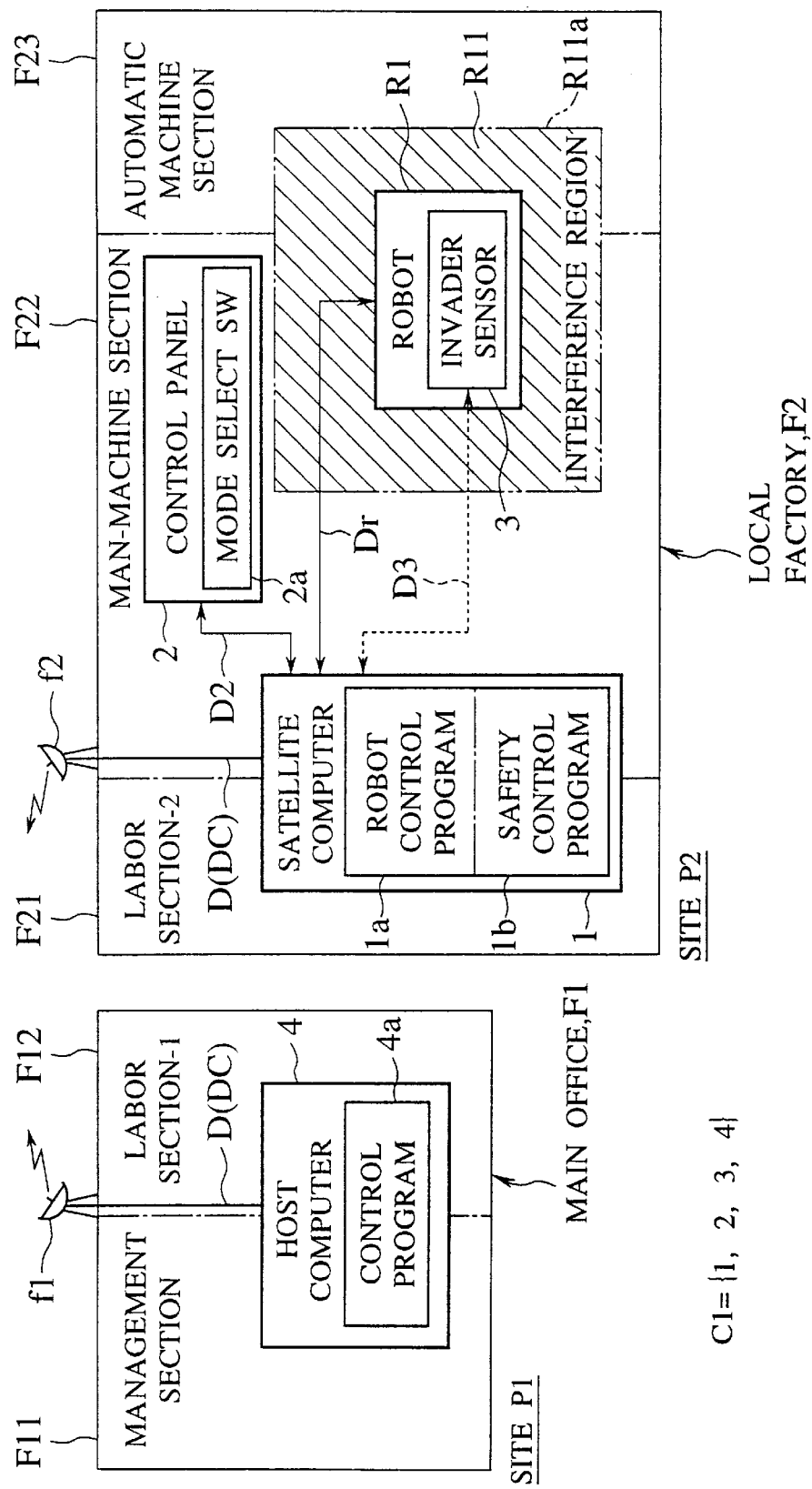
FIG. 3 is a functional block diagram of a production facility with an assistant robot and a control system therefor, including a safety control system, according to a first embodiment of the invention.

FIG. 3 is a functional block diagram of a production facility according to a first embodiment of the invention.

The production facility comprises a main office F1 of which a body has been built in a metropolitan site P1, and a new factory F2 built in an inexpensive local site P2.

The main office F1 includes a management section F1 and a labor section-1 F12, and has a microwave antenna f1 installed on a rooftop.

The factory F2 includes a labor section-2 F21, a man-machine section F22 and an automatic machine section F23, and has a microwave antenna f2 installed on a rooftop.

Between the labor section-2 F21 and the man-machine section F22 there is commonly employed a satelite computer 1, which has a robot control program 1a and a safety control program 1b stored in an unshown memory.

The man-machine section F22 has installed therein a control panel 2 provided with a touch panel type switch board including an operation mode select switch 2a.

An open floor continuously extends over a total area of the man-machine section F22 and the automatic machine section F23. These sections F22, F23 are partially separated from each other simply by light-weight partitions shown by one-dash chain lines. On the floor moving is a wired but radio-controllable robot R1 that has a later-described interference region R11 defined thereabout with an open boundary R11a and is provided with a radio invader sensor 3 for detecting an invader into the interference region R11 which has no enclosure.

I/O data Dr to and from the robot R1 are interfaced to the satelite computer 1, like those D2, D3 of the control panel 2 and the invader sensor 3. The satelite computer 1 communicates via the microwave antennas f1, f2 with a host computer 4 commonly employed in the main office F1. The host computer 4 has a control program 4a stored in an unshown memory. The control program 4a of the host computer 4 includes both robot control program 1a and safety control program 1b of the satelite computer 1. The host and satelite computers 4, 1 are adapted to commonly use and complementary process their data D including control data DC associated with a later-described safety control system C1 comprised of the satelite computer 1, control panel 2, invader sensor 3 and host computer 4.

Figure 4:
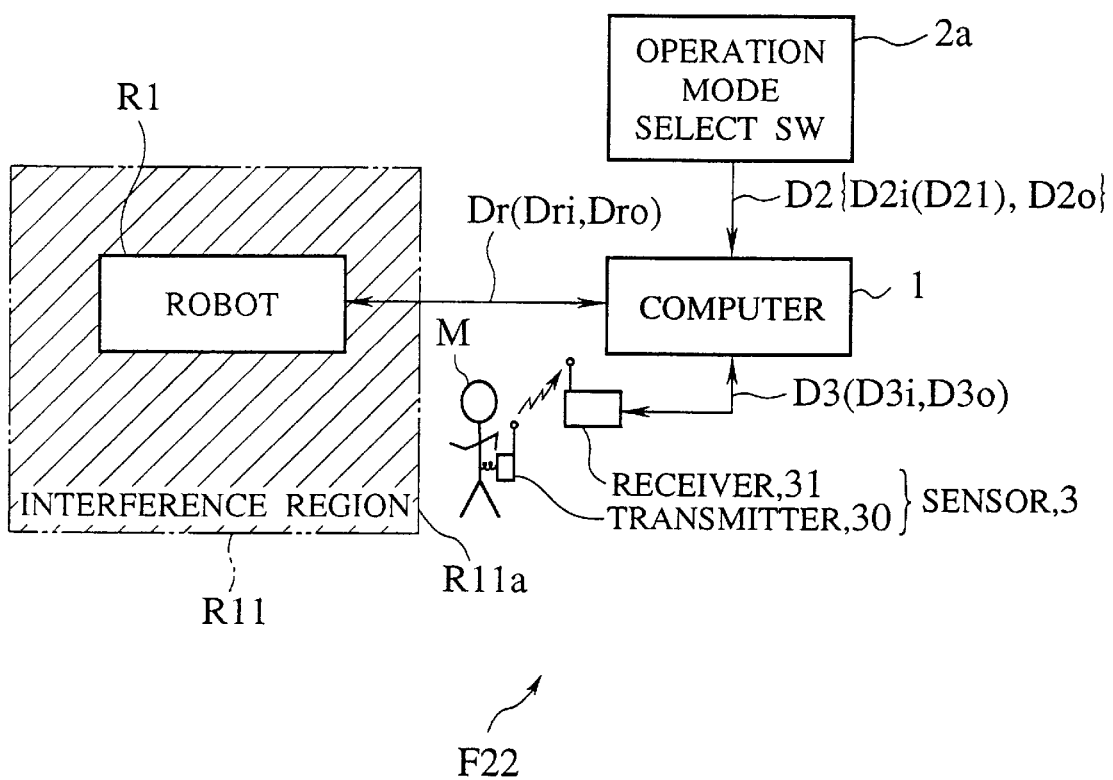
FIG. 4 is a functional block diagram of essential part of the safety control system of FIG. 3.

FIG. 4 is a functional block diagram of essential part of the safety control system C1.

The man-machine section F22 contains therein, among others, the computer 1, the operation mode select switch 2a, the invader sensor 3, the robot R1, and at least one worker M. The interference region around the robot R1 is invisible. In FIG. 4, the invader sensor 3 comprises a radio transmitter 30 carried by the worker M, and a radio receiver 31 placed on, near or off from the robot R1.

The man-machine section F22 requires three types of services: a movement service such as for an operation, driving, display, performance, instruction, etc.; a handling service such as for positioning, transferring, lifting, throwing, dipping, etc.; and a production service such as for processing, cutting, assemblying, fastening, welding, painting, etc.

The robot R1 is a representative of various assistant robots and assist devices in the factory F2, as they are all embodiments of the invention, and is adapted to provide the three types of services. As well-known, assistant robots are different from assist devices in power of employed drives. Some of those assist devices will be detailed, as second or later embodiments.

The robot R1 is adapted to travel on a solid or liquid body, stand, sit, lie, rotate, revolve, spin, twist, jump, fly, etc. It (R1) is at least adapted to move, at least two-dimensionally, and will sometimes be called herein "first moving body" or simply "moving body".

The man-machine section F22 includes another moving body, the worker M, who may be multiple and will sometimes be collectively called herein "second moving body" or simply "moving body". It will be seen that the second moving body M may be replaced by one or more competent robots or assist devices.

The afore-mentioned three types of services are required to be provided normally in a common, mediate or ordinary fashion, and sometimes in a sophisticated (i.e. more refined and/or intricate) or skilled fashion. An inherent difference therebetween resides in a guaranteeable clearance.

To this point, in a case, the first moving body R1 may be powerful but has an ordinary talent, and the second moving body M has little power but may be skilled. In plain words, the robot R1 may be power aided, and the worker M has a brain.

In another case, the first and second moving bodies R1, M have ordinary talents that are different and may be added in a complementing manner.

In still another case, the first moving body R1 may have been sophisticated to a level somewhat inferior relative to a required level, and even a non-skilled worker M may assist the moving body R1 to provide a required service.

In yet another case, the first moving body R1 may have been sufficiently sophisticated to provide a required service so that the second moving body M can be a mere observer.

Further, in some case, the first moving body R1 may have an over-sophisticated talent to be dedicated for a required service and may have an allowance for an extra assistance or instruction service, or an inexpensive robot may be provided for an assistance or instruction service, and the second moving body M may make use of such an assistance or instruction for exercising his or her own voluntary motion to provide the required service.

The present invention is advantageous in the first three cases in which a relatively wild first moving body R1 is permitted to cooperate with a second moving body M to provide a sophisticated service, and in the last case in which a relatively rough second moving body M is permitted to cooperate with a first moving body R1 to provide a sophisticated service. Comprehensive examples of cooperation will be detailed in the second or later embodiments. In the first embodiment, a safety control system C1 for such cooperation will be detailed.

Referring again to FIG. 4, the robot R1 is adapted to: exercise a relatively wild automatic motion in a playback manner, following the robot control program 1a processing initial data; receive a teaching of the worker M, following the control program 1a processing the initial data and learning new data taught by the teaching, while updating part of old data with new data; exercise a sophisticated automatic motion, following the program 1a processing a combination of initial, updated and taught data; and cooperate with the worker M, following the program 1a processing one of the initial data and the combination of data. In the learning, the program 1a may have some file therein automatically reprogrammed.

The automatic motions are exercised in an automatic mode of the control system C1. The reception of teaching and the cooperation are permitted in a cooperation mode of the control system C1.

The automatic mode may be selected for the robot R1 to provide services in its line requiring e.g. high-speed and/or accurate actions that ordinary labor could not achieve. The cooperation mode may be selected for a forte of the worker M, where the robot R1 is not best and needs a cooperation service.

More specifically, for example, when making multiple holes at a high speed in a moving vehicle body, while following it, the piercing work is full-automatically achieved by playback actions of the robot R1; and when positioning a weighty soft or flexible work to the vehicle body while fastening the work thereto by applying bolts or screws to the holes, adequately tightening, the work is clamped by the robot R1 for the positioning and the fastening work with a tightening is performed by the worker M. Such work tends to deform, and it is very difficult for a typical automatic robot to serve for such fastening.

The control system C1={1,2,3,4} so controls the robot R1, in addition to stopping a motion of the robot R1 in the automatic mode, when the interference region R11 is invaded by the worker M, as will be described later.

Still again referring to FIG. 4, the operation mode select switch 2a comprises a hardware switch or a software switch provided on a switch board or a touch panel display of the control panel 2, and permits a voluntary selection between the automatic mode and the cooperation mode. A competent switch may be provided in the safety control program 1b. Control circuitry in the panel 2 accepts output data D2o from the satelite computer 1. Data D2i on operations at the panel 2 are input to the computer 1, including a data D21 on a select operation of the switch 2a.

The computer 1 outputs necessary data D3o to the invader sensor 3 comprised of the transmitter 30 and the receiver 31, and inputs therefrom associated data D3i including occasional data as a signal representative of an invasion of the interference region R11 by an invader, i.e. the transmitter 30 or its carrier M who is identified, while a decision on a probable invasion of the worker M is made at the computer 1 after the occasional data have been processed in a later-described manner.

It will be seen that the invader sensor 3 may be: a combination of a transmitter 30 carried by the worker M and triple of receivers 31 responsible for a respective divided region of an area or a space of the man-machine section F22; a two-dimensional basic matrix of sensible matt members laid over an area of the floor of the man-machine section F22 or on respective stationary or movable benches, stands, stairs or steps therein or a combination or a two-dimensional matrix of such basic matrices; a two-dimensional or a three-dimensional basic array of photoelectric sensor elements arranged over an area or in a space of the man-machine section F22 or a combination or a two-dimensional or a three-dimensional array of such basic arrays; and/or a combination thereof.

The receiver 31 may display or recognize a position of the worker M, and an observer of such a receiver may inform an operator at the control panel 2 of a probable invasion, or the observer himself, herself or itself may be such an operator.

When using triple of receivers 31 two-dimensionally arranged, letting (x1,y1), (x2,y2), (x3,y3) be coordinates of their locations in an absolute coordinate system, and L1, L2, L3 be distances between the respective locations and a position (x,y) of the transmitter 30 carried by the worker M, as the distances are determined from strengths of associated radio waves, there concurrently stand three equations, such that:

$(x-x1)^2+(y-y1)^2=L1^2$, $(x-x2)^2+(y-y2)^2=L2^2$, and $(x-x3)^2+(y-y3)^2=L3^2$, of which arbitrary two can be solved for at most two probable worker positions, of which at least one can be selected as a worker position by using the remaining equation.

It will be seen that radar or one or more direction sensible radio receivers may detect respective positions of a plurality of transponder or transmitter carriers that may be first and second movable bodies.

When using the matrix of sensible matt members, each matt member has a location of its coverage area identified and, when a load, exceeding a threshold, is imposed thereon by an identified worker M or an uncofirmed object (e.g. a worker with another id or a foreign person or object), the matt member outputs a detection signal in a manner capable of its identification, e.g. by effecting a generation or an interruption of an electrical, mechanical or optical signal transmittable to a time-divisional serial scanner or a pair of such signals transmittable to both of a pair of x and y directional scan lines.

When using the array of photo-electric sensor elements, each sensor element includes a combination of a projector for projecting a directional beam of light or laser and a receiver for photo-electrically sensing a reception of the beam. The beam covers an identified axisymmetric spatial zone thereabout, which zone may partially overlap with a zone of a respective one of one or more adjacent beams cooperatively covering an entirety of an identifiable spatial region. If the reception of the beam is interrupted by e.g. an identified worker M or an unconfirmed object (inclusive of a flying object), the receiver outputs a detection signal capable of its identification, which signal is scanned in a manner similar to the case of sensible matt members.

The interference region R11 inherently is variable with time, as the robot R1 travels or moves, but may not, vary as the robot R1 may have a stationary part thereof fixed in position in a concerned coordinate system, in which a permissible motion range is fixed or invariable with time.

In this connection, the sensible matt members or the photo-electric sensor elements may be spread all over or arranged by a spacing to cover, respectively, an entirety of the interference region R11, as illustrated by shadow lines in FIG. 4, for an ensured detection of an invader M with a limited cost.

In such a case, the sensible matt members may be respread when the interference region R11 is varied. The photo-electric sensor elements may be rearranged to some extent.

The radio sensor 30+31 permits an exact recognition of the worker's position, and a flexible adaptation to a variation of the interference region R11. For the adaptation, a mere definition of a boundary R11a of a varied region R11 can do, in contrast to the sensible matt members or photo-electric sensor elements needing a respreading or rearrangement.

In a case where there are a plurality of separate interference regions R11 located like islands, a corresponding number of groups of identified sensible matt members or photo-electrical sensor elements may be spread or arranged over defined locations, as circumstances require.

The safety control system C1 may then be adapted to be responsible for any detection signal to decide which member or element of which group has transmitted the signal.

When using the radio sensor 30+31, the control system C1 may have stored therein coordinate data on boundaries R11a of islanded interference regions R11, permitting a voluntary selection for adaptation to an occasional layout of such regions.

Figure 5:
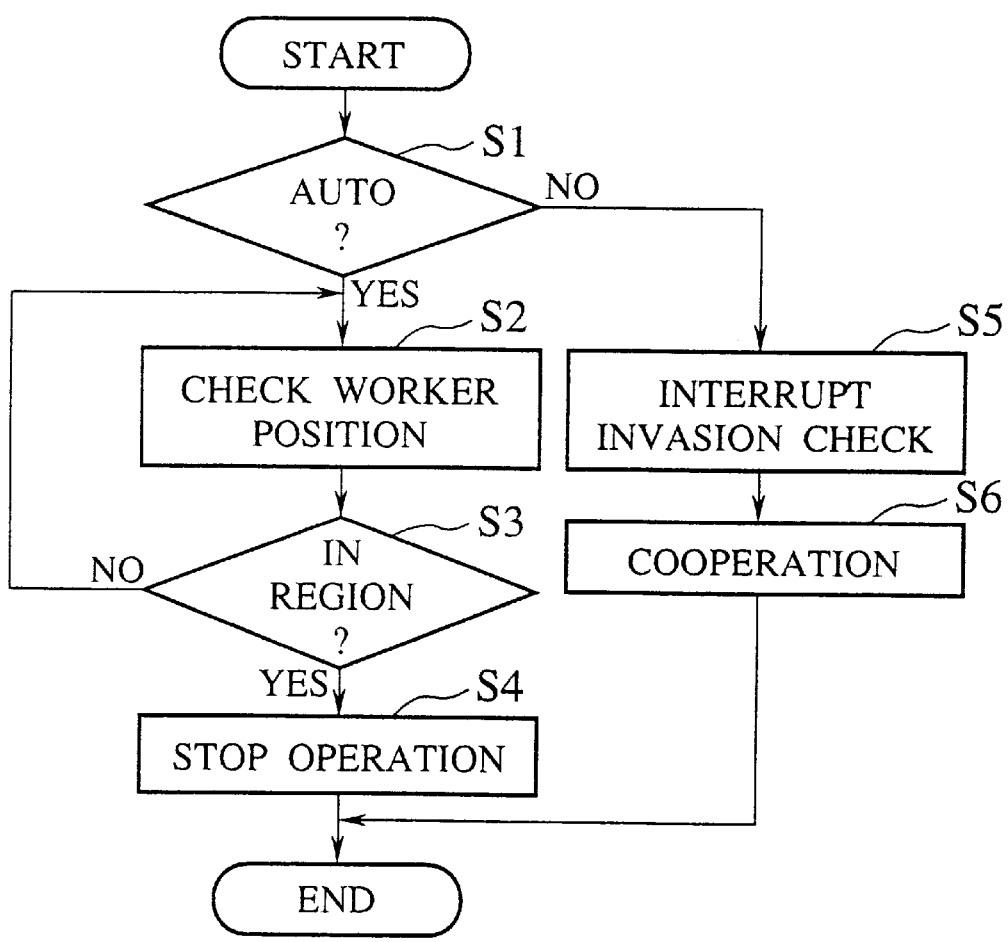
FIG. 5 is a flow chart of a control program of the safety control system of FIG. 3.

FIG. 5 is a flow chart of principal control actions of the control system C1.

At a decision step S1, it is decided whether or not the automatic mode is selected by the operation mode select switch 2a.

If the automatic mode is selected, the control flow goes to a step S2, where the computer 1 starts monitoring input data D3i from the invader sensor 3 to detect an invasion of an identified worker M into an identified interference region R11, by checking a current position of the worker M. Then, at a step S3, it is decided whether or not the worker M is detected in the interference region R11. If the worker M is detected there, the flow goes to a step S4 for promptly stopping an associated operation of the robot R1.

If the automatic mode is not selected, i.e., if the cooperation mode is selected at the step S1, the flow goes to a step S5, where the computer 1 interrupts inputting an associated detection signal from the invader sensor 3, thereby interrupting the check for an invasion of the worker M, i.e. effecting a cancellation of the interference region R11 so that the worker M is permitted to voluntarily enter into and exit from the interference region R11, allowing a voluntary cooperation with the robot R1.

It will be seen that the foregoing control flow is programmed to be executed for a respective combination of an identified worker M and an identified interference region R11.

If an interference region is invaded by an unconfirmed object, the system C1 may promptly stop all associated actions of the robot R1 even in the cooperation mode. Such an invasion may be detected e.g. by a combination of a radio sensor 30+31 and a matrix of sensible matt members or an array of photo-electric sensor elements.

More specifically, in a case an observer is watching for a foreign object and/or an entirety of a combination of the man-machine section F22 and the automatic machine section F23 is closed by an enclosure which permit entry of identified persons and identified movable objects, the safety control system C1 may recognize respective positions of such possible invaders (inclusive of the observer), as they may each carry a transmitter or transponder, so that a simple use of radio sensors can cope with.

However, in case of no enclosure closing the sections F22+F23 nor watcher, the safety control system C1 may preferably employ sensible matt members and/or photoelectric sensor elements in addition to radio sensors.

According to the present embodiment, during an operation in an automatic mode of a production facility R1, an invasion of a worker M into an interference region R11 may be detected. In such a case, however, the operation is stopped. Therefore, during the automatic mode, the worker as well as the facility is kept safe, even if the worker has invaded the interference region. On the other hand, during an operation in a cooperation mode, the worker is positively permitted to cooperate with the production facility in the interference region, as it is necessary. Moreover, in both automatic and cooperation modes, an immediate selection is possible between prohibiting an invasion of the worker into the interference region and accepting such an invasion, thus permitting an increased efficiency of work.

Further, an arbitrary region around a production facility R1 may be set as an interference region R11. In this case also, a detected invasion of a worker M into the interference region R11 may cause an operation in an automatic mode of the production facility to stop, whereas it is positively accepted in a cooperation mode of the production facility.

Figure 6:
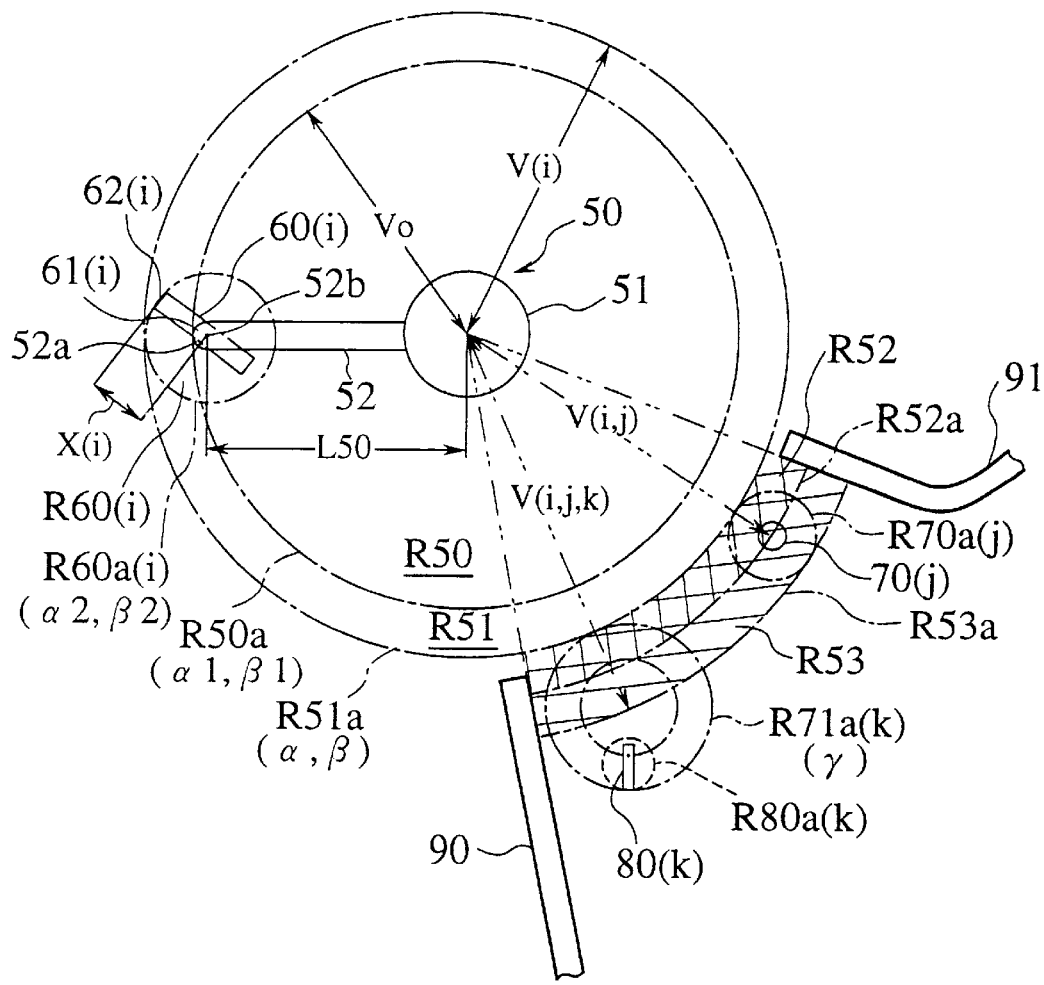
FIG. 6 illustrates a principle of an interference recognition by the safety control system of FIG. 3.
Figure 7A:
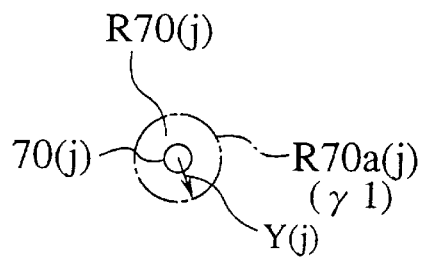
FIG. 7A illustrates a probable interference region of an identified worker.
Figure 7B:
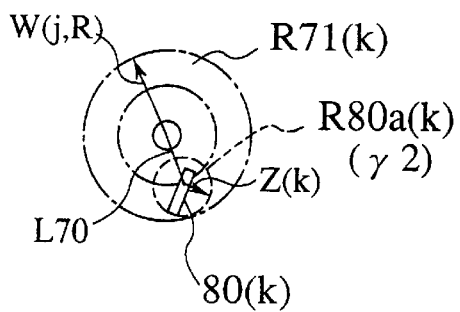
FIG. 7B illustrates a probable interference region of a combination of an identified worker and an identified tool.

FIGS. 6 and 7A, 7B describe how the safety control system C1 recognizes an interference region R11 (=R53) of an identified first movable body R1 (=50+60($i$)) and an invasion thereto by an identified second movable body M (=70($j$)+80($k$)).

In these figures, designated at reference character 50 is an identified movable master device; 60 is a set $\{60(i)\}$ of movable slave members 60($i$) (i=1,2 . . . ) each identifiable as an integrally movable combination of a work handling member attached to the master device 50 and an $i$-th identified one of registered works; 70 is a group $\{70(j)\}$ of movable objects 70($j$) (j=1,2, . . . ) each identifiable as a j-th one of registered workers M (or sometimes competent devices); 80 is a set $\{80(k)\}$ of tool members 80($k$) (k=1,2, . . . ) each identifiable as a $k$-th one of registered tool members; and 90, 91 are left and right partition members between which the man-machine section F22 communicates with the automatic machine section F23.

The master device 50 may include various apparently stationary members and various movable members. As a required service is defined, the movable master device 50 necessarily comprises a representative stationary member 51 fixed at a representative center thereof (hereafter "first center") to a certain point defined in a three-dimensional coordinate system that moves together with a displacement of the master device 50 in an absolute coordinate system; and a first movable member 52 of which a far-most end 52$a$ describes an unshown first apparent "sphere" or a "solid sector" (hereafter "sphere" and "solid sector" will collectively represented by a correspondent "circle" for comprehension, e.g. "first apparent circle" in this case.) in which all associated members of the master device 50 is movable, as the first movable member 52 represents a longest member rotatable about the first center in a concerned solid angle in which an envelope of possible motions of the master device in the moving coordinate system resides within a range of the first apparent circle. In the example of FIG. 6, the concerned solid angle coincides in plan with a solid angle defined by a pair of vertical planes crossing each other on the first center and extending along facing sides of the left and right partition members 90, 91. Hereafter, associated description is assumed to be provided of the concerned solid angle.

The identified master device 50 has an identified first clearance $\alpha 1$, e.g. 10 mm or near at the positive (+) side, in which the far-most end 52$a$ may occasionally swing outside or inside the first apparent circle, and a preset first allowance $\beta 1$ in consideration of a data processing speed of the safety control system C1, a response time of the master device 50, and a probable movement of an associated member or part that may be an unconcerned work.

The control system C1 recognizes: the master device 50 as a first radius vector bound at its fix end to the first center and free-rotatable thereabout, with a first radius V0 equivalent to a sum of a radius of the first apparent circle, the first clearance $\alpha 1$, and the first allowance $\beta 1$; and a motion range R50 of the device 50 to be a region within a circle R50$a$ that a free end of the first vector describes.

The slave member 60($i$) is rotatably bound at a certain point 61($i$) thereof (hereafter "second center") to a certain point 52$b$ of the first member 52, at a distance L50 from the first center shorter than the radius of the first apparent circle, so that a far-most end 62($i$) of the slave member 60($i$) describes an unshown second apparent circle about the second center 52$b$.

The identified slave member 60($i$) has an Identified second clearance $\alpha 2$, e.g. 10 mm or near at the positive (+) side, in which the far-most end 62($i$) may occasionally swing outside or inside the second apparent circle, and a preset second allowance $\beta 2$ in consideration of the data processing speed of the safety control system C1, the response time of the master device 50, and a probable movement of an associated member or part.

The control system C1 recognizes: the slave member 60($i$) as a second radius vector bound at its fix end to the second center 52$b$ and free-rotatable thereabout, with a second radius X($i$) equivalent to a sum of a radius of the second apparent circle, the second clearance $\alpha 2$, and the second allowance $\beta 2$; and a motion range R60($i$) of the member 60($i$) to be a region within a circle R60$a$($i$) that a free end of the second vector describes.

Then, the control system C1 compares a sum of the distance L50 and the second radius X($i$) with the first radius V0.

When the former L50+X($i$) is larger than the latter V0, the control system C1 recognizes: a combination of the identified master device 50 and the identified slave member 60($i$) as a third radius vector bound at its fix end to the first center and free-rotatable thereabout, with a third radius V($i$) equivalent to a total of the distance L50, the radius of the second apparent circle, a clearance a equivalent to a sum of the first clearance α1 and the second clearance α2, and an allowance β equivalent to a sum of the first allowance β1 and the second allowance β2; and a motion range R51 of such the combination 50+60($i$) to be a region within a circle R51$a$ that a free end of the third vector describes.

If the the sum L50+X($i$) is shorter than or equivalent to the first radius V(0), the control system C1 recognizes: the combination of the master device 50 and the slave member 60($i$) as a third radius vector equivalent to the first radius vector so that V($i$)-=V0, α=α1, and β=β1; and the motion range R50 of the device 50 to be that of such the combination 50+60($i$).

Therefore, the safety control system C1 recognizes the combination of device 50 and member 60($i$) as a third radius vector with a radius equivalent to a distance between the first center and a far-most potential point where part of the longest member 52 of the device 50 or part of the $i$-th identified work may reach. If the work handling member of the slave member 60($i$) is carried by the longest member 52, the third radius vector should generally be different from the first radius vector so that V($i$)≠V0. If no work is handled, the third radius vector should be identical to the first radius vector so that V($i$)=V0.

The control system C1 has stored therein data on physical characteristics of the $j$-th identified worker 70($j$), such as on a height and a reach of finger end in a sitting or lying position, and in a particular case a longest one of distances between from a position of the transmitter 30 and tips of the twenty fingers, and a total length when the worker has fallen on the floor with arms and fingers stretched.

The system C1 further has data on a first service circle determined for the worker 70($j$) in consideration of selected physical characteristics including the reach of finger end and a kind of the required service, as well as on a first probable allowance γ1 preset for a necessary escape in consideration of the kind of required service.

The system C1 recognizes: the worker 70($j$) as a fourth radius vector bound at its fix end to a central point (hereafter sometimes "foot part") on the floor between feet and free-rotatable thereabout, with a fourth radius Y($j$) equivalent to a sum of a radius of the first service circle and the first probable allowance γ1; and a motion range R70($j$) of the worker 70($j$) to be a region within a circle R70$a$($j$) that a free end of the fourth vector describes.

The control system C1 has stored therein data on technical characteristics of the $k$-th identified tool member 80($k$), such as on outline dimensions, a grip or handling position, and a range of rotational drop from a height, and in a particular case a range in which the member 80($k$) may be spread when dropped on the floor.

The system C1 further has data on a second service circle determined for the member 80($k$) in consideration of selected technical characteristics including a length from the handling position to a far-most end, the drop range and a kind of the required service, as well as on a second probable allowance γ2 preset for avoiding an undesirable contact in consideration of the kind of required service.

The system C1 recognizes: the tool member 80($k$) as a fifth radius vector bound at its fix end to a handling point (hereafter sometimes "hand part") and free-rotatable thereabout, with a fifth radius Z($k$) equivalent to a sum of a radius of the second service circle and the second probable allowance γ2; and a motion range of the member 80($k$) to be a region within a circle R80$a$($k$) that a free end of the fifth vector describes.

Then, the control system C1 compares a sum of a horizontal distance between the foot part and the hand part and the fifth radius Z($k$) with the fourth radius Y($j$).

When the former is larger than the latter Y($j$), the control system C1 recognizes: a combination of the identified worker 70($j$) and the identified tool member 80($k$) as a sixth radius vector bound at its fix end to the foot part and free-rotatable thereabout, with a sixth radius W($j,k$) equivalent to a total of the horizontal distance from the foot part to the arm part, the radius of the second service circle, and an allowance γ equivalent to a sum of the first probable allowance γ1 and the second probable allowance γ2; and a motion range R71($k$) of such the combination 70($j$)+80($k$) to be a region within a circle R71$a$($k$) that a free end of the sixth vector describes.

If the sum of the horizontal distance and the fifth radius Z($k$) is shorter than or equivalent to the fourth radius Y($j$), the control system C1 recognizes: the combination of the worker 70($j$) and the tool member 80($k$) as a sixth radius vector equivalent to the fourth radius vector so that W($j,k$)=Y($i$), and γ=γ1; and the motion range R70($j$) of the worker 70($j$) to be that of such the combination 70($j$)+80($k$).

Therefore, the safety control system C1 recognizes the combination of worker 70($j$) and member 80($k$) as a sixth radius vector with a radius equivalent to a distance between the foot part and a far-most potential point where physical part of the $j$-th identified worker 70($j$) or part of the $k$-th identified tool member may reach. Unless the required service needs a lying position, the sixth radius vector should may well be different from the fourth radius vector so that W($j,k$)≠Y($j$). Unless a tool member is handled, the sixth radius vector should be identical to the fourth radius vector so that W($j,k$)=Y($j$).

It will be seen that the tool member may be a work.

As shown in FIG. 6, the control system C1 dimension-identically maps the sixth radius vector of the radius W($j,k$) from a coordinate system associated therewith into a coordinate system associated with the third radius vector of the radius V($i$), where this and that vectors interfere with each other when a distance between their fix ends is smaller than a sum V($i,j,k$) of their radii V($i$) and W($j,k$).

Therefore, the control system C1 recognizes: a seventh radius vector bound at its fix end to the first center and free-rotatable thereabout with a radius equivalent to the sum V($i,j,k$); and a region within a circle R53$a$ described by a free end of the seventh radius vector to be an interference region R53 between the identified device 50 and the identified worker 70($j$).

It will also be seen that the control system C1 can recognize: a first moving body R1 as a third radius vector in a movable coordinate system; and a second moving body M as a sixth radius vector (representing a worker) in another movable coordinate system, whereas this vector may be another third radius vector (representing another device) in this coordinate system.

If the sixth radius vector is identical to the fourth radius vector of the radius Y($j$), then the seventh radius vector is identical to an eighth radius vector that is bound at its fix end to the first center and free-rotatable thereabout with a radius equivalent to a sum V($i,j$) of the third radius V($i$) and the fourth radius Y($j$), and a region within a circle R52$a$ described by a free end of the eighth radius vector constitutes an interference region R52 between the identified device 50 and the identified worker 70($j$).

Moreover, if the third radius vector is identical to the first radius vector of the radius V0, then the eighth radius vector is identical to an unshown ninth radius vector that is bound at its fix end to the first center and free-rotatable thereabout with a radius equivalent to a sum of the first radius V0 and the fourth radius Y($j$), and a region within a circle described by a free end of the ninth radius vector constitutes an interference region between the identified device 50 and the identified worker 70(*j*).

In other words, according the first embodiment: a first movable body R1 (=50+60(*i*)) has a first motion range R51 defined therearound, including a first clearance a thereof and a first allowance β therefor; a second movable body M (=70(*j*)+80(*k*)) has a second motion range R71(*k*) defined therearound, including a second allowance γ therefor; and a first control means 1, 3, 4 includes safety control means 1*b*, 3 for recognizing an interference region R53 in which the first and second motion ranges interfere with each other, detecting an intersection between the interference region and the second motion range, and responding to the detected intersection to provide a detection signal.

Accordingly, a first motion range is permitted to cover an inherent motion and a relaxed clearance of a first movable body, with a first allowance, and a second motion range is permitted to cover an inherent motion of a second movable body, with a second allowance.

Moreover, the first movable body 50 comprises a first member 52 rotatable about a first center fixed to a representative part 51 of the first movable body, with a far-most end 52*a* thereof describing a first arc R50*a*–α1–β1; and the first motion range R50 comprises a first sum of a first inherent range defined by the first arc, a first fraction α1 of clearance (as a zone) and a first fraction β1 of allowance (as a zone).

Further, the first movable body 50 comprises a second member 60(*i*) rotatable about a second center 52*b* fixed to the first member 52 inside the first arc R50*a*–α1–β1, with a far-most end 62(*i*) thereof describing a second arc R60*a*(*i*) α2–β2; and the first motion range R51 comprises a total of the first sum R50 and a second sum R60(*i*) of a second inherent range defined by the second arc, a second fraction α2 of clearance and a second fraction β2 of allowance.

Still more, the second member 60(*i*) comprises a third member rotatable about the second center 52*b*, and a work the third member is handing, the work having a free end thereof as the far-most end 62(*i*) of the second member.

Yet more, the second movable body 70(*j*) comprises a flexible body 70(*j*) with a possibility of fall about a third center as a foot part thereof, with an arm part part thereof stretched to have a finger end lying on a first circle R70*a* (*j*)–γ1; and the second motion range R70(*j*) comprises a third sum of a first probable range defined by the first circle and a first probable fraction γ1 of allowance.

Still further: the second movable body M comprises a tool member 80(*k*) with a possibility of rotational drop about a fourth center as a hand part of the flexible body 70(*j*) within a second circle R80*a*(*k*)–γ2; and the second motion range R71(*k*) comprises a total of the third sum R70(*j*) and a fourth sum of a second probable range defined by the second circle and a second probable fraction γ2 of allowance.

There will be described below an assist arm device with a locus restriction function according to a second embodiment of the invention, with reference to FIGS. 8 to 15.

Figure 8:
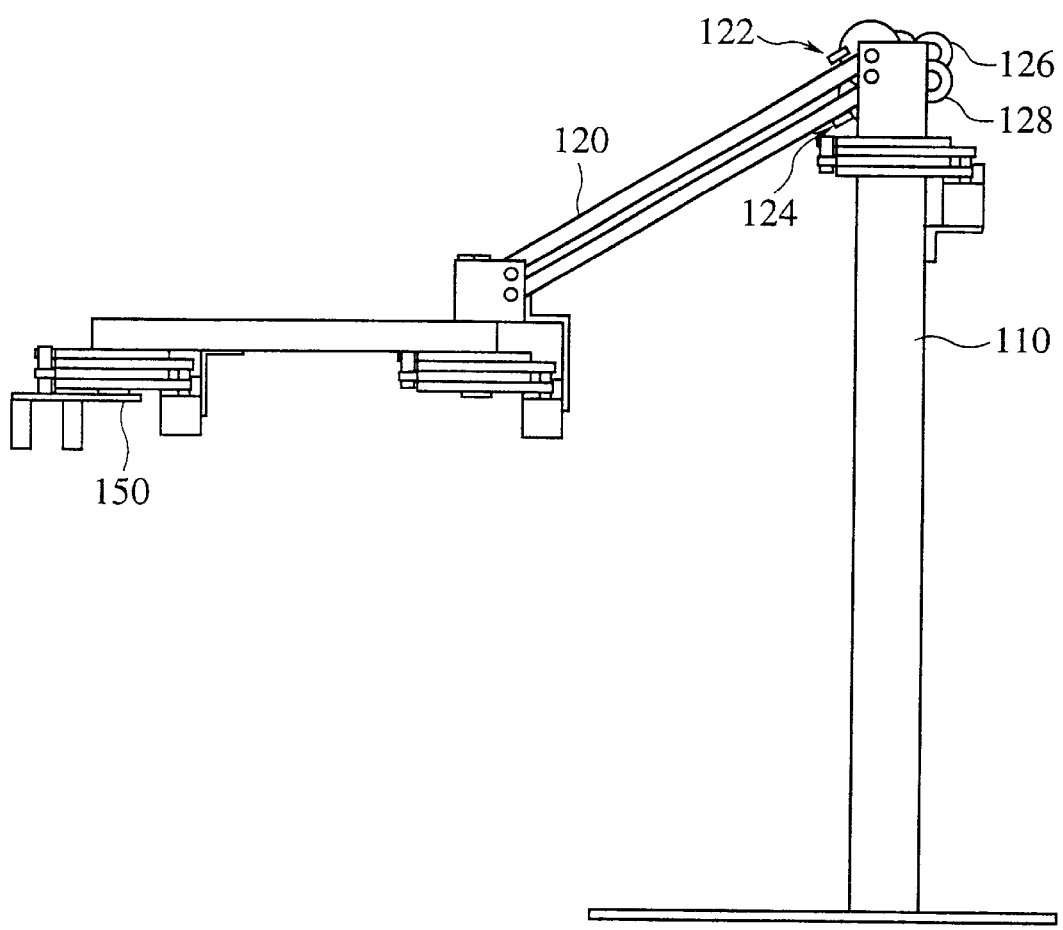
FIG. 8 is a side elevation of a transfer assist arm device with a motion locus restricting function according to a second embodiment of the invention.
Figure 9:
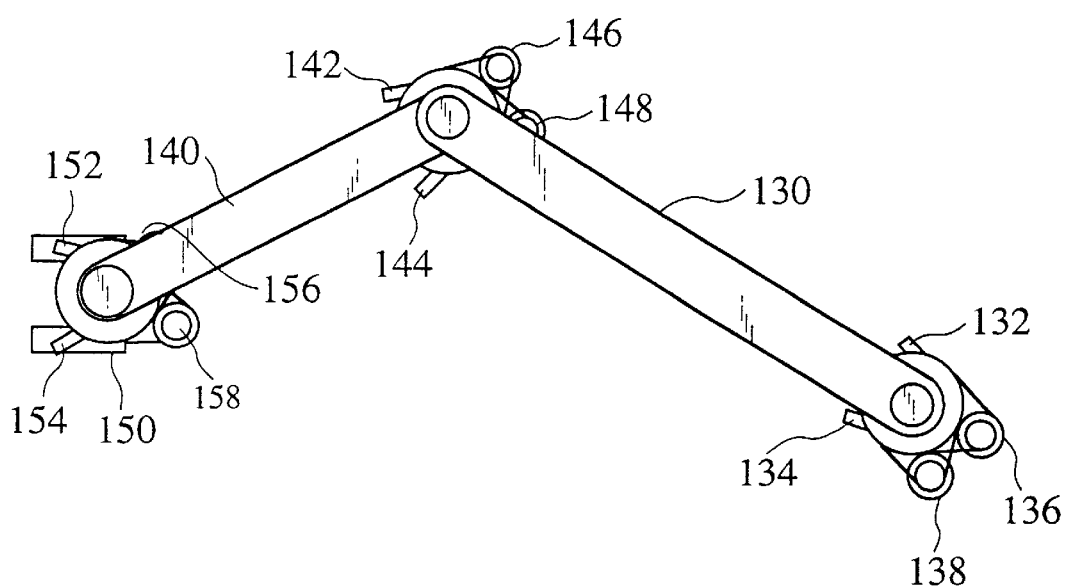
FIG. 9 is a plan of the assist arm device of FIG. 8.

FIG. 8 is a side elevation of the assist arm device, and FIG. 9, a top view thereof.

As shown in FIGS. 8 and 9, the assist arm device is mounted on a base pillar 110. The device is constituted as an assist arm of a four-axis type comprising a Z-axis arm 120 vertically swingable about a fulcrum on the pillar 110, an A-axis arm 130 fixed at one end of the Z-axis arm 120 and horizontally rotatable about a fulcrum on the Z-axis arm 120, a B-axis arm 140 fixed at one end of the A-axis 130 arm and horizontally rotatable about a fulcrum on the Z-axis arm 120, and a (C-axis) hand 150 rotatably fixed at one end of the B-axis arm 140.

The assist arm device further comprises an unshown weight balancing mechanism so that a work clamped by the hand 50 has a balanced weight, permitting a worker to simply apply a light force for transferring the work, even if it is weighty.

At each arm fixing part of the assist arm device, there are provided a pair of mechanical stoppers as restriction members and an arm position detecting encoder as a rotary position detector means.

As shown in FIG. 8, at a connection part between the base pillar 110 and the Z-axis arm 120, there are provided a pair of mechanical stoppers 122 and 124 for angular development and return limits along Z-axis, respectively, which stoppers 122, 124 have their set positions for restricting therebetween a swing range of the Z-axis arm 120. The position of Z-axis development limiting mechanical stopper 122 is adjustable by a motor 126 therefor, and that of Z-axis return limiting mechanical stopper 124 is adjustable by a motor 128.

At a connecting part between the Z-axis arm 120 and the A-axis arm 130 shown in FIG. 9, there are provided an A-axis development limiting mechanical stopper 132 and an A-axis return limiting mechanical stopper 134, which have their set positions for restricting therebetween a rotation range of the A-axis arm 130. The position of A-axis development limiting mechanical stopper 132 is adjustable by a motor 136 therefor, and that of A-axis return limiting mechanical stopper 134 is adjustable by a motor 138.

At a connecting part between the A-axis arm 130 and the B-axis arm 140, there are provided a B-axis development limiting mechanical stopper 142 and a B-axis return limiting mechanical stopper 144, which have their set positions for restricting therebetween a rotation range of the B-axis arm 140. The position of B-axis development limiting mechanical stopper 142 is adjustable by a motor 146 therefor, and that of B-axis return limiting mechanical stopper 144 is adjustable by a motor 148.

At a connecting part between the B-axis arm 140 and the (C-axis) hand 150, there are provided a C-axis development limiting mechanical stopper 152 and a C-axis return limiting mechanical stopper 154, which have their set positions for restricting therebetween a rotation range of the hand 150. The position of C-axis development limiting mechanical stopper 152 is adjustable by a motor 156 therefor, and that of C-axis return limiting mechanical stopper 154 is adjustable by a motor 158.

The Z-axis arm 120 has its swing axis, where a later-described (FIG. 10) arm position detecting encoder 120*e* is provided for detection of a swing position of the Z-axis arm 120. At a rotation axis of the A-axis arm 130, there is provided an arm position detecting encoder 130*e* (FIG. 13) for detection of a rotational position of the A-axis arm 130. At a rotation axis of the B-axis arm 140, there is provided an arm position detecting encoder 140*e* (FIG. 13) for detection of a rotational position of the B-axis arm 140. At a rotation axis of the hand 150, there is provided an arm position detectable encoder 150*e* (FIG. 13) for detecting a rotational position of the hand 150. The position detecting encoders 120*e*–150*e* provide their detection values, permitting a work transfer position to be calculated.

Figure 10:
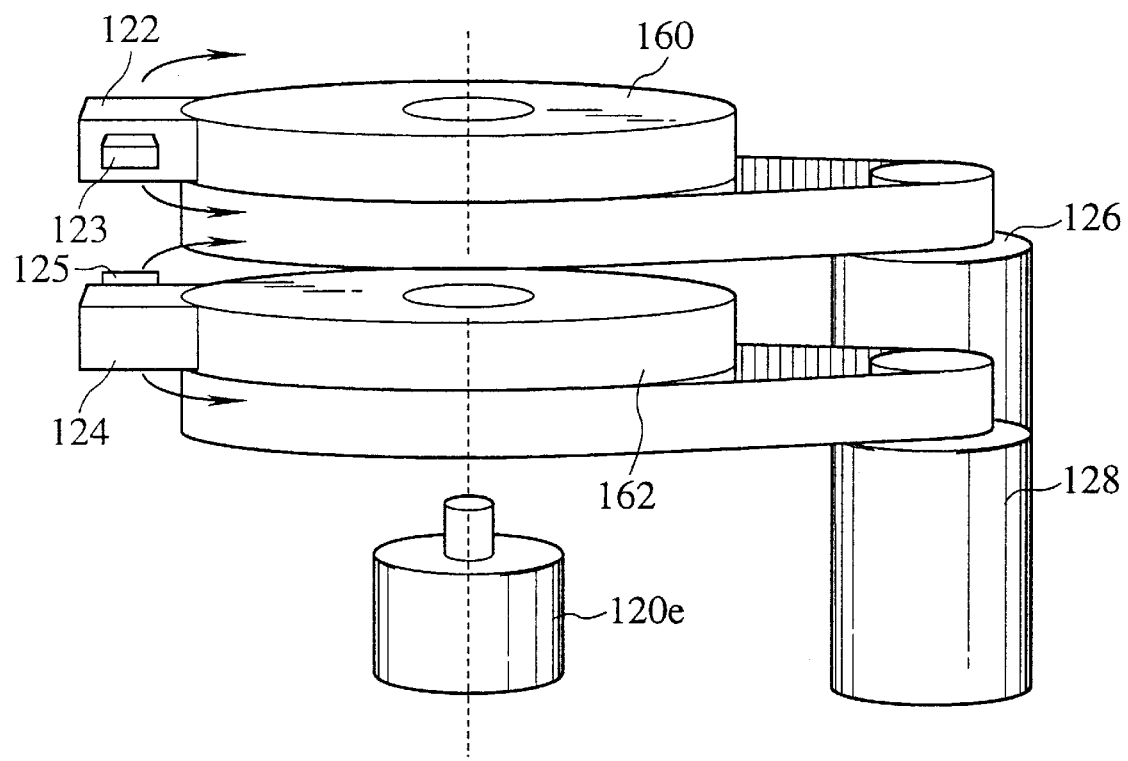
FIG. 10 is a detail of paired mechanical stoppers and associated members of the assist arm device of FIG. 8.

FIG. 10 illustrates detailed mechanical stoppers 122, 124 for the Z-axis arm 120.

As shown in FIG. 10, the paired stoppers 122, 124 are fixed to pulley-driven rotary members 160, 162 rotatable about the rotation axis (broken line) of an associated arm (120 in this case) and respectively have, at their parts in contact with the arm 120, shock absorbers 123, 125 attached thereto for protecting the stoppers 122, 124 against damages such as breakage. The rotary members 160, 162 are driven for rotation by a Z-axis development limit control motor 126 and a Z-axis return limit control motor 128, respectively, via pulleys. The control motors 126, 128 have therein later-described encoders 126e, 128e for detecting their rotation angles.

As described, the rotation axis of Z-axis arm 120 is provided with the encoder 120e for detecting a rotation angle thereof.

Figure 11:
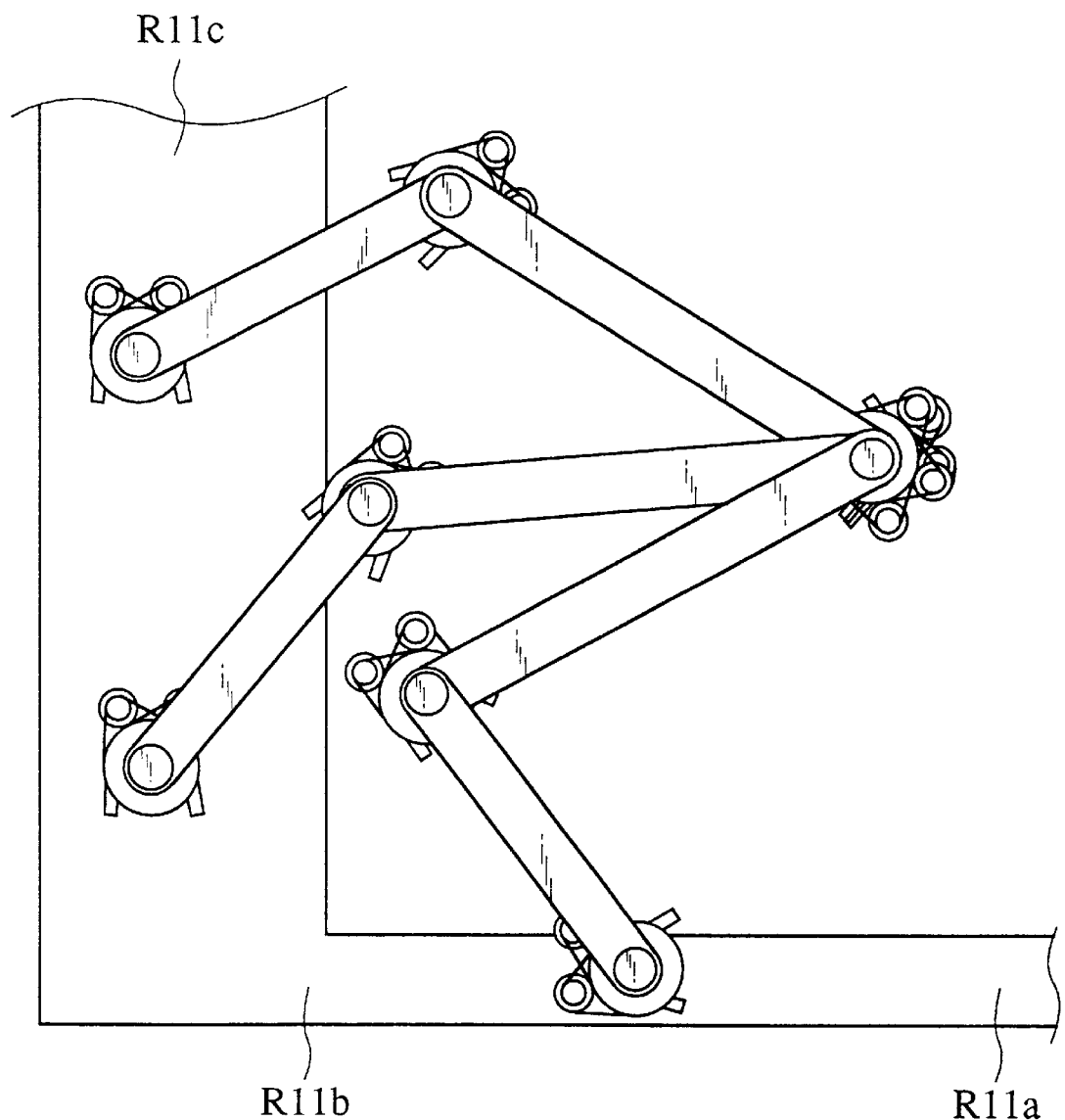
FIG. 11 is a plan of the assist arm device of FIG. 8, as it is has moved along a route.

FIG. 11 a plan of the assist arm device moving along a route that includes an allowable or permissible motion range R11a+R11b+R11c. In the plan, there is shown a horizontal region of the motion range which essentially is three-dimensional, as a vertical swing motion of the Z-axis arm 120 also is restricted.

Between from a region R11a to a region R11b, a work clamped by the hand is transferred along a narrow way, where it is movable within a shown narrow region established by so set positions of the mechanical stoppers, and would not go outside whatever a worker had pulled or pushed. In a transfer along a way from the region R11b to a region R11c, the work is movable within a shown wider region, as the mechanical stoppers have their positions set wider than those between the regions R11a to R11b.

The permissible motion range is thus variable by changing set positions of the mechanical stoppers, and may be set adequately so that any worker can transfer the work safe along the motion range, without paying attentions to obstacles standing outside the range.

Figure 12A:
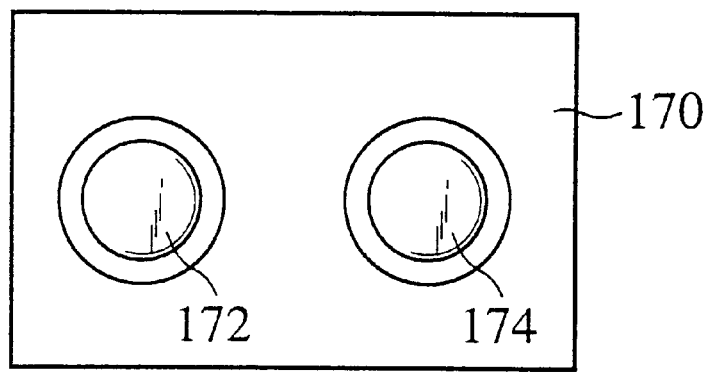
FIGS. 12A and 12B are front views of a local controller and a control panel, respectively, of the assist arm device of FIG. 8.
Figure 12B:
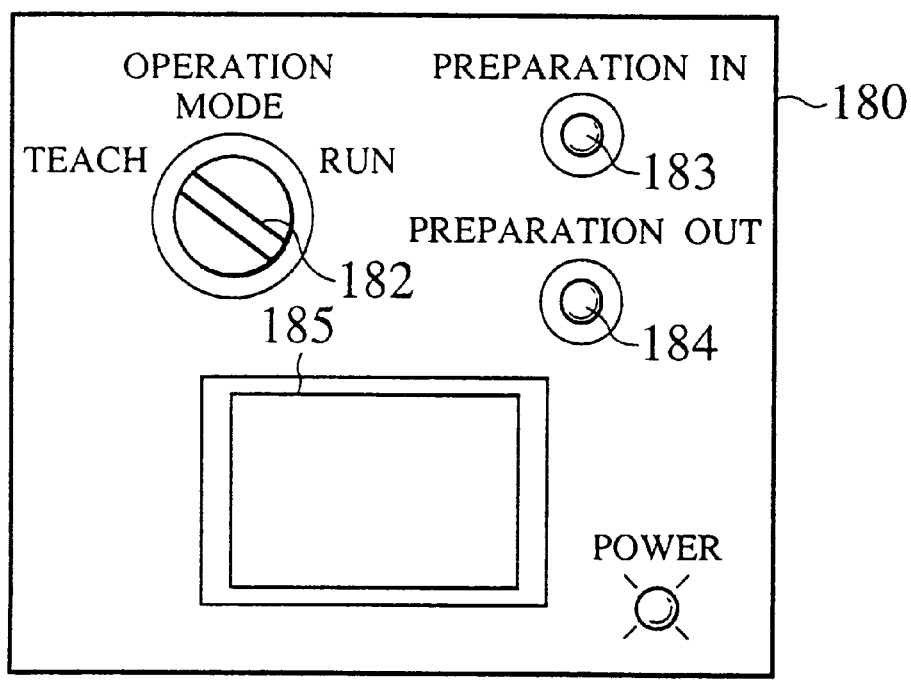

FIG. 12A is a front view of a local controller 170 provided for the hand 150. FIG. 12B is a front view of a control panel 180 connected to the assist arm device.

The controller 170 of FIG. 12A is located in place for convenience of a worker, and has thereon an instruction or teaching button 172 to be pressed for a later-described teaching mode to store (in a memory) a transfer position of the work, and a mastering button 174 to be pressed for setting the respective arms set in their original positions when starting an operation or teaching.

The control panel 180 has thereon an operation mode select switch 182 for selection between a teaching mode and a running mode, a preparation-in switch 183 for entering a state to prepare for an operation, a preparation-out switch 184 for cancelling the preparing state, and a touch-panel type display 185 for editing data associated with a teaching to the assist arm device, including a correction of taught data.

Figure 13:
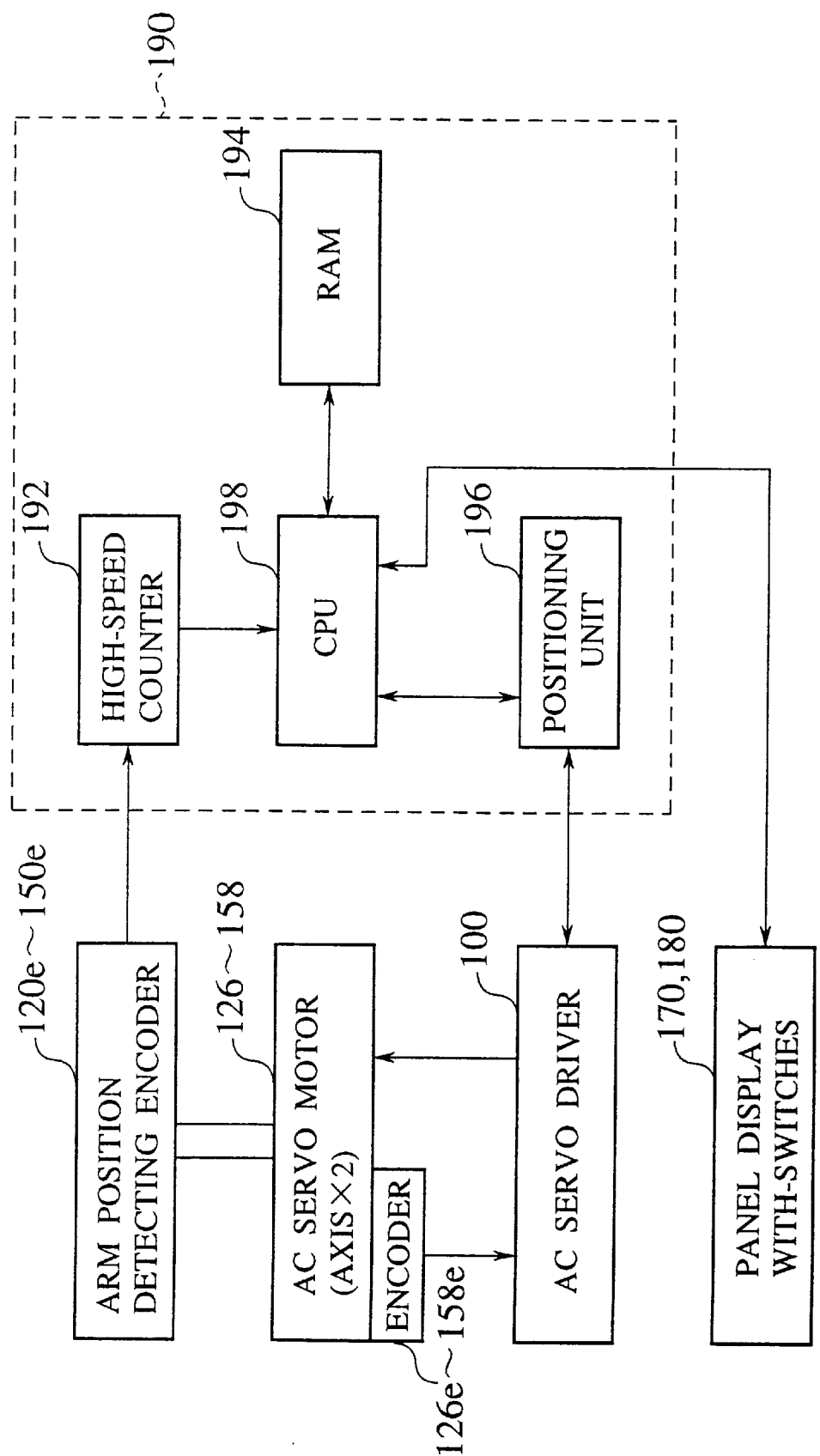
FIG. 13 is a block diagram of a control system of the assist arm device of FIG. 8.

FIG. 13 is a block diagram of a control system of the arm device, including a data processing controller 190.

The processing controller 190 includes: a high-speed counter 192 for a high-speed count of pulse signals from the arm position detecting encoders 120e, 130e, 140e, 150e; a RAM (random access memory) 194 for storing data on count values of the counter 192 and those of rotation encoders 126e, 128e, 136e, 138e, 146e,148e, 156e, 158e of AC servo motors as the stopper controlling motors 126, 128, 136, 138, 146, 148, 156, 158; a positioning unit 196; and a sequencer or CPU (central processing unit) 198.

The CPU 198 has programmed functions such as for: inputting data from the positioning unit 196 that reads count values of the encoders 126e, 128e, 1363, 138e, 146e, 148e, 156e, 158e; inputting signals from switches of the controller 170 and the control panel 180; inputting / outputting data to and from the RAM 194; processing such data; outputting via the unit 198 necessary positioning commands to AC servo drivers 100 that control respective actions of the motors 126, 128, 136, 138, 146, 148, 156, 158.

Figure 14:
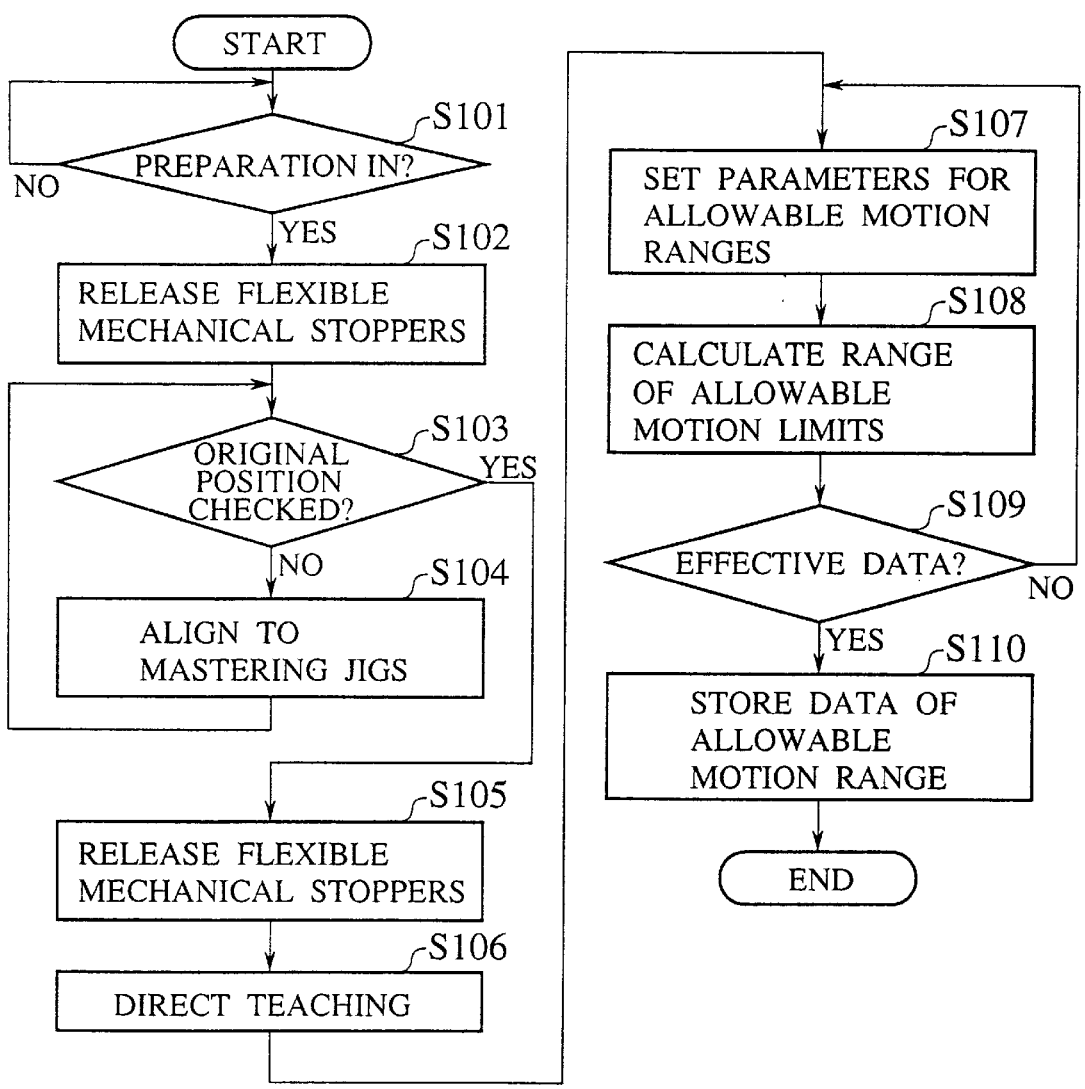
FIG. 14 is a flow chart of actions associated with a teaching mode of the control system of FIG. 13.

FIG. 14 is a flow chart of steps to be followed when the operation mode switch 182 is set in position of the teaching mode.

At a first decision step S101, it is checked if the preparation-in switch 183 is pressed to be on. If the switch 183 is on, the control flow goes to a step S102, where the mechanical stoppers 22, 24, 32, 24, 42, 44, 52, 54 of the respective arms 20, 30, 40, 50 are placed in their released states, permitting these arms to freely move in their maximum angle ranges, like typical arms. Then, for setting the arms in their original positions, mastering jigs are employed in order (S104). When the hand 150 is aligned to a jig therefor, all the arms are set in thus established positions, with no freedom.

At a subsequent decision step S103, all the arms are checked for the original positions to be established. When this is confirmed, the flow goes to a step S105, where the worker turns the mastering button 174 on, thereby resetting count values such as of high-speed counters 192 to a zero. The mechanical stoppers 22, 24, 32, 34, 42, 44, 52, 54 are again placed in the released states. For comprehension, the chart may have the steps S103, S104 replaced with each other.

Then, the flow goes to a step S106, where the worker transfers the work, making an ideal path, teaching the same to the control system of the arm device. Concurrently, the flow enters a step S107, where the CPU 198 sequentially sets up valued motion range parameters in terms of three-dimensional allowable distances from the taught path. As a parameter increases or decreases, the allowable motion range becomes wider (swells) or narrower (shrinks) in an associated direction.

The parameters may represent a sphere or circle about a locus on the taught path, or may be side lengths of a rectangular parallelpiped or a rectangle.

In the case of a circle, there may be set a parameter representative of a radius r from a locus on the taught path, designating a region within the radius r about the locus to be an allowable motion range.

In the case of a rectangle, there may be set a pair of parameters representative of lengths X, Y of long and short sides centered to a locus of the taught path, respectively, so that a rectangle defined by sides of the lengths X, Y enclosing the locus is designated as an allowable motion range.

At a subsequent step S108, the CPU 198 calculates a range of allowable motion limits, i.e., an envelope of marginal regions in which free motions are allowable, as the regions are defined by using those parameters as variables. For example, the processor 190 may have location data of obstacles around the assist arm device, which data may be processed to calculate marginal regions in which the work is kept from interfering with the obstacles.

At a subsequent decision step S109, the CPU 198 checks whether or not the allowable motion range defined by the valued parameters at the step S107 interferes with the marginal envelope calculated at the step S108, or in other words, if the parameters' value data are effective. Unless the motion range interferes with the marginal envelope, the data are effective and stored in the RAM 194 at a step S110. If it interferes, the parameter values may cause the work to hit an obstacle in actual transfer, and the flow again goes to the step S107. As a result, the RAM 194 has stored therein effective data (on numbers of pulses of associated encoders)

representative of relationships between a work transfer position and the respective mechanical stoppers' set positions, whereby a permissible motion range is taught to the assist arm device.

Figure 15:
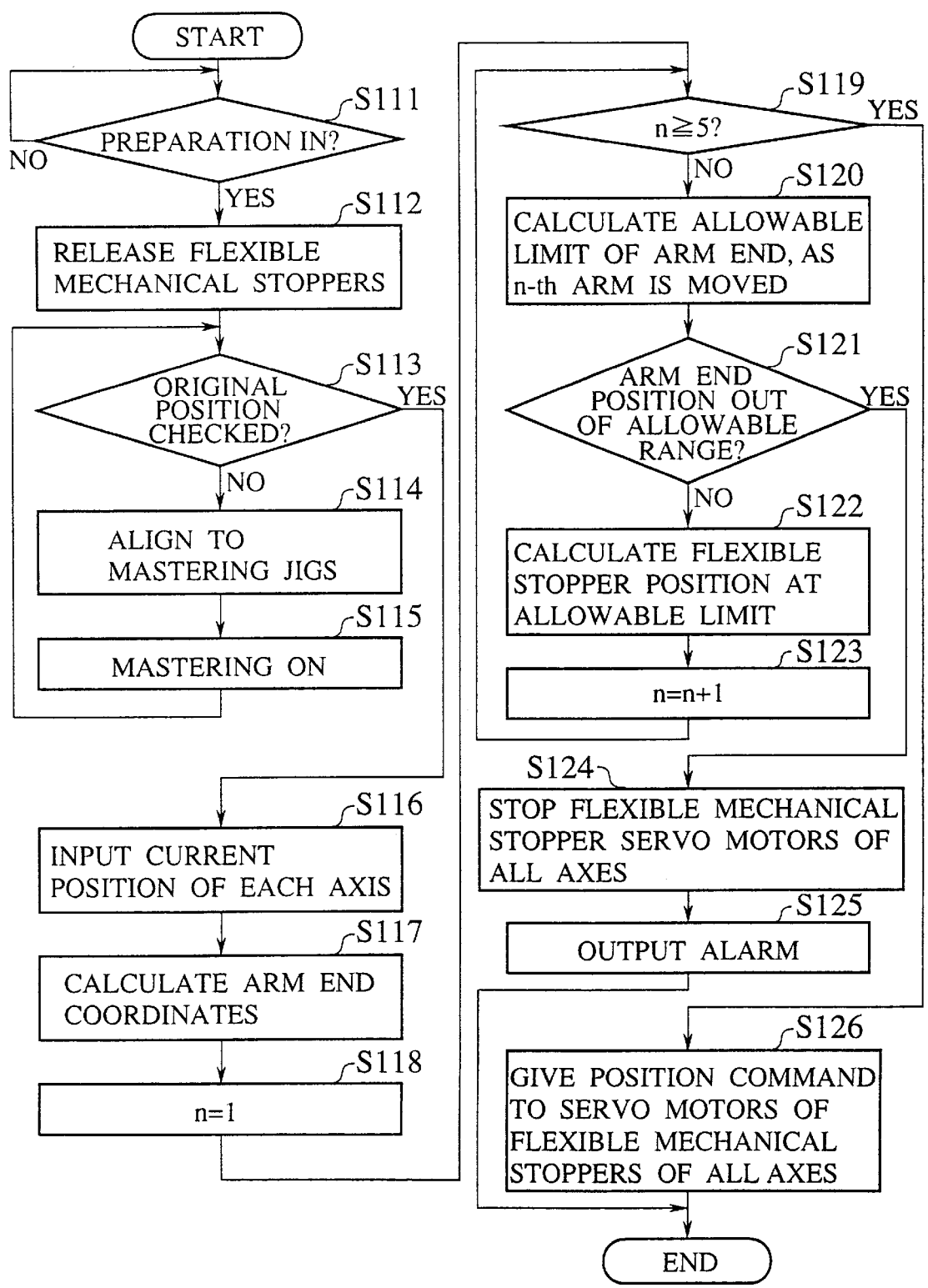
FIG. 15 is a flow chart of actions associated with a running mode of the control system of FIG. 13.

FIG. 15 is a flow chart of actions that occur when the operation mode switch 182 is set in position for the running mode in which the assist arm device serves for a transfer assistance in accordance with taught data.

At a first decision step S111, it is checked if the preparation-in switch 183 is turned on. If it is on, the control flow goes to a step S112, where the mechanical stoppers 22, 24, 32, 24, 42, 44, 52, 54 of the arms 20, 30, 40, 50 are placed in the released states, permitting these arms to freely move in the maximum angle ranges, like typical arms. Then, for setting the arms in the original positions, the mastering jigs are employed in order (S114). When the hand 150 is aligned to the jig therefor, all the arms are set in thus established positions, with no freedom. When this is confirmed, the flow goes to a step S115, where the worker turns the mastering button 174 on, thereby resetting count values such as of high-speed counters 192 to a zero. At a decision step S103, all the arms are checked for the original positions to be established. For comprehension, the chart may have the steps S113 to S115 rearranged like the steps S103 to S105 in FIG. 14.

In due course, the flow goes to a step S116, where the CPU 198 inputs data on current positions of the arms 20, 30, 40, 50 in terms of rotation angles about associated axes, as they are counted by the high-speed counter 192. Then, at a step S117, there are calculated respective coordinates of distal ends of the arms.

At a subsequent step S118, an argument or variable n is set to 1. Then, the flow goes to a step S119, where it passes through to a step S120, as the argument n is smaller than 5.

At the step S120, the CPU calculates (for a respective one of development and return senses of a rotational direction about an n-th axis) a limit as a marginal point of allowable motion of a far-most end of the arms, as simply an n-th arm was moved in that rotational sense relative to its end position (whose coordinates were calculated at the step S117), with the remaining arms fixed in their current angular positions about associated axes.

At a subsequent decision step S121, it is checked whether or not the calculated limit of the end of arm device is found outside an allowable range of its motion.

If the calculated limit is within this range at each sense, the flow goes to a step S122, where taught data on the permissible motion range read from the RAM 194 are 10 processed to calculate positions of paired mechanical stoppers at allowable limits. Then, at a step S123, the argument n is incremented to n+1.

The foregoing steps S120–S123 are repeated for the four arm axes. After such calculations of positions of the respective mechanical stoppers, the flow goes to a step S126, where the CPU 198 gives the positioning unit 196 a command instructing the calculated positions of the mechanical stoppers. In response thereto, the positioning unit 196 operates the AC servo drivers 100, thereby setting the stoppers in the instructed positions.

At the step S121, if the calculated limit is found outside the allowable range, then the flow goes via a step S124, where the mechanical stoppers of all arms are stopped, to a step S125 for outputting an alarm.

According to the first embodiment, a service is required for transferring a work along a route R11a, R11b, R11c, and a transfer assistance is provided by way restricting loci of the work in a range R11a+R11b+R11c of the route. And, an assist arm device includes a plurality of arms 120, 130, 140, 150 having rotation ranges thereof, and a control means 170, 180, 190; 120e, 130e, 140e, 150e; 126e, 128e, 136e, 138e, 146e, 148e, 156e, 158e; 100, 126, 128, 136, 138, 146, 148, 156, 158 is adapted to detect a transfer position of the work and control the rotation ranges depending on the transfer position.

Therefore, the arms 120, 130, 140, 150 have their rotation ranges restricted in accordance with a transfer position of the work, which can thus be transferred within an envelope of combinations of the restricted rotation ranges, and hence a worker is permitted to transfer the work, without paying careful attentions to obstacles lying outside the route, resulting in a decreased mental load and an increased working efficiency, as well as a reduced frequency of undesirable interferences.

Further, according to the embodiment an assist arm device comprises a plurality of arms 120, 130, 140, 150, first detecting means 120e, 130e, 140e, 150e for detecting rotational positions of the arms, a restriction member 122, 124; 132, 134; 142, 144; 152, 154 for a mechanical restriction of at least one arm, a second detection means 126e, 128e; 136e, 138e; 146e, 148e; 156e, 158e for detecting a set position of the restriction member, and a drive means 160, 162, 126, 128; 136, 138; 146, 148; 156, 158 for driving the restriction member, and a control means 170, 180, 190 including a calculation means 198 for calculating a transfer position of the work based on the rotational positions of the arms and a memory means 194 for storing data on a relationship between the transfer position of the work and the set position of the restriction member, while the control means 170, 180, 190 is responsible for the transfer position of the work to read the stored data from the memory means and control the drive means for setting the restriction member in a position in accordance with the read data.

Therefore, a current transfer position of a work is calculated in dependence on a combination of rotational positions of arms 120, 130, 140, 150. One or more pairs of restriction members 122, 124, 132, 134, 142, 144, 152, 154 have their set positions calculated on a basis of data stored in a memory means 194, as they depend on the transfer position of the work. As a result, an associated arm e.g. 120 has its rotational position restricted in accordance with the transfer position, so that the work may go along a transfer path, where it can be kept from hitting obstacles. Accordingly, a worker is permitted to transfer the work along a predetermined route, without paying careful attentions to obstacles lying outside the route, resulting in an increased working efficiency.

Still more, a worker is competent to teach an ideal position of a work in a certain route, a first control means 170, 180, 190 has a teaching button 172 operative for the worker to teach the ideal position to the first control means and for the first control means to calculate therefrom a permissible motion range of the work about the ideal position, while the first control means 170. 180, 190 is responsible for an operation of a teaching button 172 to store data on the ideal position and the permissible motion range in the memory means 194.

Therefore, a teaching worker actually handles a work by hands, as the work is supported by a combination of arms 120, 130, 140, 150 set free from restrictions, with a teaching button 172 operated. Data on a current transfer position of the work can thus be learned as a combination of associated rotational positions of the arms, which data are stored in a memory means 194 and further processed together with some initial data to calculate a permissible motion range of the work, whose data also are stored in the memory means. A possible manual teaching of a work position and a permissible motion range allows a facilitated setting and a facilitated change respectively of a work transfer route and a degree of restriction, such as when a layout is modified.

Yet more, a control means 170, 180, 190 has a mode select switch 182 for selecting one of a teaching mode and a running mode, and the first control means 170, 180, 190 is responsible for the teaching mode, as the teaching button 172 is operated, to store the data on the ideal position and the permissible motion range in the memory means 194 and for the running mode to respond to the transfer position to read the stored data from the memory means and control a drive means 160, 162, 1246, 128, 136, 138, 146, 148, 156, 158 for setting the restriction member in a position in accordance with the read data.

Therefore, stored data in a memory means 194 are updated in a teaching mode for a preferable transfer route of a work, and the updated data are processed for a restriction of a motion range of the work in a running mode. A mode select switch permits an easy, exact and simple selection.

There will be described below a power-aided transfer assist arm device according to a third embodiment of the invention, with reference to FIGS. 16 to 18.

Figure 16:
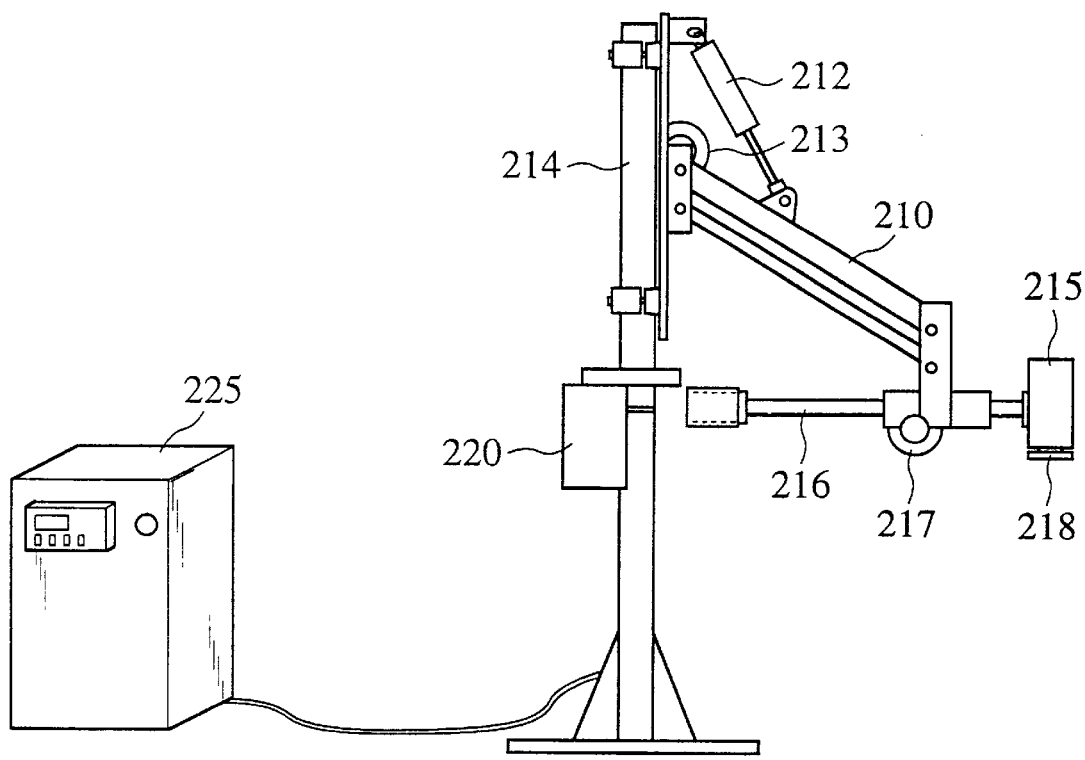
FIG. 16 is a side elevation of a power-aided transfer assist arm device according to a third embodiment of the invention.

FIG. 16 is a side elevation of the power-aided transfer assist arm device.

As shown in FIG. 16, the assist arm device has a swingable arm 210 provided with a weight balancing or cancelling cylinder 212. The arm 210 is driven by a motor 213 to vertically move along a principal axis 214.

The arm 210 carries at an end portion thereof a horizontal arm 216, which is operable for advance and retreat actions, i.e., forward and backward movements of a hand 215, by driving with a motor 217. The hand 215 is provided with a load cell 218 for detecting a force applied to a work by a worker. The detection is made of three dimensional (X, Y, Z) components of an external force F and those of associated torsional stresses N. The arm 210 is rotatable about the principal axis 214, by driving with a motor 220.

For motion control of the power-aided assist arm device there is provided a controller 225, which inputs thereto detection signals from the load cell 218 and pulse signals signals from later-described rotation angle detecting encoders (encoder-1 to encoder-3 of FIG. 17) of the motors 213, 217, 220, and outputs therefrom current or voltage signals for controlling the motors 213, 217, 220. The motors 213, 217, 220 each comprise a low-output servo motor of a 80W or near in consideration of safety.

Figure 17:
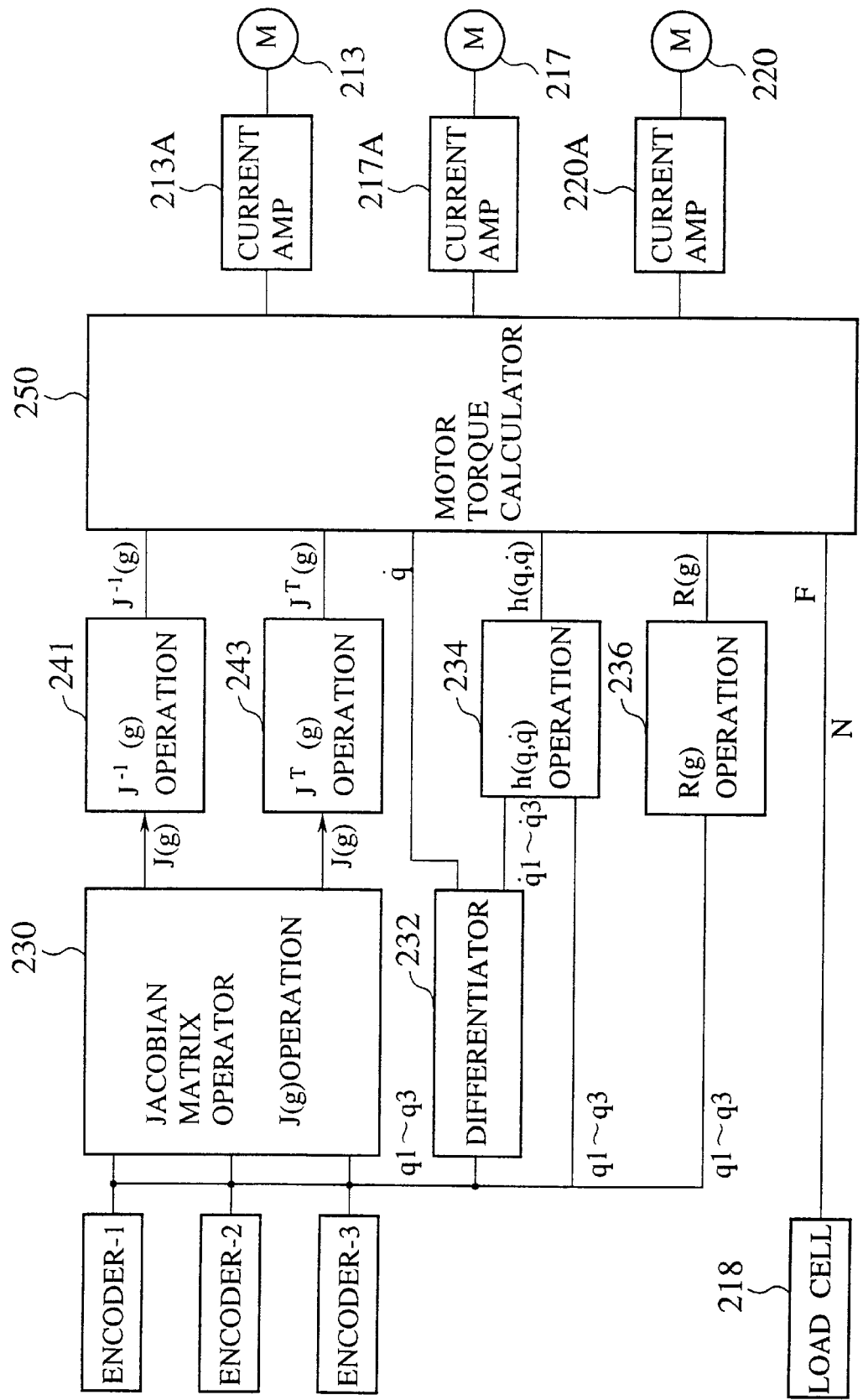
FIG. 17 is a block diagram of the assist arm device of FIG. 16.

FIG. 17 is a block diagram of such the control system of the power-aided assist arm device.

The three motors 213, 217, 220 driving associated arms shown in FIG. 16 are each provided with a corresponding one of a total of three encoders: encoder-1, encoder-2, which are each adapted to detect a rotation angle of the motor, and output a pulse signal q1, q2 or q3 (hereafter sometimes collectively "variant q" or simply "q") each time when the detected angle is varied by a predetermined angle.

The pulse signals q1 to q3 output from the encoders are 10 respectively input to: a matrix operator 230 for generating a Jacobian J(g), i.e. a functional determinant J of a Jacobi formalism for a weight g of coefficient; a differentiator 223 as an operator for differentiation to obtain a differential dq/dt of first order with respect to time t; a Hamiltonian operator 234 for generating a Hamiltonian h(q, dq/dt) (hereafter sometimes simply "h"), i.e. a combination of Hamilton functions with respect to the variant q and differential dq/dt; and an inertial tensor operator 236 for generating a second rank inertial tensor R(g).

In other words, the Jacobian operator 230 processes the pulse signals q1, q2, q3 from the encoder-1, encoder-2, encoder-3 to obtain a valued Jacobian J(g) for a current position of a three-dimensional X-Y-Z coordinate system associated with the hand 215, relative to a coordinate system associated with each motor 213, 217, 220, for a later-described calculation of torque moments to be output from the motors 213, 217, 220.

The obtained Jacobian J(g) is output to a matrix inversion operator 241, where it is processed to obtain an inverse matrix $J^{-1}(g)$ of J(g), and a matrix transposition operator 243, where it is processed to obtain a transposed matrix $J^T(g)$ of J(g). The obtained matrices $J^{-1}(g)$ and $J^T(g)$ are output to a motor torque calculator 250, which includes a control signal generation circuit of the controller 225.

The differentiator 232 differentiates the pulse signals q1, q2, q3 from the encoder-1, encoder-2, encoder-3 to obtain their differentials, which are output to the Hamiltonian operator 234 and the motor torque calculator 250.

The Hamiltonian operator 234 processes the pulse signals q1, q2, q3 from the encoder-1, encoder-2, encoder-3 and the differentials from the differentiator 232 to obtain a valued Hamiltonian h to be employed in calculation of a Coriolis force, a centrifugal force and a viscous friction force. The obtained Hamiltonian h is output to the motor torque calculator.

The load cell 218 outputs electric signals representing X, Y and Z components of external force F applied by the worker to the work and those of associated torsional stresses N, which signals are output to the motor torque calculator 250.

The motor torque calculator 250 employs a combination of the inversed Jacobian $J^{-1}(g)$, transposed Jacobian $J^T(g)$, differentials of q, Hamiltonian h and inertial tensor R(g) for processing the X, Y and Z components of F and N to determine the external force F in terms of a combination T of corresponding torque moments of the motors 213, 217, 220, such that:

$$\tau = J^T(\theta)\begin{bmatrix} F \\ N \end{bmatrix},$$

where, $\theta$ is a position representative angle of the X-Y-Z coordinate system determined from the pulse signals of encoders, and bracket [ ] is a matrix operator for processing data F, N in a well-known manner.

Then, the controller 225 outputs current signals via amplifiers 213A, 217A, 220A to the motors 213, 217, 220 for generating a combination $-\tau$ of inverse moments to thereby assist the worker.

Figure 18:
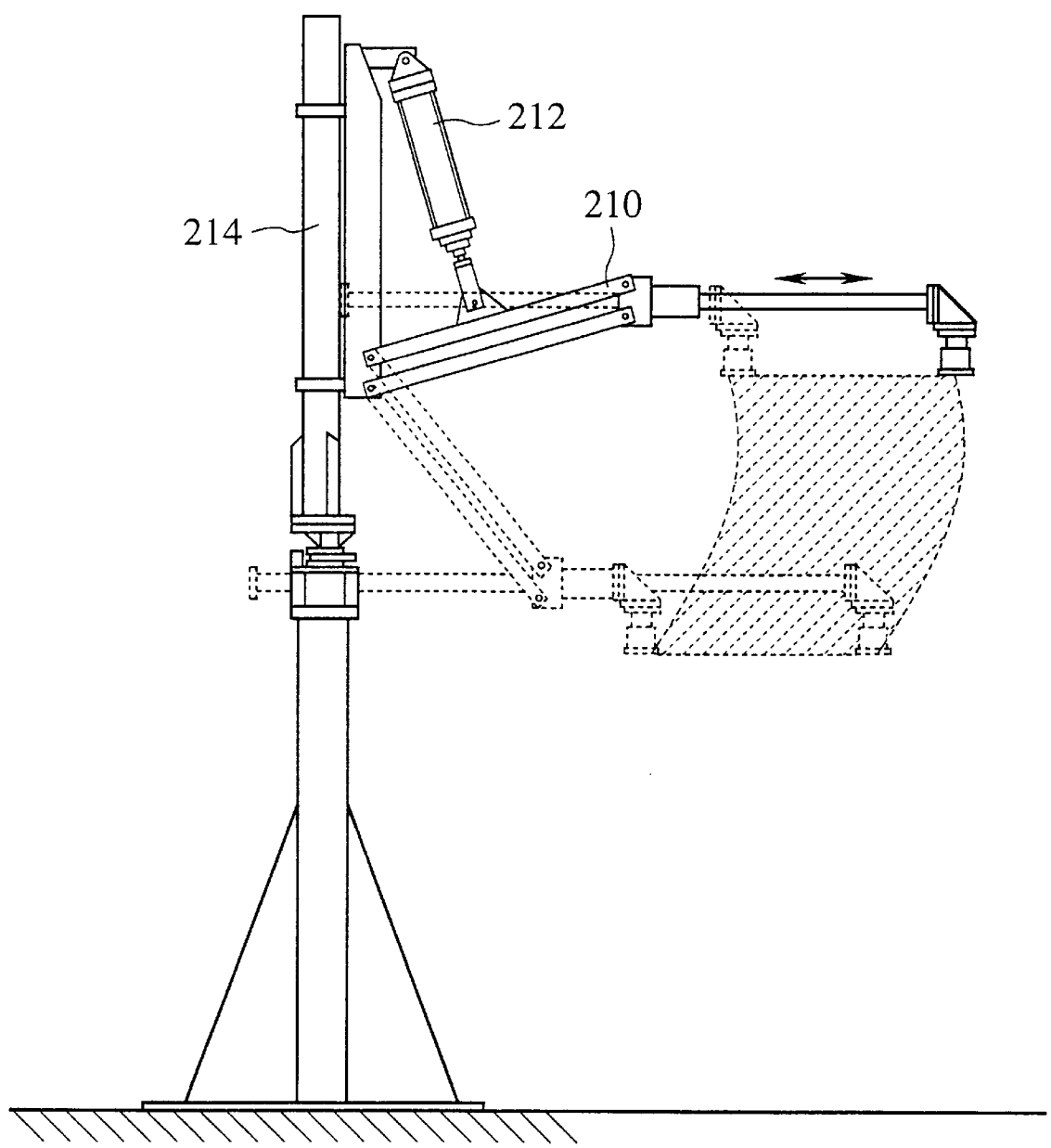
FIG. 18 illustrates a motion of a power-aided transfer assist arm device for a comprehensive comparison with the assist arm device of FIG. 16.

Effects of the assistance will be seen, when the device of FIG. 16 is compared with a similar device shown in FIG. 18, which illustrates a possible motion range in broken lines.

When a more sophisticate service is required, the controller 225 is operative in a following principle.

With respect to an arbitrary axis of coordinate x, the work follows an equation of motion, such that:

$$F = M_w(d^2x/dt^2) + D(dx/dt) + Kx,$$

where Mw is a mass of the work, D is a frictional factor, and K is an elastic factor.

For a favorable reduction of load, K=0, D=0 and Mw should be a possibly smaller value M (to achieve a maximal reduction of load), so that:

$$F = M(d^2x/dt^2). \tag{1}$$

On the other hand, the concerned arms meet an equation of motion, such that:

$$\tau = \{J0 + R(g)\}(d^2q/dt^2) + h + G(q), \quad (2)$$

where J0 represents an inertial moment of each arm, and G(q) is a weight term.

From (1) and (2), it so follows that:

$$\tau = [h + G(q) - \{J0 + R(g)\}J^{-1}(g)\{dJ(g)/dt\}(dq/dt) + [\{J0 + R(g)\}J^{-1}(g)M^{-1} - J^T(g)]]F.$$

As the weight balancing cylinder 212 is operated, $$\tau = [h - \{J1 + R(g)\}J^{-1}(g)\{dJ(g)/dt\}(dq/dt) + [\{J0 + R(g)\}J^{-1}(g)M^{-1} - J^T(g)]]F$$

In a right side of this expression, respective terms and factors except M are input to the motor torque calculator 250, which thus additionally inputs a mass representative signal to determine τ. As a result, the motors 213, 217, 220 are controlled to output a combination −τ of inverse toque moments.

The motor torque calculator 250 may include regulation means for regulating magnitudes of assist torque moments −τ to a proportion P selectable by motors in accordance with a preference of the worker, such that $0 \leq P \leq 1$.

The regulation means may comprise data on a number of selective multiplication factors voluntarily readable for additional calculation to determine the proportion P in the motor torque calculator 250, or one or more manually controllable potentiometers installed in circuits from the motor torque calculator 250 to the current amplifiers 213A, 217A, 220A, or manually controllable current control elements installed in circuits between the amplifiers 213A, 217A, 220A and the motors 213, 217, 220.

According to the embodiment, even when handling work of a large mass Mw, its inertial forces are automatically cancelled, thus permitting a facilitated quick handling in every directions such as for horizontal, vertical and oblique movements of the work.

Moreover, adequate assistant forces are generated simply when an external force F is applied to a work, permitting a stable transfer of the work.

Further, such the assistant forces are regulatable in accordance with a preference of a worker.

Still more, an employed constitution is very simple and inexpensive in comparison with a complex robot, permitting a multiplicity of such devices to be arranged in a production facility to achieve an increased working efficiency with a limited cost.

There will be described below a transfer assist arm device with a work positioning function according to a fourth embodiment of the invention, with reference to FIGS. 19 to 26.

In the present embodiment, the transfer assist arm device is proposed as a standing type that stands on a stationary place, permitting a stationary arrangement of connection and communication members.

The assist arm device can accept a teaching by a worker, and learn and replay a taught performance including a positioning to an instructed location.

The assist arm device is adaptive on the one hand for a cooperation with a worker to reduce a burden the worker bears when transferring a heavy or weighty work, and on the other hand for an automatic motion to replay the taught performance for positioning a work.

The cooperation is backed up with a weight balancing function, and a control mode using this function will sometimes be called "assist mode".

The automatic motion is supported by a robot function, and a control mode using this function will sometimes be called "positioning mode".

The assist mode may preferably be selected when a relatively difficult service is required, such as for a final position to be established.

The positioning mode may preferably be selected when a relatively facile service is required, such as for a work transfer.

Figure 19:
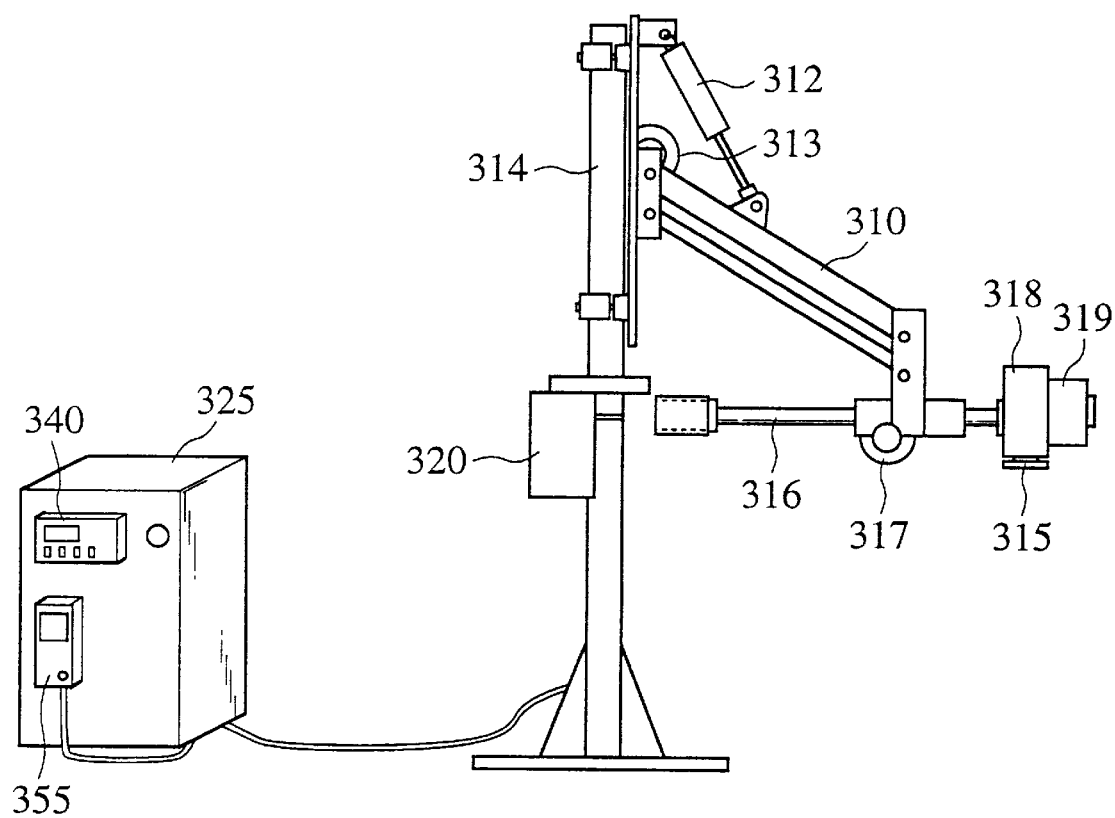
FIG. 19 is a side elevation of a transfer assist arm device with a work positioning function according to a fourth embodiment of the invention.

FIG. 19 is a side elevation of the transfer assist arm device.

As shown in FIG. 19, the assist arm device has a vertically swingable arm 310 provided with a weight balancing or cancelling cylinder 312. The arm 310 is driven by a motor 313 to vertically move along a principal axis 314.

The arm 310 carries at an end portion thereof a horizontal arm 316, which is operable for forward and backward movements of a hand 315, by driving with a motor 317. The hand 315 is provided with an operation panel 319. The hand 315 is rotatable about an axis of the horizontal arm 316, by an operation of a motor 318. The swingable arm 310 is adapted to turn about the principal axis 314, by a motor 320. The four motors 313, 317, 318, 320 have their clutches, as will be described. A member representative of the principal axis 314 is provided with an air motor for assisting the arm 310 to turn.

The assist arm device is connected to a controller 325 that controls revolutions of the four motors 313, 317, 318, 320, which motors are each comprised of a low-output servo motor of a 80W. The controller 325 has on a front side thereof a control panel 340 and a teaching pendant 355.

Figure 20:
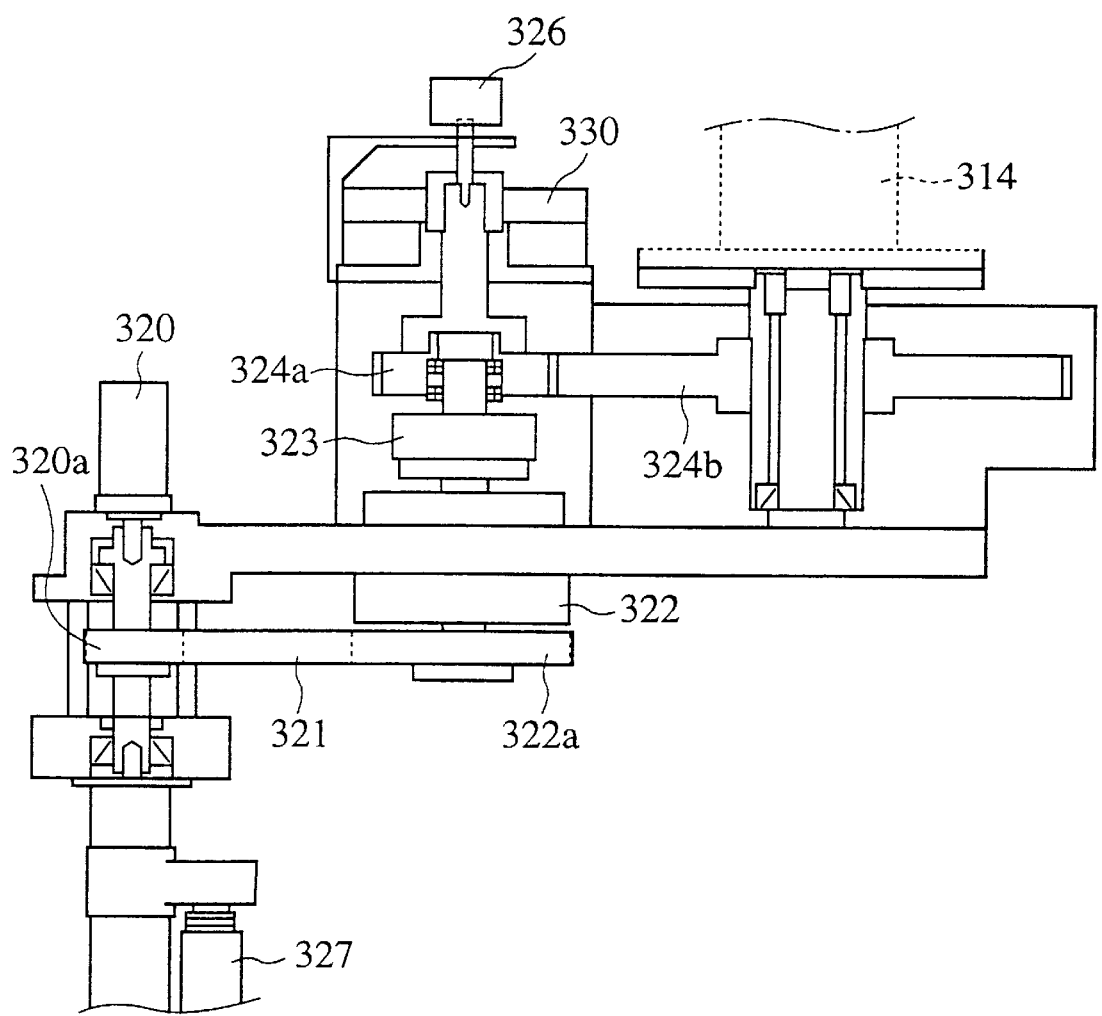
FIG. 20 illustrates a gearing associated with a principal axis of the assist arm device of FIG. 19.

FIG. 20 illustrates a gearing associated with the principal axes 314.

The motor 320 is provided with a pulley 320a connected by a toothed belt 321 to a pulley 322a of a reduction gear 322, of which an output shaft has a clutch 323 fitted thereon and intermeshed via gears 324a, 324b with the principal axis 314. A shaft of the gear 324a is coupled with an encoder 326 for an indirect detection of an angular position of the principal axis 314, and with a brake 330 for braking the shaft.

As the motor 320 rotates, the clutch 323 drives the principal axis 314, causing the arm 310 to turn. While the clutch 323 is disengaged, the arm 310 is free.

An output shaft of the motor 320 is coupled with an air motor 327, which supports a turning of the arm 310, alone or in combination with the motor 320. Other three axes have no air motor.

The three axes (i.e. swing axis of the arm 310, axis of the arm 316 for forward and backward movements, rotation axis of the hand 315) each have a similar gearing to the principal axis 314.

Figure 21:
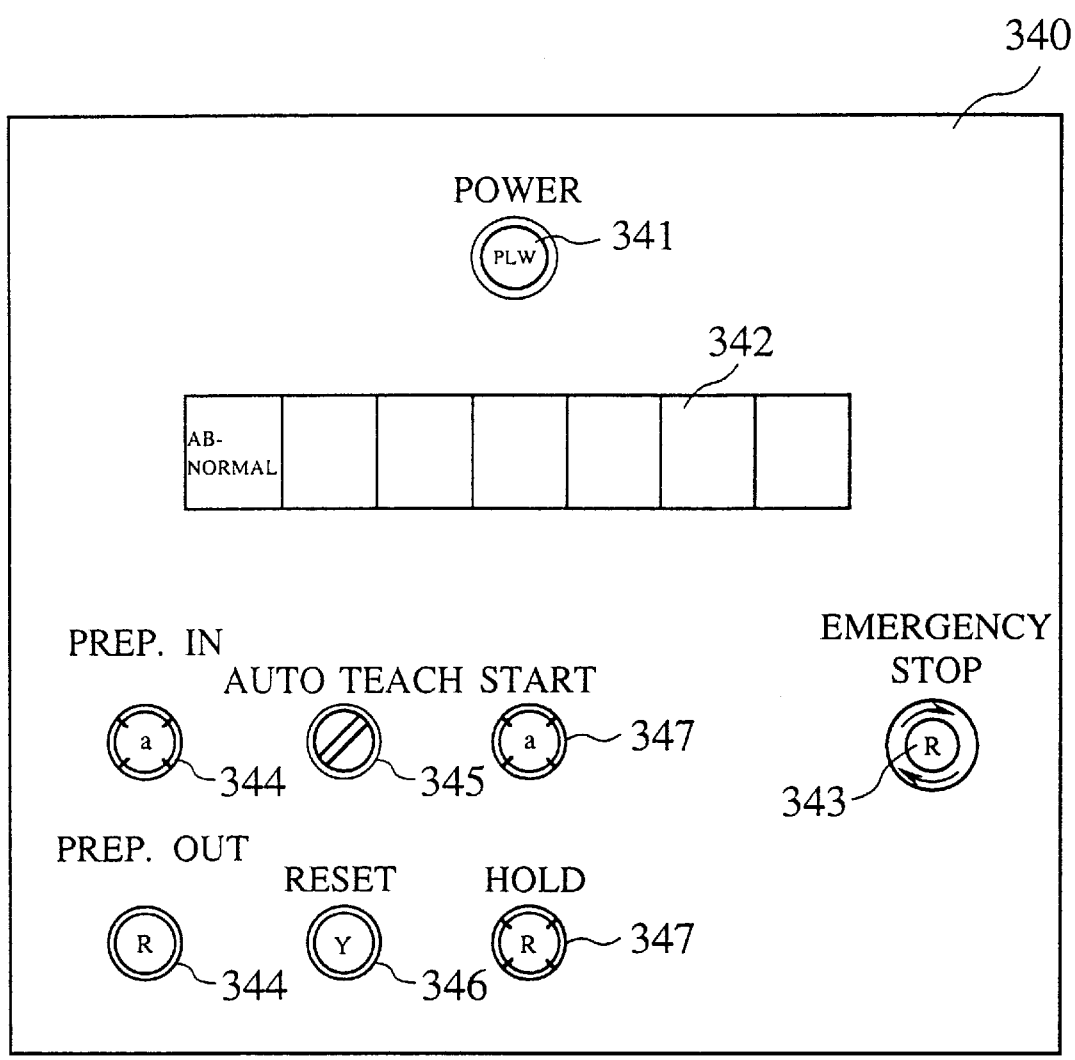
FIG. 21 is a front view of a control panel provided on a controller of the assist arm device of FIG. 19.

FIG. 21 shows a layout of switch buttons on the control panel 340 provided on the controller 325.

A power lamp 341 goes on with power connected. An array 342 of indicator lamps displays an operation state of the assist arm device. An emergency stop button 343 is operable for an emergency stop. Preparation-in and preparation-out buttons 344 are operable for setting the assist arm device ready to an operation and for ending the operation.

A select switch 345 is for selecting one of an automatic mode and a teaching mode.

Figure 22:
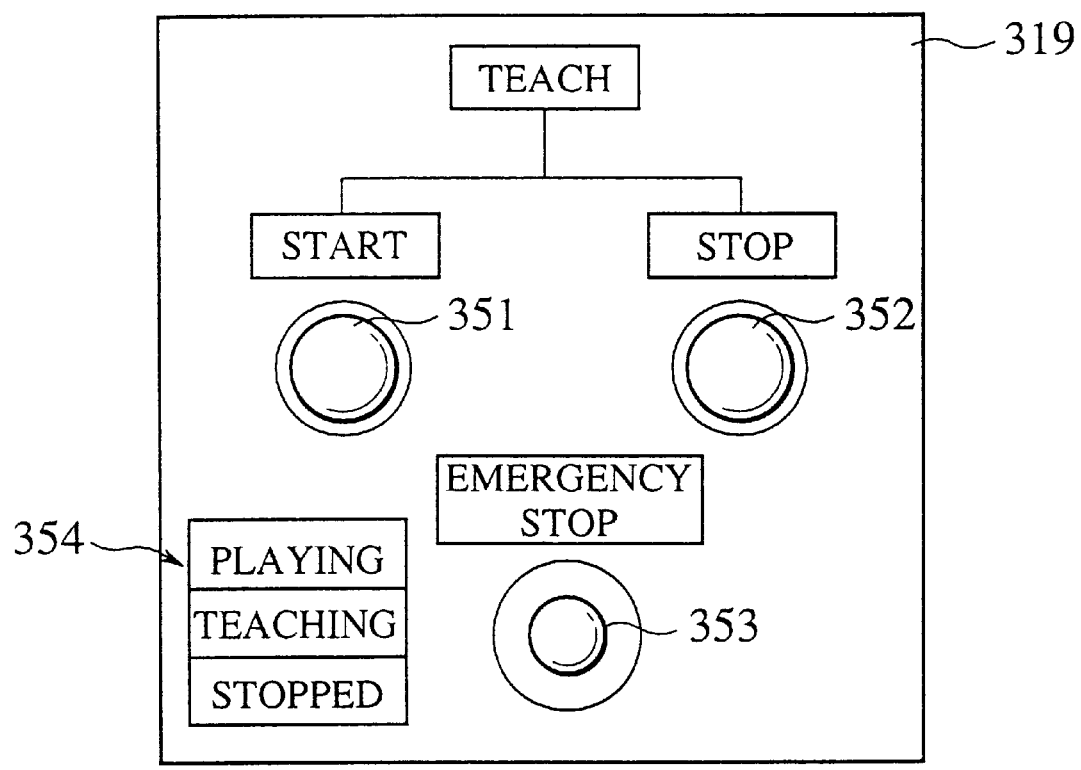
FIG. 22 is a front view of an operation panel provided for a hand of the assist arm device of FIG. 19.

An abnormal reset switch 346 resets various status such as when the indicator lamp 342 is lit with a trouble, and associated status of the controller 325. Start and hold buttons 347 are operable to bring the assist arm device into a motion and to hold the motions FIG. 22 shows a layout of switch buttons on the operation panel 319 provided for the hand 315.

A start button 351 is operable for entering the mode, as the select switch 345 on the control panel 340 is set to the automatic mode, and for storing coordinate data of taught points, as the select switch 345 is set to the teaching mode.

A stop button 352 is operable for entering the assist mode, as the select switch 345 is in the automatic mode. If the select switch 345 is in the teaching mode, the stop button 352 is operable together with the start switch 351 for storing coordinate data of a final taught point.

An emergency stop button 353 is for an emergency stop. A column 354 of indicator lamps display operation status such as a replaying, a teaching or a stopped state.

Figure 23:
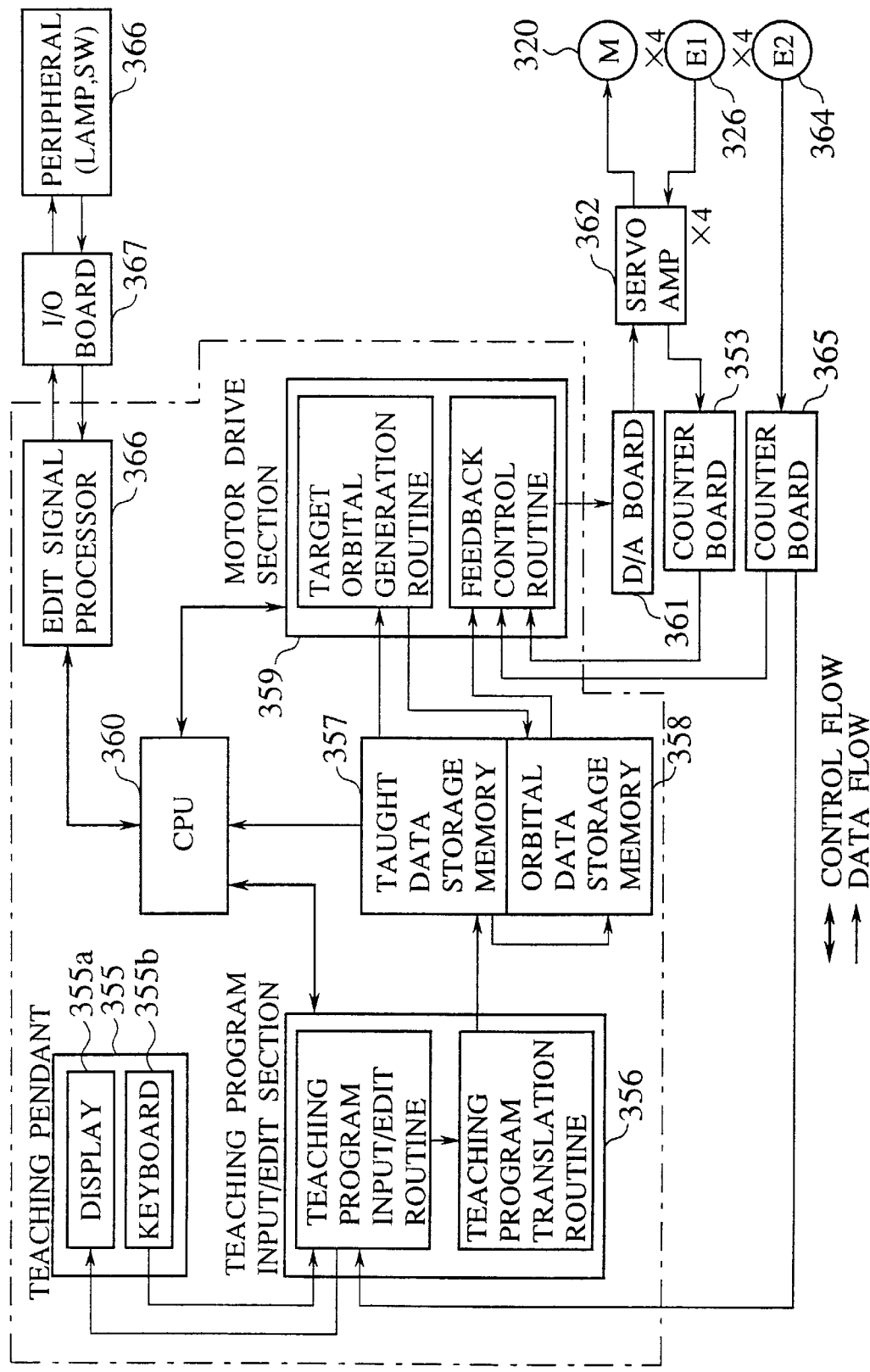
FIG. 23 is a block diagram of a control system of the assist arm device of FIG. 19.

FIG. 23 is a block diagram of a control system of the assist arm device.

The teaching pendant 355 is connected to the controller 325, and serves for convenient operations such as when entering the teaching mode, and for a manual operation to bring the assist arm device into a motion. Like operations are covered by the operation panel 319 also, as described.

The teaching pendant 355 has a display 355a for taught data, and a keyboard 355b operable to output editorial instructions.

A teaching program input/edit section 356 has a teaching program input/edit routine and a teaching program translation routine. The former routine is for editing a teaching program, following instructions from the keyboard 355b, as well as for inputting a current position in a clutch open state from a later-described counter board 365 to grasp the position. The latter routine employs an original point teaching program of the former routine, for translating taught data to permit a processing at a CPU (central processing unit) 360.

A taught data storage memory 357 stores the taught data, as they are translated by the translation routine. An orbital data storage memory 358 stores orbital data of the hand 315.

A motor drive section 359 has a target orbital generation routine and a feedback control routine. The former routine reads position data from the taught data storage memory 357 to generate orbital data, which are output to the orbital data storage memory 358. The latter routine reads from the this memory 358 some orbital data as target orbital data and inputs data on the current position from two counter boards 353, 356, for generating velocity data from differences between the target orbital data and the current position data.

The teaching program input/edit section 356 and the motor drive section 359 are controlled by the CPU 360 in a concentrated manner. The CPU 360 reads taught data from the taught data storage memory 358.

The velocity data generated by the feedback control routine are output to a D/A (digital to analog) board 361, where they are processed to output analog velocity commands to servo amplifiers 362. Each servo amplifier 362 inputs a position signal from an associated encoder (e.g. 326) that indirectly detects a position of an associated axis. The amplifier 362 controls actions of an associated servo motor (e.g. 320) for driving the associated axis. The encoder 326 on axis of the servo motor 320 outputs a pulse signal, which is input to the counter board 353, where it is counted to provide the current position data to be supplied to the feedback control routine.

An encoder 364 directly detects the position of axis, and outputs a pulse signal to the counter board 365, where it is counted to provide the current position data to be supplied to the teaching program input/edit routine, while the current position data from this counter board 365 are effective in the clutch-open state. The servo amplifiers (e.g. 362), servo motors (e.g. 320) and encoders (e.g. 326) are each provided four in total, as four sets for the four axes.

An edit signal processor 366 is controlled with a command signal from the CPU 360, to drive peripheral 368 via an I/O (input/output) board 367. The peripheral 368 includes an unshown solenoid valve of the air-motor 327, the clutch 323, the brake 330, etc.

Figure 24:
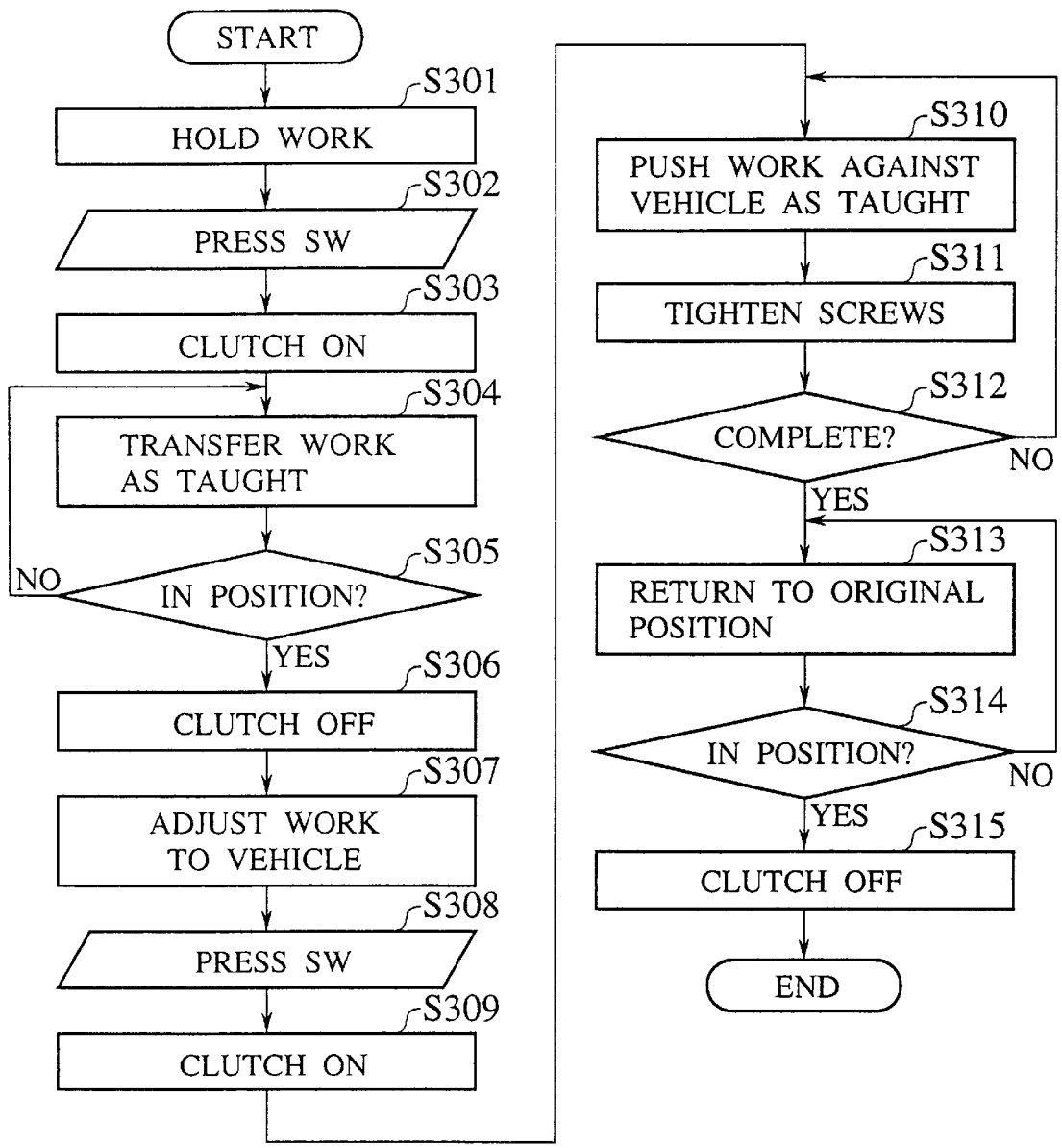
FIG. 24 is a flow chart of operations associated with an axis of rotation of the assist arm device of FIG. 19.
Figure 25:
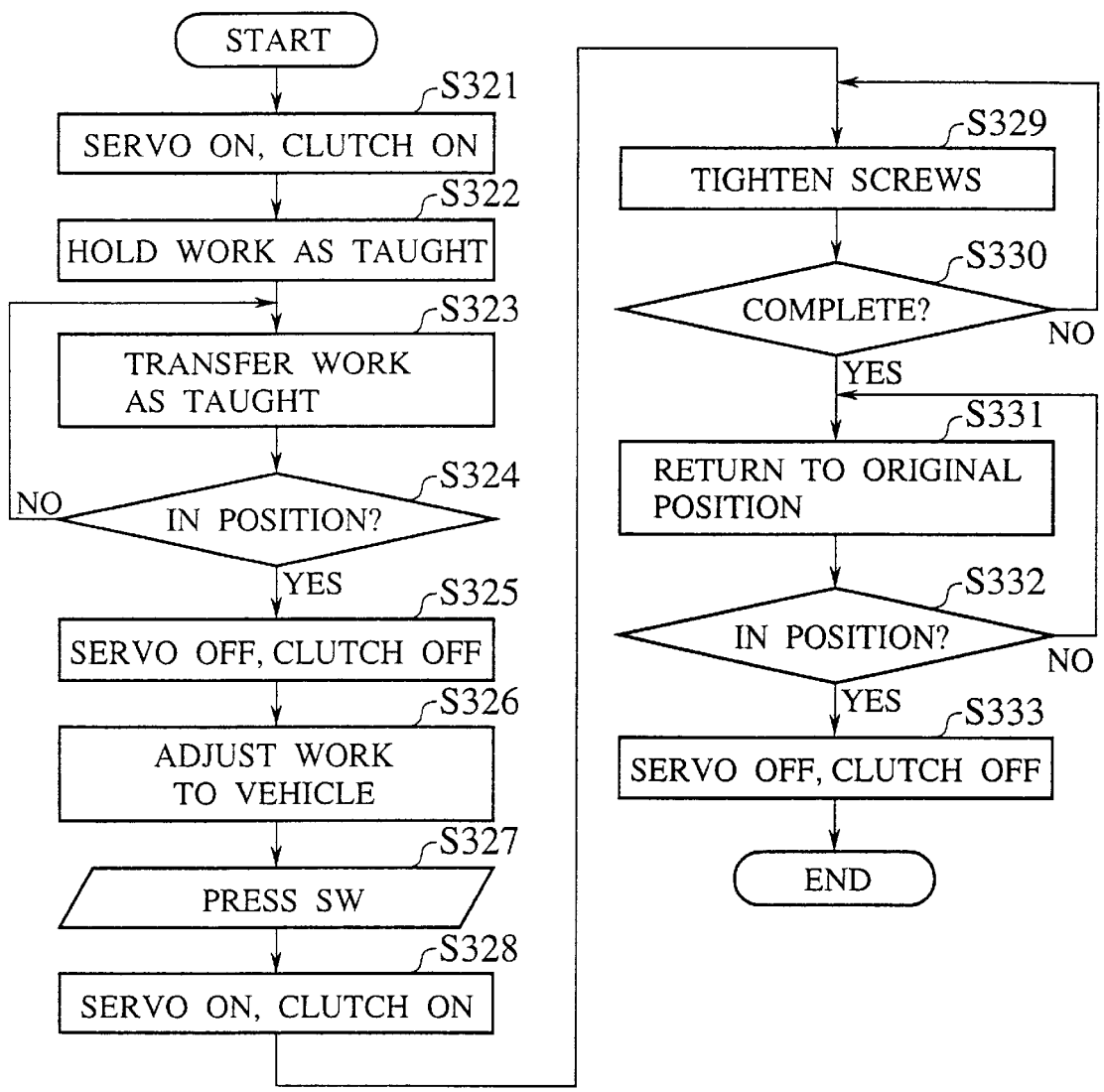
FIG. 25 is a flow chart of control actions for a service of the assist arm device of FIG. 19, in which a worker performs a screw tightening of a work.
Figure 26:
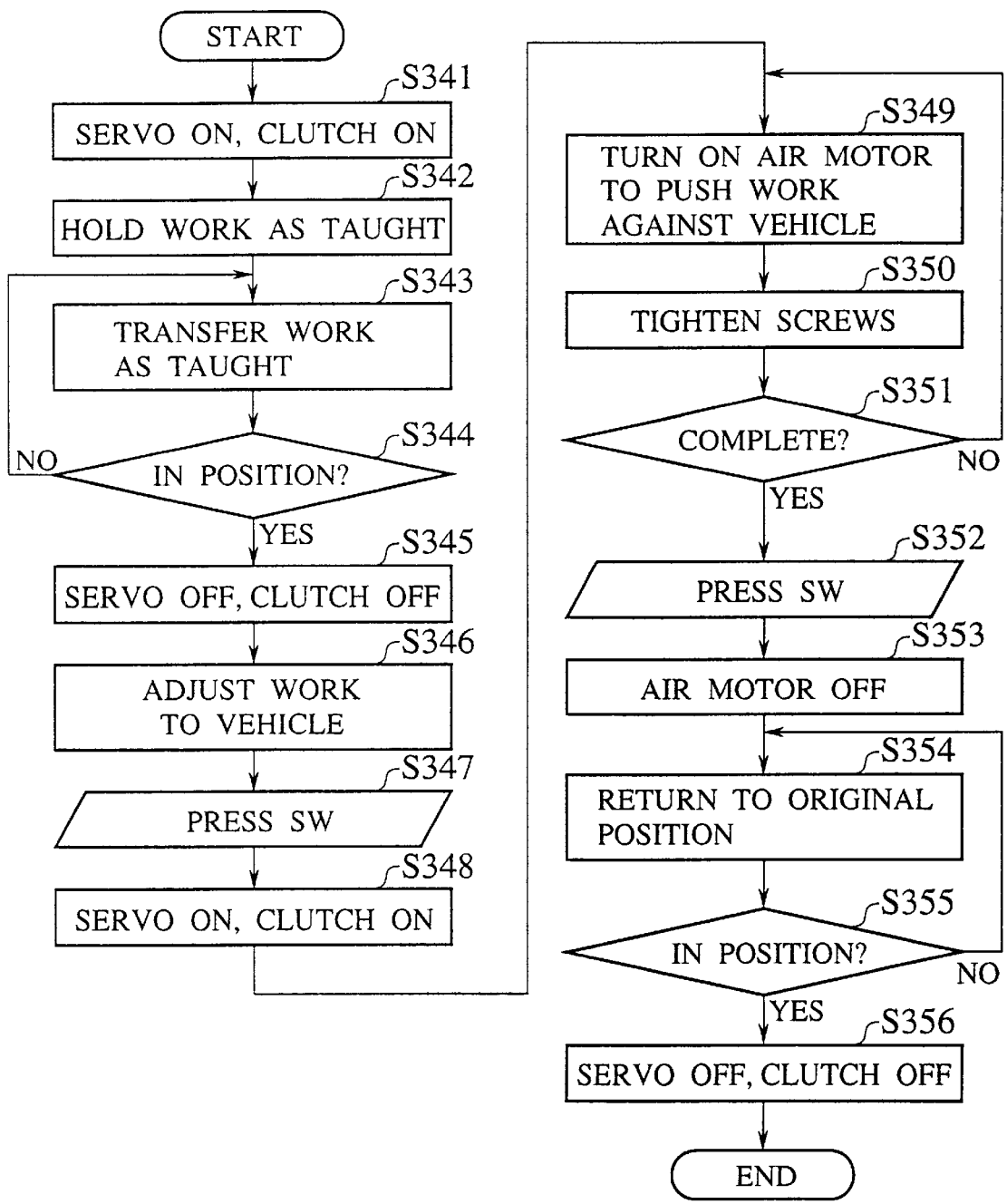
FIG. 26 is a flow chart of control actions for a service of the assist arm device of FIG. 19, in which an air motor is employed when pushing a work against a vehicle.

FIGS. 24 to 26 shows flow charts of control actions for services of the assist arm device, in which a work placed on a bench for temporary placement is clamped and screwed to a vehicle body.

In the flow chart of FIG. 24, such a procedure is described for a single axis.

The assist arm device is now in the assist mode, as the start button 351 of the operation panel 319 has not been pressed.

At a step S301, a worker A manually actuates the assist arm device so that the hand 315 grips or holds the work placed on the temporary bench.

Then, at a step S302, the worker A presses the start button 351.

At a step S303, the CPU 360 turns the clutch 322 on.

At a step S304, the motor drive section 359 reads and processes position data of the taught data storage memory 357 and orbital data of the orbital data storage memory 358, driving motors at respective axes, automatically transferring the work to a predetermined position, threading through obstacles, avoiding hitting them.

Accordingly, the assist arm device is set to the positioning mode until the work arrives the predetermined position at a step S305. A feedback control for the positioning is thus performed by cooperation of the feedback control routine, D/A board 361, servo amplifiers 362, encoders 326, 364, and count boards 353, 365.

At a step S306, as the work is transferred in position, the clutch 322 is automatically turned off, and the assist arm device is again set to the assist mode.

At a step S307, another worker B manually actuates the assist arm device so that the work is in a predetermined position relative to the vehicle.

At a step S308, the start button 351 is pressed again.

At a step S309, the clutch 322 is turned on, and the assist arm device is again set to the positioning mode.

Then, at a step S310, the motor drive section 359 reads and processes position data of the taught data storage memory 357 and orbital data of the orbital data storage memory 358, driving the motors at respective axes, pushing the work against the vehicle with a preset force. And screws are applied and tightened at a step S311.

As the work is pushed against the vehicle, associated services are facilitated, in contrast to conventional services in which a work to be screwed is manually pushed in a direction opposing the gravity, or put in a transfer movement, to be followed for a screw tightening.

As a service is completed at a step S312, the flow goes to a step S313, where the assist arm device is controlled with taught data to return to an original position.

As the device has come in position at a step S314, the clutch 322 is turned off at a step S315, and the assist mode is recovered.

The assist mode and the positioning mode are thus selected in a voluntary manner, permitting a heavy work to be transferred along a narrow route without binding, or to be fixed at a fixing position in a facilitated manner.

In other words, the assist arm device is set to the positioning mode to provide a service in which a worker is weak, and to the assist mode to provide a possible assistance for a service in which it is weak but for which the worker has a forte, e.g. when screwing a soft or flexible work.

In the flow chart of FIG. 25, a worker simply performs a screw tightening of a work in a process.

At a step S321, as the process has started, servo motors at respective axes turn on, and the clutch 322 also.

At a step S322, the assist arm device is controlled with position data from the taught data storage memory 357 and orbital data from the orbital data storage memory 358, so that the motors at respective axes are driven to make the hand 315 hold the work.

At a step S323, the work held by the hand 315 is automatically transferred to a predetermined position.

As the work has arrived in position at a step S324, the servo motors are turned off, and concurrently the clutch 322 is turned off at a step S325, so that the assist mode is automatically set up.

Hitherto, a robot may follow like steps.

At a step S326, the worker manually actuates the assist arm device so that the work is in a predetermined position relative to the vehicle.

At a step S327, the start button 351 is pressed again.

At a step S328, the clutch 322 is turned on, and the assist arm device is again set to the positioning mode.

Then, the motor drive section 359 reads and processes position data of the taught data storage memory 357 and orbital data of the orbital data storage memory 358, driving the motors at respective axes, pushing the work against the vehicle with a preset force. And screws are tightened at a step S329.

As the work is pushed against the vehicle, associated services are facilitated, in contrast to conventional services in which a work to be screwed is manually pushed in a direction opposing the gravity, or put in a transfer movement, to be followed for a screw tightening.

As a service is completed at a step S330, the flow goes to a step S331, where the assist arm device is controlled with taught data to return to an original position.

As the device has come in position at a step S332, the clutch 322 is turned off at a step S333, and the assist mode is recovered.

In the flow chart of FIG. 26, the air motor 327 is added for pushing a work against the vehicle.

At a step S341, as a process has started, servo motors at respective axes turn on, and the clutch 322 also.

At a step S342, the assist arm device is controlled with position data from the taught data storage memory 357 and orbital data from the orbital data storage memory 358, so that the motors at respective axes are driven to make the hand 315 hold the work.

At a step S343, the work held by the hand 315 is automatically transferred to a predetermined position.

As the work has arrived in position at a step S344, the servo motors are turned off, and concurrently the clutch 322 is turned off at step S345, so that the assist mode is automatically set up.

Hitherto, a robot may follow like steps.

At a step S346, the worker manually actuates the assist arm device so that the work is in a predetermined position relative to the vehicle. In doing so, the worker is better and faster than the device would.

At a step S347, the start button 351 is pressed again.

At a step S348, the clutch 322 is turned on, and the assist arm device is again set to the positioning mode.

Then, the motor drive section 359 reads and processes position data of the taught data storage memory 357 and orbital data of the orbital data storage memory 358, driving the motors at respective axes, pushing the work against the vehicle with a preset force.

Concurrently, at a step S349, the air motor 327 is turned on to auxiliarily push the work against the vehicle, whereby the servo motors are allowed to have a limited capacity even if a relatively large pushing force is required, and the servo amplifiers also are permitted to have a suppressed capacity for controlling such the servo motors. Moreover, the worker is permitted to employ such assistances in accordance with his or her preference for the convenience of necessary actions, so that the worker may use both hands to provide a preferable service. Like this, screws are tightened at a step S350.

As a service is completed at a step S351, the flow goes to a step S352, where the start button 351 is pressed, then at a step S353, the air motor 327 is turned off.

At a step S354, the assist arm device is controlled with taught data to return to an original position.

As the device has come in position at a step S355, the servo motors and the clutch 322 are turned off at a step S356, and the assist mode is recovered.

Incidentally, the assist arm device is adapted to be taught a transfer path, like a robot.

For this teaching, the select switch 345 on the control panel 340 is set in the teaching position.

Then, the servo motors and the clutch 322 are turned off, and the assist arm device enters the assist mode, where the worker is permitted to grasp and voluntarily move the hand 315. As the clutch 322 is off, the reduction gear 323 is disengaged, permitting a light actuation of the hand 315 irrespective of a gear ratio. If another axis has a clutch, this also is turned off.

The worker brings an arm end to a positioning point, so that the hand 315 is put in position. To teach the point, the start button 351 of the operation panel 319 is pressed. Then, position data of respective encoders (e.g. 364) are input via the counter boards 8e.g. 365) to the teaching program input/edit section 356. Positions of respective axes are represented by encoder values. In replay, the taught encoder values are processed to provide like values to the encoders at respective motors For respective points to be taught, like operations are repeated. At a final point, the stop button 352 is pressed together with the start button 351, so that the teaching ends.

According to the embodiment, an assist arm device is adapted to serve at a time as a mere assist arm, at a time like a robot, and at a time for an effective assistance to a worker. Therefore, the assist arm device is permitted to cooperate with a worker in a complementing manner for services in which a man is weak (e.g. in transfer of a heavy work along a narrow route) or a robot is weak (e.g. when fixing a soft or flexible work), or which is difficult for a man to do alone (e.g. for fixing a heavy work, lifting by hand).

Moreover, the arm device does not need a complex mechanism nor complicated control system, thus permitting an inexpensive fabrication, a multi-point layout in a production site with a limited cost, with an increased working efficiency.

There will be described below a positioning assist arm device according to a fifth embodiment of the invention, with reference to FIGS. 27 to 35.

In the present embodiment, the transfer assist arm device is mounted on a follower which travels typically in parallel and synchronizm with a main transfer device (or line) so that the latter is followed by the former. The follower may come behind, go ahead of, move around, or depart from the main transfer device, as circumstances require e.g. for going to take a work. In a case, the follower may be followed by a sub-follower carrying a lot of works. One point is a necessary control connection to the assist arm device on the moving follower. A radio control may sometimes be preferable, but sometimes not.

The assist arm device can accept a teaching by a worker, and learn and replay a taught performance including a positioning to an instructed location.

The assist arm device is adaptive on the one hand for a cooperation with a worker to reduce a burden the worker bears when transferring a heavy or weighty work, and on the other hand for an automatic motion to replay the taught performance for positioning a work.

The cooperation is backed up with a weight balancing function, and a control mode using this function will sometimes be called "assist mode".

The automatic motion is supported by a robot function, and a control mode using this function will sometimes be called "positioning mode".

The assist mode may preferably be selected when a relatively difficult service is required, such as for a final position to be established.

The positioning mode may preferably be selected when a relatively facile service is required, such as for a work transfer.

Figure 27:
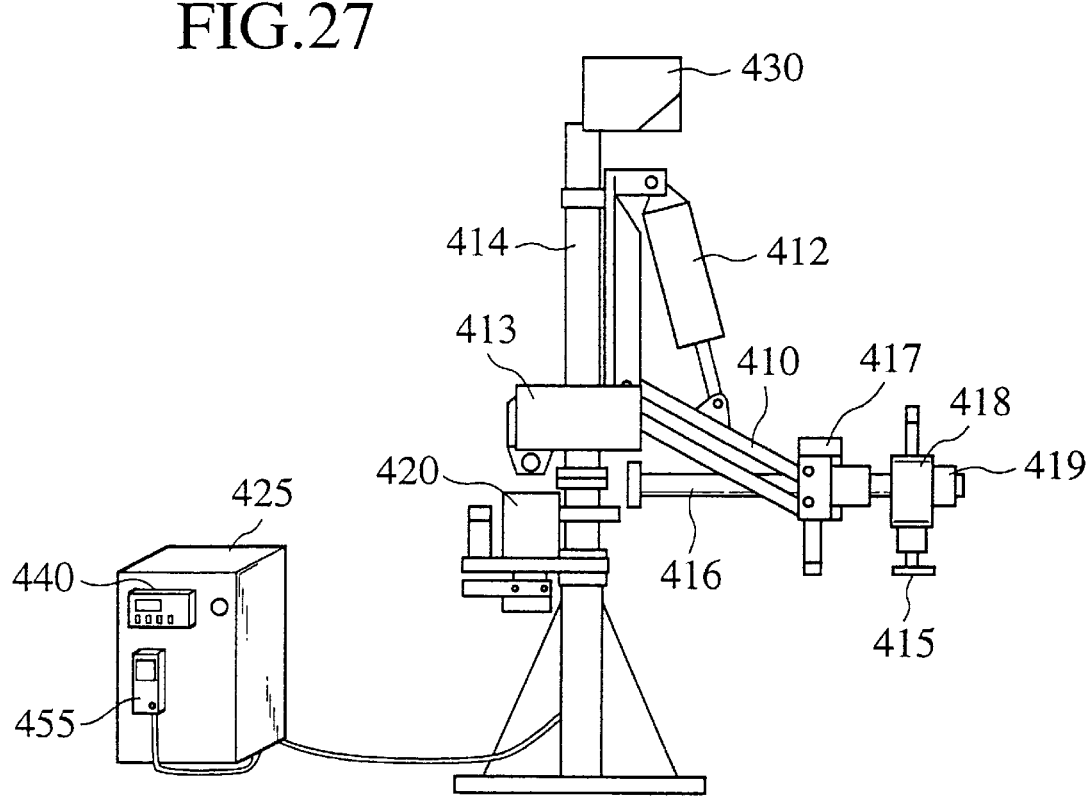
FIG. 27 is a side elevation of a positioning assist arm device mounted on a follower according to a fifth embodiment of the invention.

FIG. 27 is a side elevation of the transfer assist arm device.

As shown in FIG. 27, the assist arm device has a vertically swingable arm 410 provided with a weight balancing or cancelling cylinder 412. The arm 410 is driven by a motor 413 to vertically move along a principal axis 414.

The arm 410 carries at an end portion thereof a horizontal arm 416, which is operable for forward and backward movements of a hand 415, by driving with a motor 417. The hand 415 is provided with an operation panel 419. The hand 415 is rotatable about a vertical axis by an operation of a motor 418. The swingable arm 410 is adapted to turn about the principal axis 414, by a motor 420. The principal axis has at a top thereof an infrared sensor 430 attached thereto and integrally rotatable therewith, which sensor 430 detects a proximity of an obstacle and outputs a detection signal. The four motors 413, 417, 418, 420 have their clutches.

The assist arm device is connected to a controller 425 that processes stored data and various input data and signals such as from the infrared sensor 430 and later-described switches to control revolutions of the four motors 413, 417, 418, 420, which motors are each comprised of a low-output servo motor of a 80W. The controller 425 has on a front side thereof a control panel 440 and a teaching pendant 455.

Figure 28:
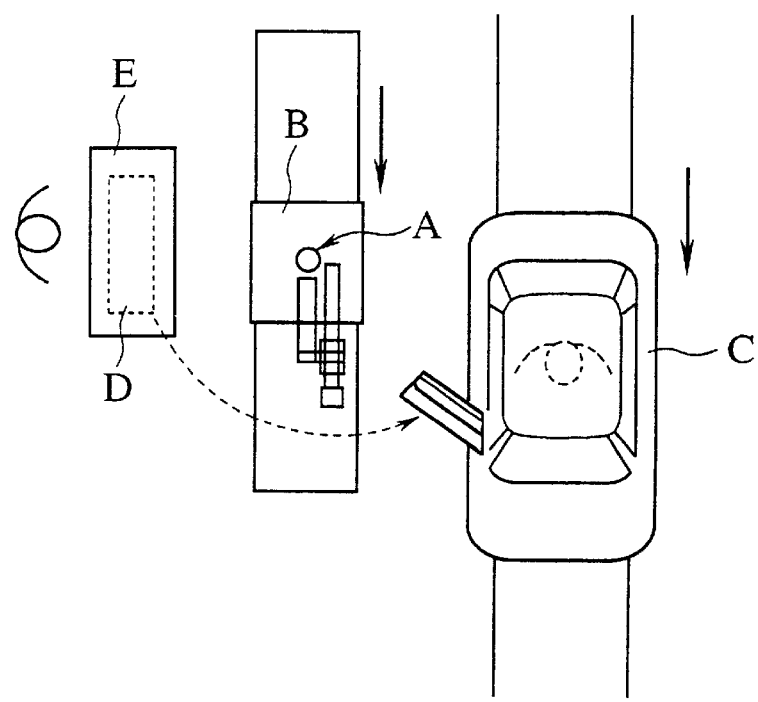
FIG. 28 is a plan of a man-machine section including the assist arm device of FIG. 27.

FIGS. 28 illustrates a plan of a vehicle fabrication stage in a sub-section of the man-machine section F22 (see FIG. 3).

In FIG. 28, designated at reference character A is the assist arm device in concern, and B is the follower on which the device A is mounted. The follower B is driven to synchronously follow a body C of a vehicle placed on a main transfer line for a constant ceaseless transfer.

This stage includes two workers cooperating with each other: one serves at or on a sub-stand (i.e. work assembly bench or stand) E for assemblying a work D into a subassembled state, which work D is carried by the assist arm device A to an adequate location near or in the vehicle body C; and the other receives the work D from inside the vehicle body C to take it in or guids the work D inside the vehicle body C, and applies and fixes to a predetermined position inside the vehicle body C.

Figure 29:
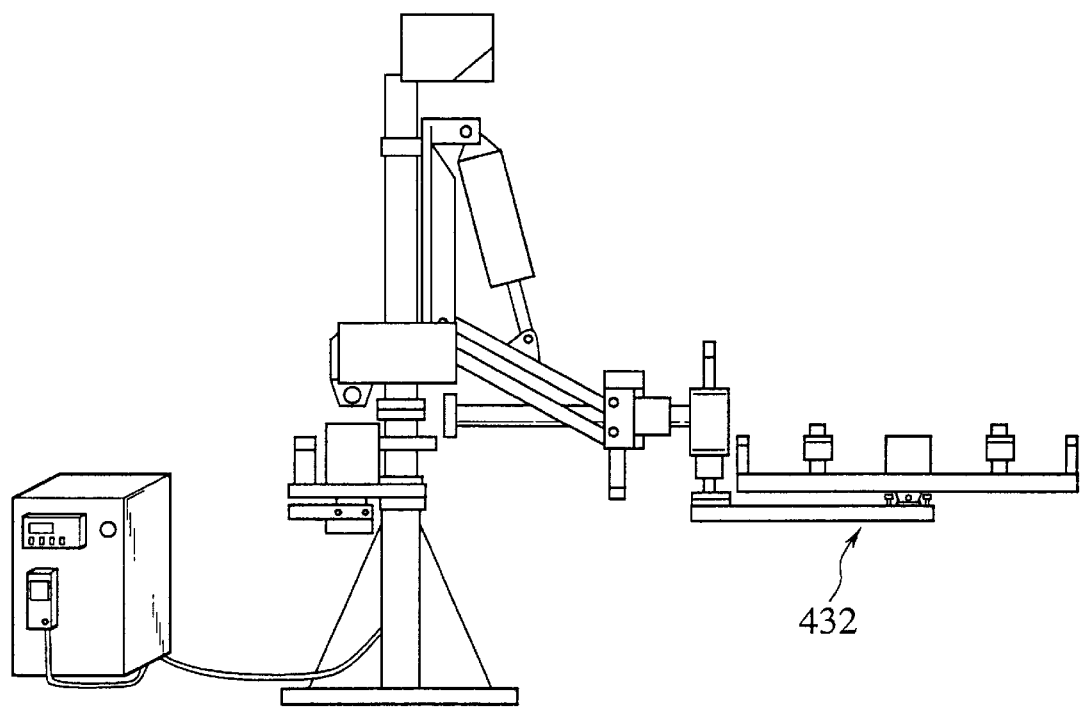
FIG. 29 is a side elevation of the assist arm device of FIG. 27, with a hand assembly attached.
Figure 30A:
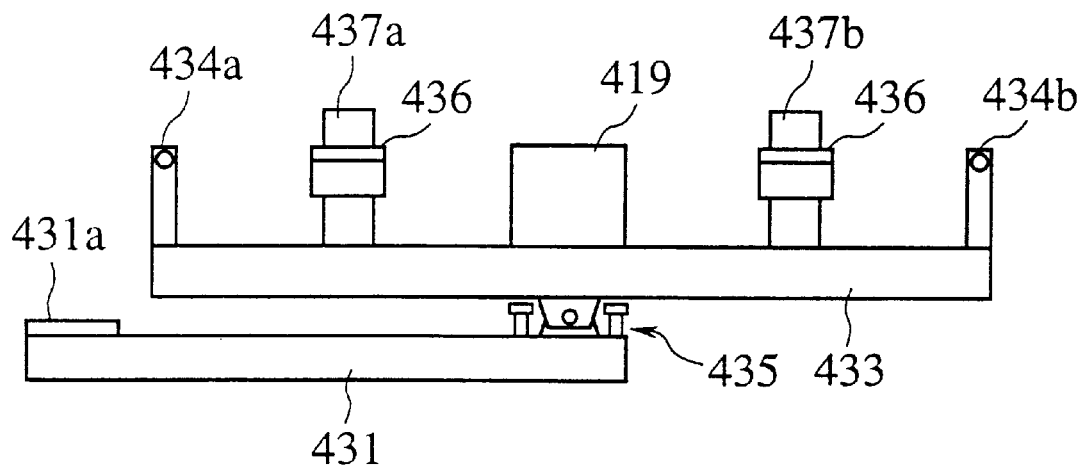
FIG. 30A is a front view of the hand assembly of FIG. 8.

FIG. 29 shows the assist arm device with a hand assembly 432 attached thereto. FIG. 30A is a front view of the hand assembly, and FIG. 30B, a side view thereof.

The hand assembly 432 comprises: a connection arm 431 as a horizontal extension member attached at one end thereof to the hand 415, via a mechanical interface 431a; a rockingly floating mechanism 435 provided at the other end of the connection arm 431; and a work support member 433 mounted on the floating mechanism 435.

The work support member 433 has thereon: pins 434a, 434b (hereafter collectively "434") disposed as locators at both ends thereof, to be employed as inserts such as to holes of the work, for locating the work in a desirable position; and jigs 437a, 437b (hereafter collectively "437") disposed between the pins 434 for receiving the work on their work support plates 436. The floating mechanism 435 serves, when the worker determines a matching position of the work relative to an interior member of the vehicle body, to facilitate the positioning.

Figure 30B:
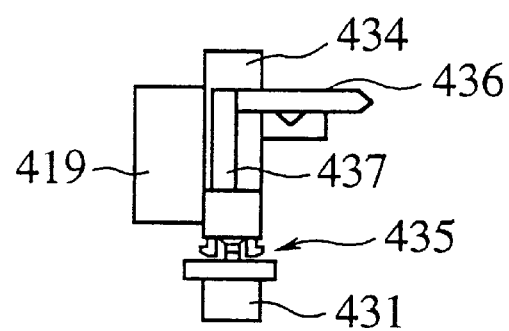
FIG. 30B is a side view of the hand assembly of FIG. 8.

In FIGS. 29, 30A and 30B, as the hand assembly 432 is attached to the assist arm device, the operation panel 419 is fixed thereto, i.e., to a central part of the work support member 433.

Figure 31:
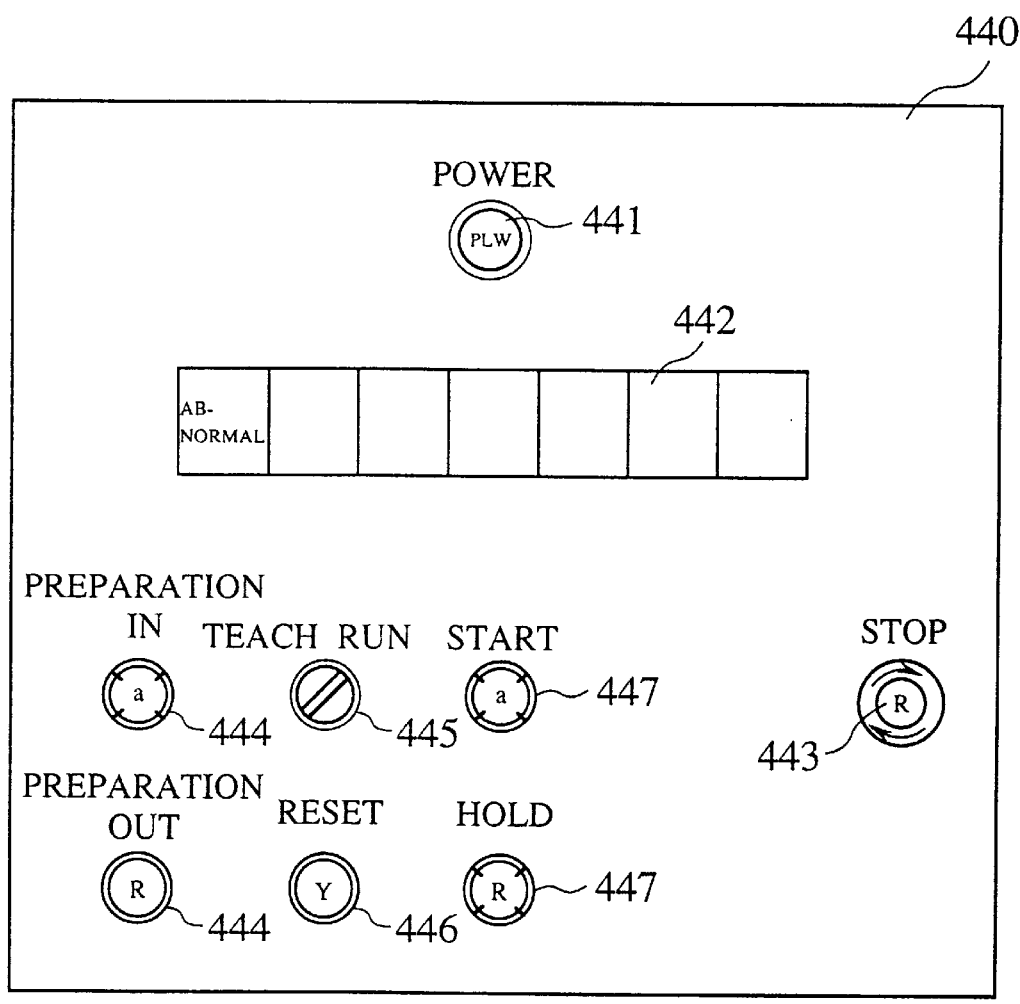
FIG. 31 is a front view of a control panel provided on controller of the assist arm device of FIG. 27.

FIG. 31 shows a layout of switch buttons on the control panel 440 provided on the controller 425.

A power lamp 441 goes on with power connected. An array 442 of indicator lamps displays an operation state of the assist arm device. An emergency stop button 443 is operable for an emergency stop. Preparation-in and preparation-out buttons 444 are operable for setting the assist arm device ready to an operation and for ending the operation.

A select switch 445 is for selecting one of an automatic mode (RUN) and a teaching mode (TEACH).

An abnormal reset switch 446 resets various status such as when an indicator lamp 442 is lit with a trouble, and associated status of the controller 425. Start and hold buttons 447 are operable to bring the assist arm device into a motion and to hold the motion.

Figure 32:
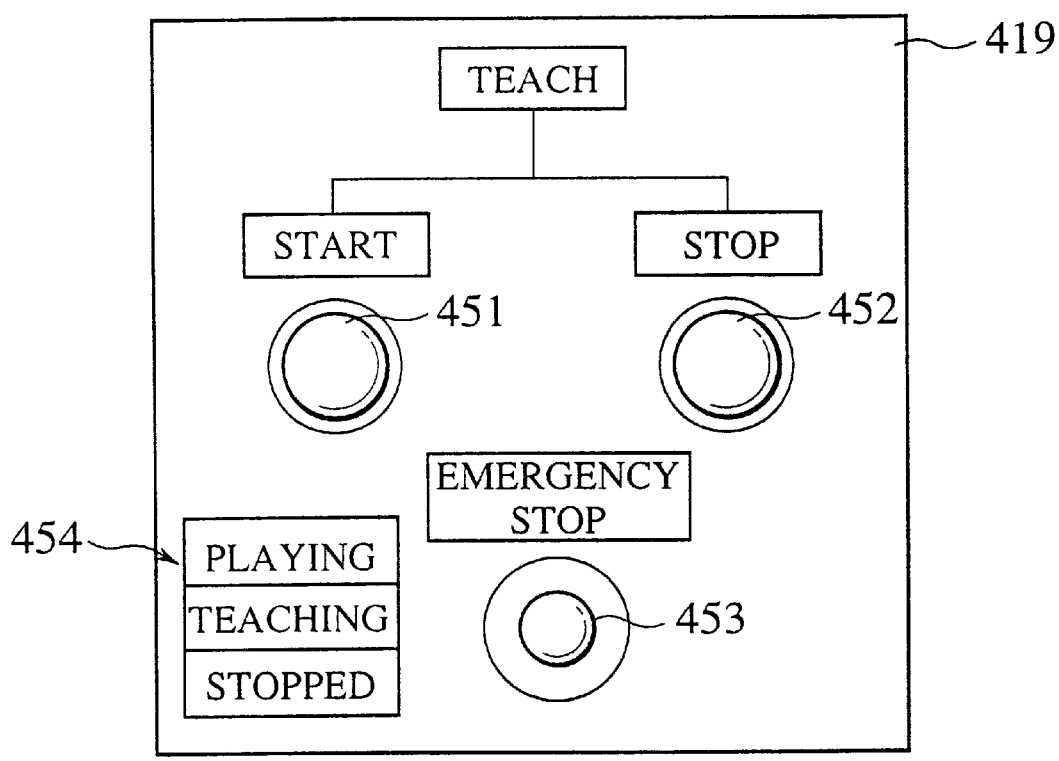
FIG. 32 is a front view of an operation panel provided for a hand of the assist arm device of FIG. 27.

FIG. 32 shows a layout of switch buttons on the operation panel 419 provided for the hand 415.

A start button 451 is operable for entering the positioning mode, as the select switch 445 on the control panel 440 is set to the automatic mode, and for storing coordinate data of taught points, as the select switch 445 is set to the teaching mode.

A stop button 452 is operable for entering the assist mode, as the select switch 445 is in the automatic mode. If the select switch 445 is in the teaching mode, the stop button 452 is operable together with the start button 451 for storing coordinate data of a final taught point.

An emergency stop button 453 is for an emergency stop. A column 454 of indicator lamps display operation status such as a replaying, a teaching or a stopped state.

Figure 33:
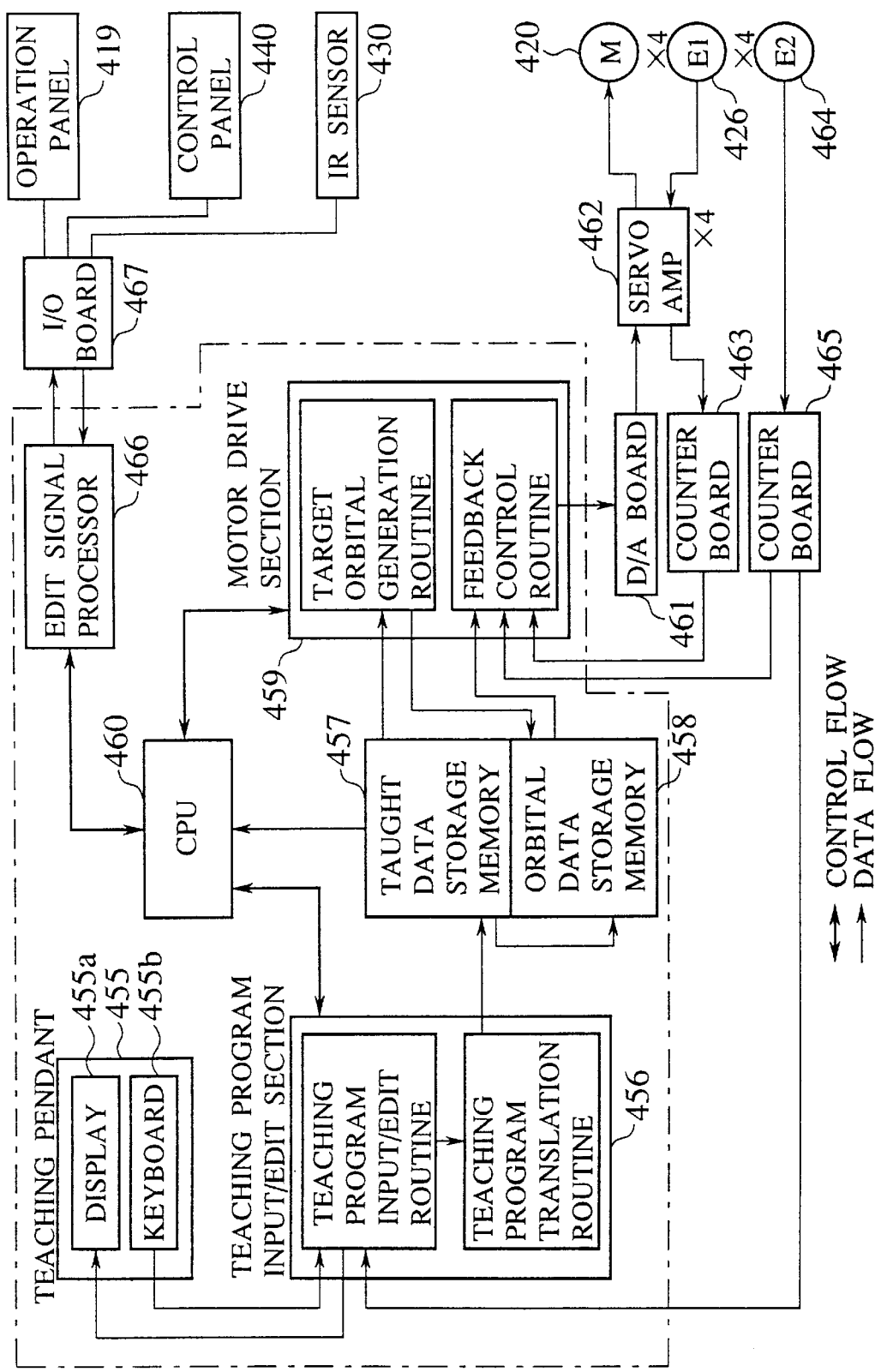
FIG. 33 is a block diagram of a control system of the assist arm device of FIG. 27.

FIG. 33 is a block diagram of a control system of the assist arm device.

The teaching pendant 455 is connected to the controller 425, and serves for convenient operations such as when entering the teaching mode, and for a manual operation to bring the assist arm device into a motion. Like operations are covered by the operation panel 419 also, as described.

The teaching pendant 455 has a display 455a for taught data, and a keyboard 455b operable to output editorial instructions.

A teaching program input/edit section 456 has a teaching program input/edit routine and a teaching program translation routine. The former routine is for editing a teaching program, following instructions from the keyboard 455*b*, as well as for inputting a current position in a clutch open state from a later-described counter board 465 to grasp the position. The latter routine employs an original point teaching program of the former routine, for translating taught data to permit a processing at a CPU 460.

A taught data storage memory 457 stores the taught data, as they are translated by the translation routine. An orbital data storage memory 458 stores orbital data of the hand 415.

A motor drive section 459 has a target orbital generation routine and a feedback control routine. The former routine reads position data from the taught data storage memory 457 to generate orbital data, which are output to the orbital data storage memory 458. The latter routine reads from the this memory 458 some orbital data as target orbital data and inputs data on the current position from two counter boards 463, 465, for generating velocity data from differences between the target orbital data and the current position data.

The teaching program input/edit section 456 and the motor drive section 459 are controlled by the CPU 460 in a concentrated manner. The CPU 460 reads taught data from the taught data storage memory 458.

The velocity data generated by the feedback control routine are output to a D/A board 461, where they are processed to output analog velocity commands to servo amplifiers 462. Each servo amplifier 462 inputs a position signal from an associated encoder (e.g. 426) that indirectly detects a position of an associated axis. The amplifier 462 controls actions of an associated servo motor (e.g. 420) for driving the associated axis. The encoder 426 on axis of the servo motor 420 outputs a pulse signal, which is input to the counter board 463, where it is counted to provide the current position data to be supplied to the feedback control routine.

An encoder 464 directly detects the position of axis, and outputs a pulse signal to the counter board 465, where it is counted to provide the current position data to be supplied to the teaching program input/edit routine, while the current position data from this counter board 465 are effective in the clutch-open state. The servo amplifiers (e.g. 462), servo motors (e.g. 420) and encoders (e.g. 426) are each provided four in total, as four sets for the four axes.

An edit signal processor 466 is controlled with a command signal from the CPU 460 to drive peripheral via an I/O board 467, as well as to input therethrough various signals from the operation panel 419, the control panel 440 and the infrared sensor 430.

FIG. 34 is a work category table listing principal services in the concerned stage, in which the assist arm device cooperates with the two workers cooperating with each other, as described.

A left-most column lists the services in a temporal order. The services wholly constitute a task in which a work placed on the sub-stand is carried by the assist arm device mounted on the follower into the vehicle body, where it is screwed. Of the two worker, that one engaged with a sub-assembly at the sub-stand is designated by A, and the other working in the vehicle body is designated by B. The assist arm device has an automatic mode where it is in the positioning mode, and a manual mode where it is in the assist mode.

As neither the start button 447 of the control panel 440 nor the start button 451 of the operation panel 419 has been pressed yet, the assist arm device is now in a standby state with servos on, waiting at an original position. The worker A at the sub-stand is assemblying a work to be fixed in the vehicle. The worker B is at some work, staying in the vehicle being transferred.

Now, as the work is assembled, the worker A operates the start button 451. The CPU 460 turns on the clutches at respective axes. The motor drive section 459 reads and processes position data of the taught data storage memory 457 and orbital data of the orbital data storage memory 458, driving the motors at respective axes, causing the hand 415 to access the sub-stand, which means the assist arm device is set in the positioning mode while it moves from the original position to the sub-stand.

During the movement, the infrared sensor 430 keeps watching for a proximity of a significant obstacle that may a person. Should a proximity of such an obstacle happen, the assist arm device stops its motion. It stops also when the emergency stop button 443 or 453 is pressed, as a matter of course.

As the hand 415 has come to a taught position, it stops there. Then, the worker puts the assembled work on the hand 415, before pressing the start button 451.

When this button 451 is pressed, the CPU 460 again turns the clutches on. The motor drive section 459 reads and processes position data of the taught data storage memory 457 and orbital data of the orbital data storage memory 458, driving the motors at respective axes, automatically driving the hand 415 to a taught position inside the vehicle, without interferences with obstacles, which means the assist arm device is set in the positioning mode until it reaches the taught position.

During this movement also, the infrared sensor 430 watches for a proximity of a significant obstacle. Should a proximity of an obstacle be found, the assist arm device stops its motion. It stops also when the emergency stop button 443 or 453 is pressed.

A feedback control for the positioning is performed by cooperation of the feedback control routine, D/A board 461, servo amplifiers 462, encoders 426, 464, and count boards 463, 465.

As the work is transferred in position (i.e. a taught point for a changeover to the manual mode), the clutches are automatically turned off, and the assist arm device enters the assist mode.

Then, the worker B manually actuates the assist arm device so that the work is in a required relative position to an opponent member in the vehicle, where it is screwed to be fixed by the worker B. During the fixing, the work is weight-balanced by the balancer 412.

The fixing is now over. The start button 451 is pressed by the worker B.

The CPU 460 checks numbers of pulses input to the counter board 465 to have data on a current position, compares these with position data in the taught data storage memory 457 to retrieve data of a nearest taught point, and drives the assist arm device thereto. Then, the motor drive section 459 reads and processes position data of the taught data storage memory 457 and orbital data of the orbital data storage memory 458, controlling the motors at respective axes, driving the arm device to the original position, avoiding obstacles.

The foregoing actions are performed, while the vehicle is followed by the follower on which the device stands. During cooperation with the worker B in the vehicle, the assist arm device is in the assist mode, where the servos are kept on, unless a significant obstacle is detected by the infrared sensor 430 or the emergency stop button 453 is operated. Therefore, the hand 415 is stable with a minimized irregular action.

Figure 35:
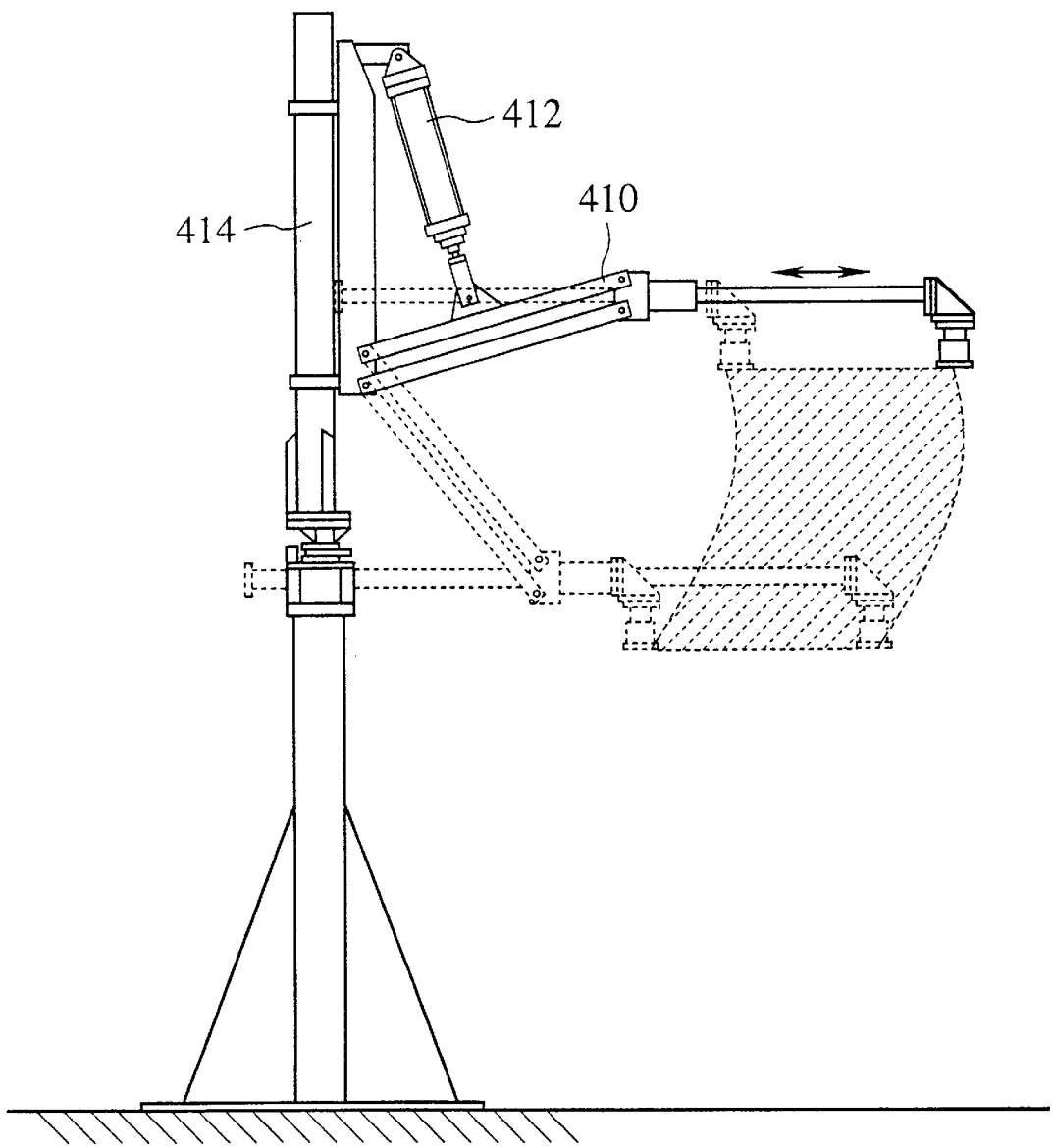
FIG. 35 illustrates a motion of an assist arm device for comparison with the assist arm device of FIG. 27.

Effects of the assist arm device in concern will be seen in contrast, when compared with an assist arm device of FIG. 35 in which a motion range is illustrated by broken lines.

According to the present embodiment also, an assist device is adapted to serve at a time as a mere assist arm, at a time like a robot, and at a time for an effective assistance to a worker.

Moreover, it allows an inexpensive fabrication, permitting a multi-point layout with a limited cost, with an increased working efficiency.

There will be described below an assist arm device with a flexible clearance according to a sixth embodiment of the invention, with reference to FIGS. 36 and later.

As used herein, the term "flexible" means "easily bendable and adaptable", and the "flexible clearance" means "an articulated arm easily bends with an adaptable clearance" permitting a final position of a work to be manually established in a facilitated manner even when a provisional position by an assistance of the arm has a relatively wide difference relative to a required position.

Such the flexibility may afford an over-flexed state. To avoid unfavorable flexed states, the assist arm device in concern has a position detector and a brake provided for a respective axis, as collectively shown at 508 and 507 in FIG. 36. If the detector detects an exceeding position, the brake stops a further motion of an arm about or along an associated axis. A controller 510 takes a decision on a basis of taught data about a permissible motion range. Therefore, the arm is prevented from naturally moving into an over-flexed state, such as when the device has failed to stand upright. As the arm can hold its temporal position, a worker is permitted to use both hands. The arm may serve for an accompanied transfer of a work through a tubular envelope of various permissible ranges, without an anxiety about interfering with obstacles.

The assist arm device is substantially analogous to that of the fifth embodiment, unless otherwise described.

Figure 36:
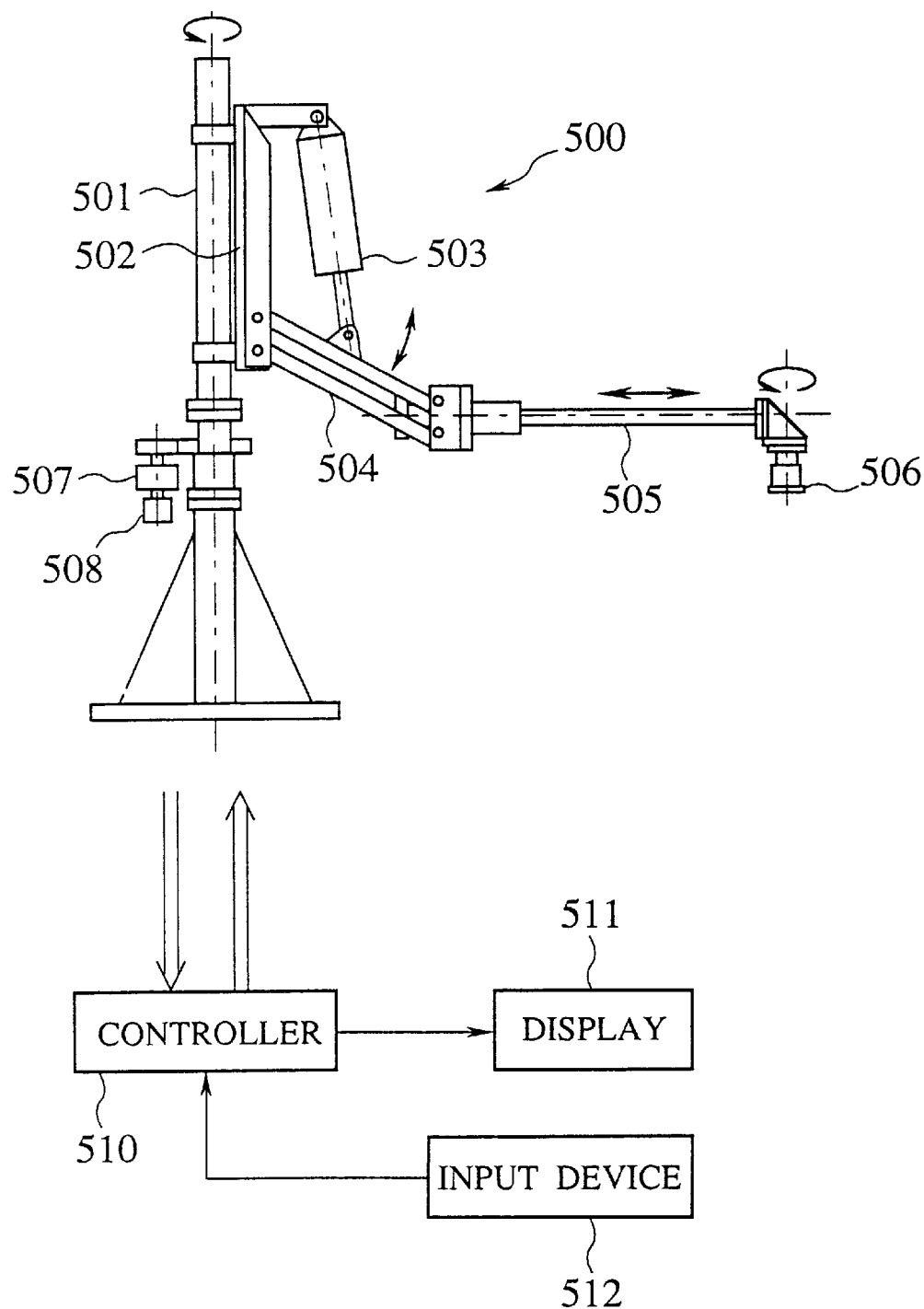
FIG. 36 is a side elevation of an assist arm device with a flexible clearance according to a sixth embodiment of the invention, and a schematic block diagram of a control system of the device.

FIG. 36 is a side elevation of the transfer assist arm device interfaced with a digital control system.

In FIG. 36, designated at reference character 500 is the assist arm device. Like the foregoing embodiments, the device 500 has a principal axis (member) 501 rotatable about a Z-axis together with a vertical frame 502 supporting a weight balancing cylinder 503 and a vertically swingable first arm 504. A distal end of the first arm 504 supports a horizontally driven reciprocatable second arm 505, of which a distal end supports a motor-driven hand 506 rotatable about a vertical axis.

Like other axes, the principal axis 501 has the position detector 508 and the brake 507.

The respective detectors 508 and the brakes 507 are individually interfaced with a control system analogous to that of the fifth embodiment. The control system includes the controller 510, an input device 512 for inputting position data and instructions, and a display 511 for displaying various associated information including a tubular transfer route.

Figure 37:
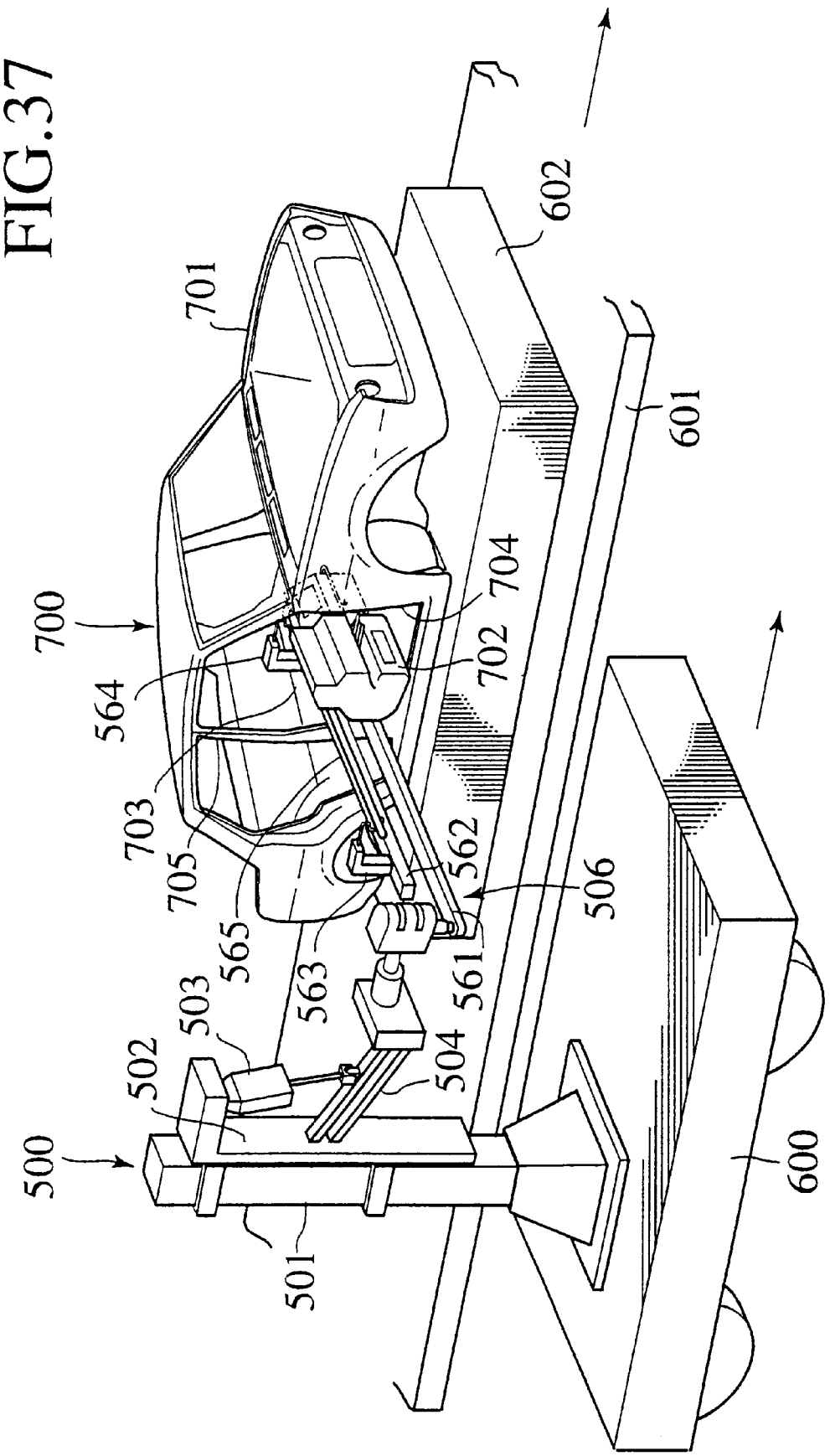
FIG. 37 illustrates a scene of a man-machine section in which the assist arm device of FIG. 36 is employed for application of an instrument panel into a vehicle body.

FIG. 37 illustrates a scene of a vehicle fabrication stage in a sub-section of the man-machine section F22 (see FIG. 3), in which the assist arm device 500 is mounted on a follower 600 that travels in parallel and synchronism with a main transfer line 601 of which a work stand 602 has a vehicle 700 placed thereon. Cooperating workers are not illustrated. Some parts have exaggerated dimensions for comprehension.

The vehicle 700 comprises a body 701 having a front door frame 704 and a center pillar 705. A rear seat member 703 is installed.

The hand 506 of the assist arm device 500 comprises a hand assembly including a connection member 561, and a work support member 562 rocking thereon or fixed thereto with vertical and horizontal support jigs 563, (564 [FIG. 37]), 565 fastened to be rigid for supporting a work 702.

In FIG. 37, the assist arm device 500 has already carried the work 702 from an original point into the vehicle 700, through a taught transfer route.

Figure 38:
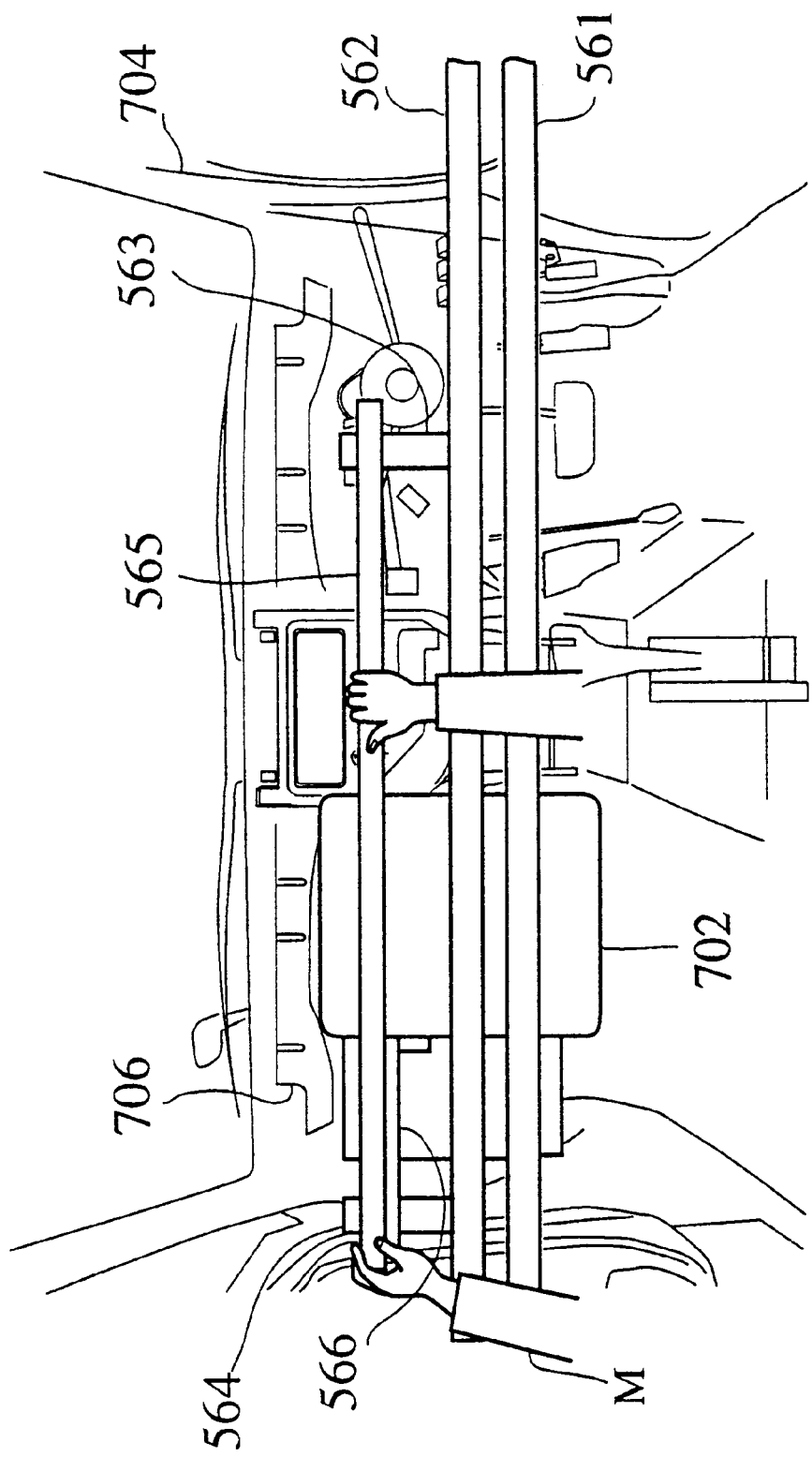
FIG. 38 is an inside view of the vehicle body of FIG. 37.

FIG. 38 is an inside of the vehicle 700.

The hand assembly has a horizontal left inspection jig horizontally slidable relative to a left vertical jig 564. The vehicle has a front instrument panel 706.

The work 702 is a finished module to be carefully fixed to the instrument panel 706, with a severe clearance. For the fixing, a worker M on the rear seat member extends both hands to grasp the horizontal jig 565 of the arm assembly, as it is in an assist mode, where it holds the work 702 in a taught position with a larger lateral clearance than the required severe clearance.

Therefore, the worker M establishes an adequate position, observing an edge of the work 702 from right behind.

When such a position is established, the worker M checks it by concurrently touching left end faces of the 15 horizontal jigs 565, 566, with a finger, thumb or palm of left hand, as the worker M is a right-hander. For a left-hander, a similar inspection jig may be provided at a right side. If the touched end faces feel flush without a gap, the check is over.

A vertical position is substantially established by the arm assembly, as it is made to flex to a vertical limit by the gravity, both when learning and when replaying.

Figure 39:
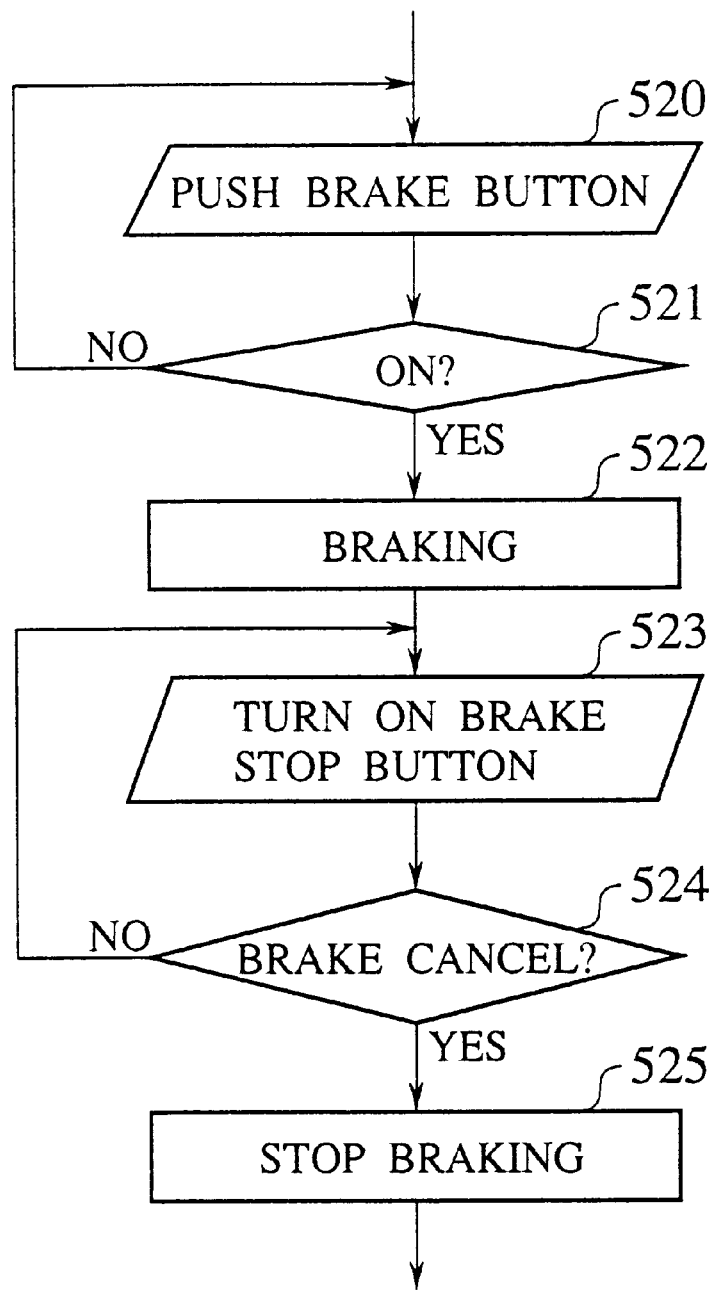
FIG. 39 is a partial flow chart of operations of the assist arm device of FIG. 36.

FIG. 39 is a partial flow chart associated with a teaching routine responsible for actions of a set of the position detector 508 and the brake 507.

At a step 520, a teaching worker pushes one of brake buttons provided on a control panel and an operation panel.

At a step 521, a CPU checks if the brake button is turned on.

If it is so, a braking to an associated axis is effected at a step 522.

At a step 523, as a due position seems to be recovered, the worker pushes one of brake stop buttons provided on the control panel and the operation panel.

At a step 524, the CPU checks if a brake cancellation is instructed.

If it is so, the braking is stopped at a step 525.

Figure 40:
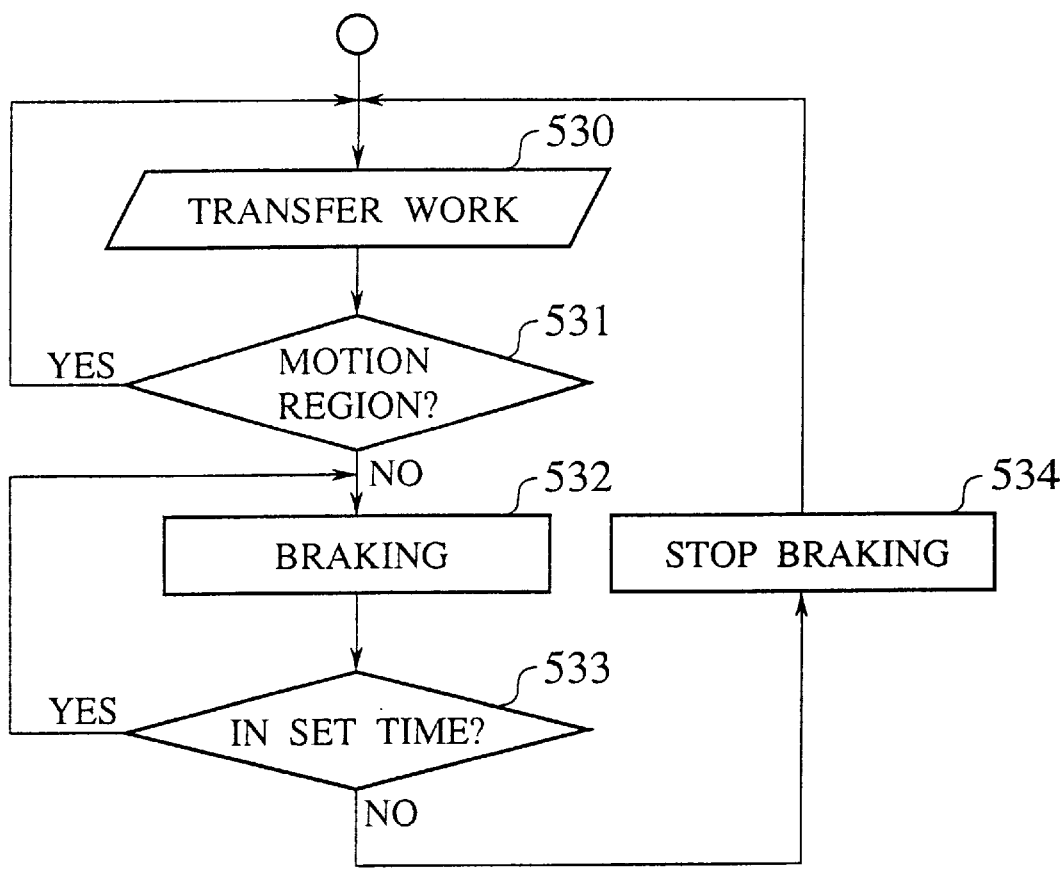
FIG. 40 is another partial flow chart of operations of the assist arm device of FIG. 36.

FIG. 40 is a partial flow chart associated with an automatic routine responsible for actions of a set of the position detector 508 and the brake 507.

At a step 530, the assist arm device 500 is controlled to transfer the work 702 through a taught transfer route, i.e. a tubular envelope of permissible motion ranges calculated from taught data and stored data.

At a step 531, the CPU checks if the hand assembly 506 with the work 702 is located with a permissible motion range.

If it is so, the flow again goes to the step 530. Unless it is so, the flow goes to a step 532 to effect a braking to an associated axis.

Then, at a step 533, an elapsed time is checked if it is still within a preset time.

If it is so, the flow again goes to the step 532. Unless it is so, the flow goes to the step 530.

It will be seen that the flow may be interrupted by a routine for the assist mode.

Figure 41:
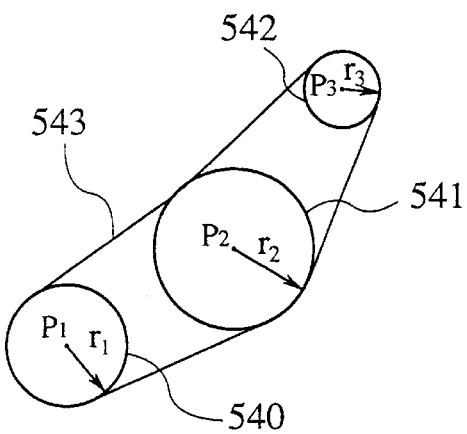
FIG. 41 is an illustration describing an interference region of the assist arm device of FIG. 36.
Figure 42:
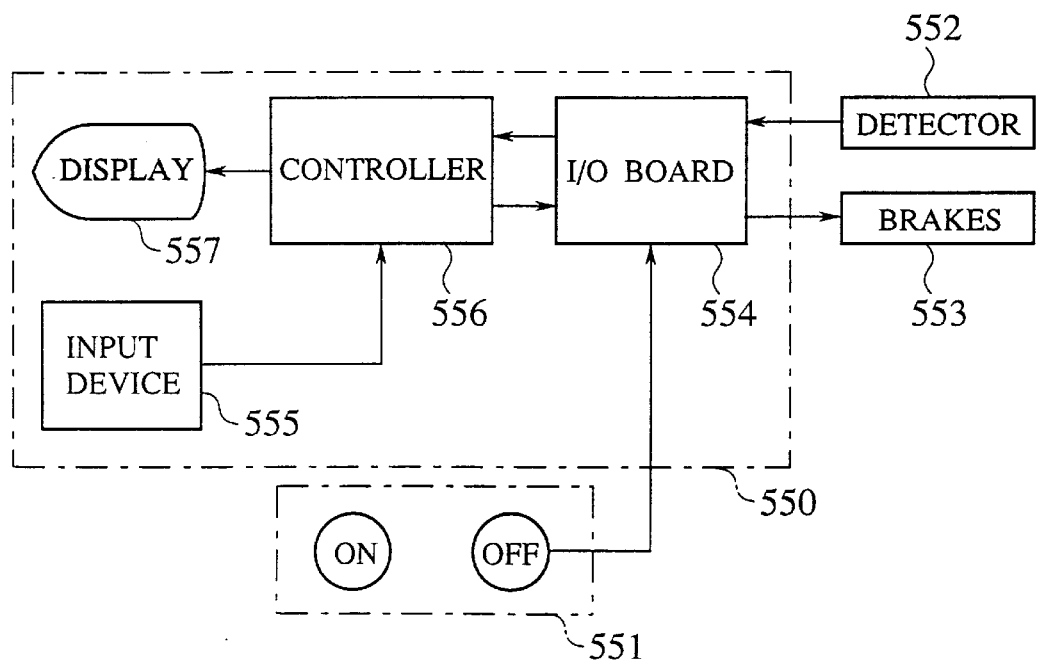
FIG. 42 is a block diagram of the control system of FIG. 36.

FIG. 41 is an illustration of part of the work transfer route, and FIG. 42 is a block diagram of an associated control system 550, which is analogous to the control system of FIG. 36.

As a teaching mode is selected, a teaching worker walks along a desirable transfer route, with hands driving the weight-balanced work so that the work moves with the worker, describing a transfer path, i.e. a set of loci of a spatial motion of the work.

At an adequate first point P1, the worker presses a start button (see FIGS. 31, 32) to teach the first point P1, then again presses the start button and keyboards from an input device 555 a first radius r1 representing a permissible motion range (as a circle) 540 about the first point P1, of which data is input to a controller 556 and displayed on a display 557. The worker checks a displaced data, and still again presses the start button to acknowledge the data, which is then stored.

If a decision to avoid an interference is severe, the worker may press the start button three times after the teaching of point P1, to have a variable radius vector (see FIG. 6) automatically calculated, needing a significant time for a dialogue with a computer.

It will be seen that the panels may each have an additional button dedicated for inputting a radius data.

Then, the worker goes straight so that the work arrives at an adequate second point P2, where the desirable transfer route turns at a different angle.

The second point P2 is now taught, together with an associated radius r2 defining a permissible motion range 541.

Then, the controller 556 calculates a typically conical and typically straight envelope 543 connecting the circular ranges 540, 541. The envelope 543 defines a boundary of a taught transfer route in which the transfer path extends.

Likewise, an adequate third point P3 and an associated radius r3 are taught to determine a permissible motion range 542.

To determine the permissible motion range, a pair of brake on/off buttons 551 may be employed. These buttons 551 inherently are for use in the assist mode and for operations of FIG. 39, where a set of a position detector 552 and a brake 553 are interfaced through an I/O board 554 to the controller 556, and on-off controlled by the brake on/off buttons 551.

In determination of the motion range, as a switch setting therefor is completed, the work is actually brought by hands to a marginal point in a vicinity of an obstacle, when the brake on button is pressed to teach the marginal point.

Figure 43A:
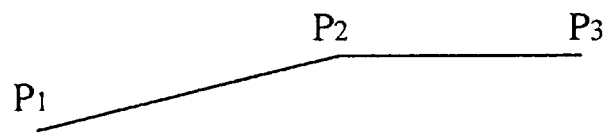
FIGS. 43A, 43B and 43C are illustrations describing basic parameters of the interference region of FIG. 41, respectively.
Figure 43B:
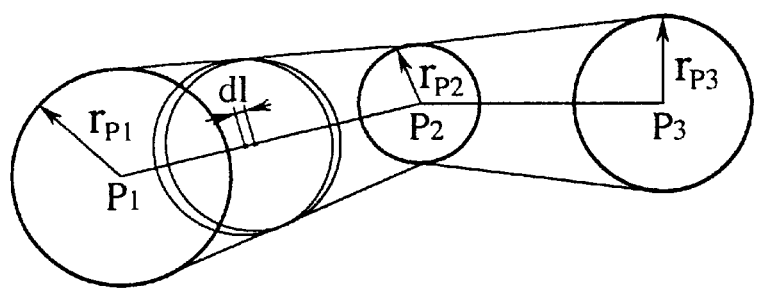
Figure 43C:
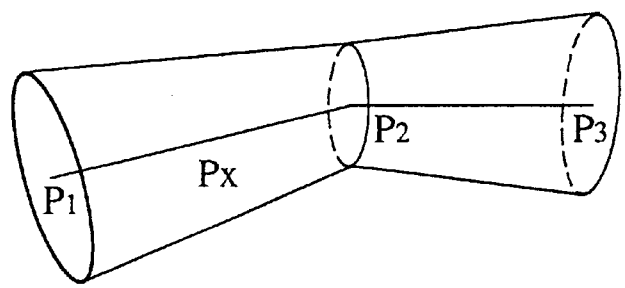

FIGS. 43A, 43B, 43C illustrate a basic concept for the generation of a transfer route.

In the figures, points P1, P2, P3 are taught together with associated radii $r_{p1}$, $r_{p2}$, $r_{p3}$, thereby defining an on which an arbitrary point Px has a combination of defined coordinates, which can be mapped to a multidimensional vector field in which the respective axes are defined, thus permitting an effective regional control.

It will be seen that the smaller the distance dl between neighboring taught points is, the more smooth the envelope is as well as a resultant transfer.

It will also be seen that the foregoing embodiments may have their parts and/or functions combined in a voluntary manner.

While preferred embodiments of the present invention have been described using specific terms, such description is for illustrative purposes, and it is to be understood that changes and variations may be made without departing from the spirit or scope of the following claims.

What is claimed is:

1. A production facility comprising:
a man-machine section requiring one of:
   a movement service,
   a handling service and
   a production service to be provided in one of
      a first manner and
      a second manner more sophisticated than the first manner,
   the man-machine section including:
      a first movable body adaptive for an automatic motion to provide an equivalent service to the required service in the first manner; and
      a second movable body competent to exercise a voluntary motion combinable with the automatic motion to provide an equivalent service to the required service in the second manner;
   first control means operative
      in a first mode thereof for controlling the first moving body to exercise the automatic motion and
      in a second mode thereof for adapting the first movable body to cooperate with the second movable body so that the automatic motion is combined with the voluntary motion; and
   second control means for controlling the first control means to select one of the first and second modes, wherein
   the required service includes handling a work for one of a transfer assistance and a positioning assistance; and
   the first moving body comprises one of
      a first assist arm device adapted for the transfer assistance with a restricted motion range,
      a second assist arm device power-aided for the transfer assistance,
      a third assist arm device adapted for the positioning assistance,
      a fourth assist arm device adapted for the positioning assistance on a follower, and
      a fifth assist arm device adapted for the positioning assistance with a flexible clearance.

2. A production facility comprising:
a man-machine section requiring one of:
   a movement service,
   a handling service and
   a production service to be provided in one of
      a first manner and
      a second manner more sophisticated than the first manner,
   the man-machine section including:
      a first movable body adaptive to exercise an automatic motion; and
      a second movable body competent to exercise a voluntary motion for an equivalent service to the required service in the first manner and
      to cooperate with the first movable body for employing the automatic motion as one of an assistance and a teaching to sophisticate the voluntary motion;
   first control means operative
      in a first mode thereof for controlling the first moving body to exercise the automatic motion and
      in a second mode thereof for adapting the first movable body to cooperate with the second movable body so that the voluntary motion is sophisticated to be capable of achieving an equivalent service to the required service in the second manner; and
   second control means for controlling the first control means to select one of the first and second modes, wherein
   the required service includes handling a work for one of a transfer assistance and a positioning assistance; and
   the first moving body comprises one of
      a first assist arm device adapted for the transfer assistance with a restricted motion range,
      a second assist arm device power-aided for the transfer assistance, a third assist arm device adapted for the positioning assistance, a fourth assist arm device adapted for the positioning assistance on a follower, and a fifth assist arm device adapted for the positioning assistance with a flexible clearance.

3. A production facility comprising:

a man-machine section requiring one of:
  a movement service,
  a handling service and
  a production service to be provided in one of
    a first manner and
    a second manner more sophisticated than the first manner,
the man-machine section including:
  a first movable body adaptive for an automatic motion to provide an equivalent service to the required service in the first manner; and
  a second movable body competent
    to exercise a voluntary motion and
    to cooperate with the first movable body for providing the voluntary motion as one of an assistance and a teaching to the first movable body to sophisticate the automatic motion;
first control means operative
  in a first mode thereof for controlling the first moving body to exercise the automatic motion and
  in a second mode thereof for adapting the first movable body to cooperate with the second movable body so that the automatic motion is sophisticated to be capable of achieving an equivalent service to the required service in the second manner; and
second control means for controlling the first control means to select one of the first and second modes, wherein
the first movable body has:
  a first motion range defined for the automatic motion, including
  a first allowance therefor;
the second movable body has:
  a second motion range defined for the voluntary motion, including
  a second allowance therefor; and
the first control means includes:
  safety control means for
    recognizing an interference region in which the first and second motion ranges interfere with each other,
    detecting an intersection between the interference region and the second motion range, and
    responding to the detected intersection to provide a detection signal.

4. A production facility according to claim 3, wherein the first control means is responsible in the first mode to process the detection signal for stopping the first movable body.

5. A production facility according to claim 3, wherein the interference region is kept constant, as the first movable body has a stationary part fixed in position.

6. A production facility according to claim 3, wherein the interference region is variable, as the first movable body travels.

7. A production facility according to claim 3, wherein the safety control means includes sensor means for sensing a position of the second movable body.

8. A production facility according to claim 7, wherein the sensor means comprises a transmitter and a receiver.

9. A production facility according to claim 8, wherein the transmitter is carried by the second movable body.

10. A production facility according to claim 7, wherein the sensor means comprises a two-dimensional array of sensing elements.

11. A production facility according to claim 10, wherein the two-dimensional array of sensing elements covers the interference region.

12. A production facility according to claim 10, wherein the sensing elements each comprise a sensible matt members.

13. A production facility according to claim 10, wherein the sensing elements each comprise a photo-electric elements.

14. A production facility according to claim 10, wherein the sensor means comprises an array of a plurality of unit sensors each comprised of the two-dimensional array of sensing elements.

15. A production facility according to claim 7, wherein the position of the second movable body is defined in a coordinate system associated with the interference region.

16. A production facility according to claim 3, wherein:
the first movable body comprises
  a first member rotatable about a first center fixed to a representative part of the first movable body, with a far-most end thereof describing a first arc; and
the first motion range comprises
  a first sum of a first inherent range defined by the first arc, a first fraction of clearance and a first fraction of allowance.

17. A production facility according to claim 16, wherein:
the first movable body further comprises
  a second member rotatable about a second center fixed to the first member inside the first arc, with a far-most end thereof describing a second arc; and
the first motion range comprises
  a total of
    the first sum and
    a second sum of a second inherent range defined by the second arc, a second fraction of clearance and a second fraction of allowance.

18. A production facility according to claim 17, wherein the second member comprises:
  a third member rotatable about the second center; and
  a work the third member is handing,
the work having a free end thereof as the far-most end of the second member.

19. A production facility according to claim 17, wherein:
the second movable body comprises
  a flexible body which can fall about a third center as a foot part thereof, with an arm part thereof stretched to have a finger end lying on a first circle; and
the second motion range comprises
  a third sum of a first probable range defined by the first circle and a first probable fraction of allowance.

20. A production facility according to claim 19, wherein:
the second movable body further comprises
  a tool member with a possibility of rotational drop about a fourth center as a hand part of the flexible body within a second circle; and
the second motion range comprises
  a total of
    the third sum and
    a fourth sum of a second probable range defined by the second circle and a second probable fraction of allowance.

21. A production facility according to claim 20, wherein the first control means includes
  memory means for storing
    first data on a radius of curvature of the first arc of the first member,
    second data on a distance between the first center and the second center,
    third data on a radius of curvature of the second arc of a respective kind of the second member,
    fourth data on a radius of the first circle of a respective kind of the flexible body,
    fifth data on a radius of the second circle of a respective kind of the tool member,
    sixth data on the first fraction of clearance of the first member,
    seventh data on the second fraction of clearance of the respective kind of the second member,
    eighth data on the first fraction of allowance of the first member,
    ninth data on the second fraction of allowance of the respective kind of the second member,
    tenth data on the first probable fraction of allowance of the respective kind of the flexible body, and
    eleventh data on the second probable fraction of allowance of the respective kind of the tool member.

22. A production facility according to claim 21, wherein the first control means includes
  processor means responsible to a current position of the first center for processing the first, the sixth and the eighth data to calculate a radius of curvature of a boundary of the first motion range.

23. A production facility according to claim 22, wherein the processor means is responsible to an identified kind of the second member for additionally processing the second, the third, the seventh and the ninth data to calculate a radius of curvature of a boundary (R51a) of the first motion range.

24. A production facility according to claim 23, wherein the processor means is responsible to an identified kind of the flexible body for additionally processing the fourth and the tenth data to calculate a radius of curvature of a boundary of the second motion range, and a radius of curvature of a boundary of the interference region.

25. A production facility according to claim 24, wherein the processor means is responsible to an identified kind of the flexible body for additionally processing the fourth and the tenth data to calculate a radius of curvature of a boundary of the second motion range, and a radius of curvature of a boundary of the interference region.

26. A production facility according to claim 25, wherein the processor means is responsible to an identified kind of the tool member for additionally processing the fifth and the eleventh data to calculate a radius of curvature of a boundary of the second motion range, and a radius of curvature of a boundary of the interference region.

27. A production facility according to claim 1, wherein the first control means is adapted to learn a combination of the automatic motion and the voluntary motion so that the automatic motion provides a sophisticated service.

28. A production facility according to claim 1, wherein the first control means is adapted to learn a difference between the automatic motion and the voluntary motion so that the automatic motion provides a sophisticated service.

29. A production facility comprising:
  a man-machine section requiring one of:
    a movement service,
    a handling service and
    a production service to be provided in one of
      a first manner and
      a second manner more sophisticated than the first manner,
  the man-machine section including:
    a first movable body adaptive for an automatic motion to provide an equivalent service to the required service in the first manner; and
    a second movable body competent
      to exercise a voluntary motion and
      to cooperate with the first movable body for providing the voluntary motion as one of an assistance and a teaching to the first movable body to sophisticate the automatic motion,
  first control means operative:
    in a first mode thereof for controlling the first moving body to exercise the automatic motion and
    in a second mode thereof for adapting the first movable body to cooperate with the second movable body so that the automatic motion is sophisticated to be capable of achieving an equivalent service to the required service in the second manner; and
  second control means for controlling the first control means to select one of the first and second modes, wherein:
  the required service includes handling a work for one of a transfer assistance and a positioning assistance; and
  the first moving body comprises one of
    a first assist arm device adapted for the transfer assistance with a restricted motion range,
    a second assist arm device power-aided for the transfer assistance,
    a third assist arm device adapted for the positioning assistance,
    a fourth assist arm device adapted for the positioning assistance on a follower, and
    a fifth assist arm device adapted for the positioning assistance with a flexible clearance.

30. A production facility according to claim 29, wherein:
  the required service includes transferring the work along a route;
  the transfer assistance includes restricting loci of the work in a range of the route;
  the first assist arm device comprises a plurality of arms having rotation ranges thereof; and
  the first control means is adapted to detect a transfer position of the work and control the rotation ranges depending on the transfer position.

31. A production facility according to claim 30, wherein:
  the required service includes transferring the work along a route;
  the transfer assistance includes restricting loci of the work in a range of the route;
  the first assist arm device comprises
    a plurality of arms,
    first detecting means for detecting rotational positions of the plurality of arms,
    a restriction member for a mechanical restriction of one of the plurality of arms,
    second detection means for detecting a set position of the restriction member, and
    drive means for driving the restriction member;
  the first control means includes
    calculation means for calculating a transfer position of the work based on the rotational positions of the plurality of arms and memory means for storing data on a relationship between the transfer position of the work and the set position of the restriction member; and the first control means is responsible for the transfer position of the work to read the stored data from the memory means and control the drive means for setting the restriction member in a position in accordance with the read data.

32. A production facility according to claim 31, wherein:

the worker is competent to teach an ideal position of the work in the route;

the first control means has a teaching button operative
  for the worker to teach the ideal position to the first control means and
  for the first control means to calculate therefrom a permissible motion range of the work about the ideal position; and the first control means is responsible for an operation of the teaching button to store data on the ideal position and the permissible motion range in the memory means.

33. A production facility according to claim 32, wherein:

the first control means has a mode select switch for selecting one of a teaching mode and a running mode; and the first control means is responsible
  for the teaching mode, as the teaching button is operated, to store the data on the ideal position and the permissible motion range in the memory means, and
  for the running mode to respond to the transfer position to read the stored data from the memory means and control the drive means for setting the restriction member in a position in accordance with the read data.

34. A production facility according to claim 29, wherein:

the second assist arm device comprises
  an arm member for the transfer assistance of the work,
  weight balancing means for balancing a weight of the work with a gravity,
  sensor means for detecting a force exerted on the work by the second movable body, and
  drive means for driving the arm; and the first control means is adapted to be responsible for a magnitude and a direction of the detected force to control the drive means for aiding the exerted force.

35. A production facility according to claim 29, wherein:

the second assist arm device comprises
  a plurality of arm members for the transfer assistance of the work,
  weight balancing means acting on one of the plurality of arm members for balancing a weight of the work with a gravity,
  sensor means for detecting three-dimensional components of a moment exerted on the work by the second movable body, and
  drive means for individually driving the plurality of arms; and the first control means is adapted to be responsible for magnitudes and directions of the detected components of the moment to control the drive means for aiding the exerted moment.

36. A production facility according to claim 29, wherein:

the second assist arm device comprises
  a plurality of arm members for the transfer assistance of the work,
  weight balancing means acting on one of the plurality of arm members for balancing a weight of the work with a gravity,
  sensor means for detecting three-dimensional components of a force and a moment exerted on the work by the second movable body, and
  drive means for individually driving the plurality of arms; and the first control means is adapted to be responsible for magnitudes and directions of the detected components of the force and the moment to control the drive means for aiding the exerted force and moment.

37. A production facility according to claim 34, wherein the sensor means comprise a load cell member attached to the arm member.

38. A production facility according to claim 34, wherein the first control means includes means for regulating a degree of said aiding the exerted force.

39. A production facility according to claim 29, wherein:

the third assist arm device comprises
  an arm member for transferring the work to a position,
  weight balancing means for balancing a weight of the work with a gravity, and
  drive means for driving the arm member; and the firs control means has
  a positioning mode for connecting the arm member with the drive means to transfer the work and
  an assist mode for disconnecting the arm member from the drive means so that a worker can transfer the work.

40. A production facility according to claim 29, wherein:

the third assist arm device comprises
  an arm member for transferring the work to a position,
  weight balancing means for balancing a weight of the work with a gravity,
  drive means for driving the arm member, and
  clutch means for interconnecting the arm member and the drive means;

the first control means includes
  memory means for storing a transfer path, as it is taught, and
  switch means for selecting a positioning mode; and the first control means is adaptive to be set,
  as the switch means is turned on, to the positioning mode
    for letting the clutch means in and
    for controlling the drive means to transfer the work along the transfer path stored in the memory means and,
  as the work has arrived the position, to an assist mode for letting the clutch means off.

41. A production facility according to claim 29, wherein:

the third assist arm device comprises
  an arm member for transferring the work to a position,
  weight balancing means for balancing a weight of the work with a gravity,
  drive means including a servo motor for driving the arm member, and
  clutch means for interconnecting the arm member and the drive means;

the first control means includes
  memory means for storing a transfer path, as it is taught, and
  switch means for selecting a positioning mode; and the first control means is adaptive to be set,
  as the switch means is turned on, to the positioning mode for letting the clutch means in and
for controlling the servo motor to transfer the work along the transfer path stored in the memory means and,
as the work has arrived the position, to an assist mode for letting the clutch means off and releasing the servo motor from a servo control.

42. A production facility according to claim 29, wherein:
the third assist arm device comprises
an arm member for transferring the work to a position,
weight balancing means for balancing a weight of the work with a gravity,
drive means for driving the arm member, and
clutch means for interconnecting the arm member and the drive means;
the first control means includes
memory means for storing a transfer path, as it is taught, and
switch means for selecting a positioning mode; and
the first control means is
adaptive to be set,
as the switch means is turned on, to the positioning mode
for letting the clutch means in and
for controlling the drive means to transfer the work along the transfer path stored in the memory means and,
as the work has arrived the position, to an assist mode for letting the clutch means off, and
further adaptive,
as the switch means is turned on after the work has arrived the position,
for letting the clutch means in and
for pushing the work against an opponent member in a fixing thereof with a force in accordance with a current data stored in the memory means and,
as the fixing is over, for letting the clutch means off.

43. A production facility according to claim 29, wherein:
the third assist arm device comprises
an arm member for transferring the work to a position,
weight balancing means for balancing a weight of the work with a gravity,
drive means including a servo motor for driving the arm member,
auxiliary power means for generating a force to pushing the work against an opponent member in a fixing thereof, and
clutch means for interconnecting the arm member and the drive means;
the first control means includes
memory means for storing a transfer path, as it is taught, and
switch means for selecting a positioning mode; and
the first control means is
adaptive to be set,
as the switch means is turned on, to the positioning mode
for letting the clutch means in and
for controlling the servo motor to transfer the work along the transfer path stored in the memory means and,
as the work has arrived the position, to an assist mode for letting the clutch means off and releasing the servo motor from a servo control, and
further adaptive,
as the switch means is turned on after the work has arrived the position, for operating the auxiliary power means to push the work against the opponent member with a force and, as the fixing is over, for stopping the auxiliary power means.

44. A production facility according to claim 43, wherein the auxiliary power means comprises one a servo motor and an air motor.

45. A production facility according to claim 43, wherein:
the first control means is adaptive,
as the switch means is turned on after the work has arrived the position,
for letting the clutch means in,
pushing the work against the opponent member with a force in accordance with a current data stored in the memory means, and
operating the auxiliary power means to push the work against the opponent member and,
as the fixing is over, for letting the clutch means off and stopping the auxiliary power means.

46. A production facility according to claim 39, wherein the first control means has a teaching mode for storing loci of the arm member as a transfer path.

47. A production facility according to claim 42, wherein the first control means is adapted, as the arm member is manually operated, to store in the memory means loci of the arm member as the transfer path.

48. A production facility according to claim 29, wherein:
the fourth assist arm device is mounted on the follower;
the fourth assist arm device comprises
an arm member for transferring the work to a position,
weight balancing means for balancing a weight of the work with a gravity, and
drive means for driving the arm member;
the first control means has
a positioning mode for connecting the arm member with the drive means to transfer the work and
an assist mode for disconnecting the arm member from the drive means so that a worker can transfer the work; and
the first control means is connected to the drive means.

49. A production facility according to claim 29, wherein:
the fourth assist arm device is mounted on the follower;
the fourth assist arm device comprises
an arm member for transferring the work to a position,
weight balancing means for balancing a weight of the work with a gravity,
drive means for driving the arm member, and
clutch means for interconnecting the arm member and the drive means;
the first control means includes
memory means for storing a transfer path, as it is taught, and
switch means for selecting a positioning mode; and
the first control means is adaptive to be set,
as the switch means is turned on, to the positioning mode
for letting the clutch means in and
for controlling the drive means to transfer the work along the transfer path stored in the memory means and,
as the work has arrived the position, to an assist mode for letting the clutch means off.

50. A production facility according to claim 30, wherein:
the fourth assist arm device is mounted on the follower;
the fourth assist arm device comprises
an arm member for transferring the work to a position, weight balancing means for balancing a weight of the work with a gravity, drive means for driving the arm member, and clutch means for interconnecting the arm member and the drive means;

the first control means includes memory means for storing a transfer path, as it is taught, switch means for selecting a positioning mode, and sensor means for detecting a proximity of an obstacle; and the first control means is adaptive to be set, as the switch means is turned on, to the positioning mode for letting the clutch means in and for controlling the servo motor to transfer the work along the transfer path stored in the memory means and, as the work has arrived the position or the proximity of the obstacle is detected by the sensor means, to an assist mode for letting the clutch means off.

51. A production facility according to claim 48, wherein the switch means is provided on an operation panel disposed at a hand and on a control panel connected to the first control means.

52. A production facility according to claim 50, wherein:

the fourth assist arm device has an emergency switch; and the first control means is adapted to enter the assist mode when the emergency switch is operated.

53. A production facility according to claim 29, wherein:

the required service is for fitting the work to an installation place having a first clearance to the work;

the fifth assist arm device has an arm member for positioning the work to the installation place, the arm member being movable with a second clearance larger than the first clearance; and the first control means enters the second mode when the arm member carrying the work has reached a vicinity of the installation place.

54. A production facility according to claim 53, wherein the vicinity comprises the interference region.

55. A production facility comprising:

a man-machine section requiring one of:

a movement service, a handling service and a production service to be provided in one of a first manner and a second manner more sophisticated than the first manner, the man-machine section including:

a first movable body adaptive for an automatic motion to provide an equivalent service to the required service in the first manner; and a second movable body competent to exercise a voluntary motion combinable with the automatic motion to provide an equivalent service to the required service in the second manner;

first control means operative in a first mode thereof for controlling the first moving body to exercise the automatic motion and in a second mode thereof for adapting the first movable body to cooperate with the second movable body so that the automatic motion is combined with the voluntary motion; and second control means for controlling the first control means to select one of the first and second modes, wherein the first movable body has:

a first motion range defined for the automatic motion, including a first allowance therefor;

the second movable body has:

a second motion range defined for the voluntary motion, including a second allowance therefor; and the first control means includes:

safety control means for recognizing an interference region in which the first and second motion ranges interfere with each other, detecting an intersection between the interference region and the second motion range, and responding to the detected intersection to provide a detection signal.

56. A production facility comprising:

a man-machine section requiring one of:

a movement service, a handling service and a production service to be provided in one of a first manner and a second manner more sophisticated than the first manner, the man-machine section including:

a first movable body adaptive to exercise an automatic motion; and a second movable body competent to exercise a voluntary motion for an equivalent service to the required service in the first manner and to cooperate with the first movable body for employing the automatic motion as one of an assistance and a teaching to sophisticate the voluntary motion;

first control means operative in a first mode thereof for controlling the first moving body to exercise the automatic motion and in a second mode thereof for adapting the first movable body to cooperate with the second movable body so that the voluntary motion is sophisticated to be capable of achieving an equivalent service to the required service in the second manner; and second control means for controlling the first control means to select one of the first and second modes, wherein the first movable body has:

a first motion range defined for the automatic motion, including a first allowance therefor;

the second movable body has:

a second motion range defined for the voluntary motion, including a second allowance therefor; and the first control means includes:

safety control means for recognizing an interference region in which the first and second motion ranges interfere with each other, detecting an intersection between the interference region and the second motion range, and responding to the detected intersection to provide a detection signal.

57. A production facility comprising:

a man-machine section requiring one of:

a movement service, a handling service and
a production service to be provided in one of
a first manner and
a second manner more sophisticated than the first manner, the man-machine section including:
a first movable body adaptive for an automatic motion to provide an equivalent service to the required service in the first manner; and
a second movable body competent to exercise a voluntary motion combinable with the automatic motion to provide an equivalent service to the required service in the second manner;

first control means operative:
in a first mode thereof for controlling the first moving body to exercise the automatic motion and
in a second mode thereof for adapting the first movable body to cooperate with the second movable body so that the automatic motion is combined with the voluntary motion; and second control means for controlling the first control means to select one of the first and second modes, wherein the first control means is adapted to learn a combination of the automatic motion and the voluntary motion so that the automatic motion provides a sophisticated service;

the first movable body has
a first motion range defined for the automatic motion, including
a first allowance therefor;

the second movable body has
a second motion range defined for the voluntary motion, including:
a second allowance therefor; and the first control means includes:
safety control means for
recognizing an interference region in which the first and second motion ranges interfere with each other,
detecting an intersection between the interference region and the second motion range, and
responding to the detected intersection to provide a detection signal.

58. A production facility comprising:
a man-machine section requiring one of:
a movement service,
a handling service and
a production service to be provided in one of
a first manner and
a second manner more sophisticated than the first manner, the man-machine section including:
a first movable body adaptive for an automatic motion to provide an equivalent service to the required service in the first manner; and
a second movable body competent to exercise a voluntary motion combinable with the automatic motion to provide an equivalent service to the required service in the second manner;

first control means operative
in a first mode thereof for controlling the first moving body to exercise the automatic motion and
in a second mode thereof for adapting the first movable body to cooperate with the second movable body so that the automatic motion is combined with the voluntary motion; and second control means for controlling the first control means to select one of the first and second modes, wherein the first control means is adapted to learn a combination of the automatic motion and the voluntary motion so that the automatic motion provides a sophisticated service;

the required service includes handling a work for one of a transfer assistance and a positioning assistance; and the first moving body comprises one of
a first assist arm device adapted for the transfer assistance with a restricted motion range,
a second assist arm device power-aided for the transfer assistance,
a third assist arm device adapted for the positioning assistance,
a fourth assist arm device adapted for the positioning assistance on a follower, and
a fifth assist arm device adapted for the positioning assistance with a flexible clearance.

59. A production facility comprising:
a man-machine section requiring one of:
a movement service,
a handling service and
a production service to be provided in one of
a first manner and
a second manner more sophisticated than the first manner, the man-machine section including:
a first movable body adaptive for an automatic motion to provide an equivalent service to the required service in the first manner; and
a second movable body competent to exercise a voluntary motion combinable with the automatic motion to provide an equivalent service to the required service in the second manner;

first control means operative:
in a first mode thereof for controlling the first moving body to exercise the automatic motion and
in a second mode thereof for adapting the first movable body to cooperate with the second movable body so that the automatic motion is combined with the voluntary motion; and second control means for controlling the first control means to select one of the first and second modes, wherein the first control means is adapted to learn a difference between the automatic motion and the voluntary motion so that the automatic motion provides a sophisticated service;

the first movable body has:
a first motion range defined for the automatic motion, including
a first allowance therefor;

the second movable body has:
a second motion range defined for the voluntary motion, including
a second allowance therefor; and the first control means includes:
safety control means for
recognizing an interference region in which the first and second motion ranges interfere with each other,
detecting an intersection between the interference region and the second motion range, and responding to the detected intersection to provide a detection signal.

60. A production facility comprising:

a man-machine section requiring one of:
  a movement service,
  a handling service and
  a production service to be provided in one of
    a first manner and
    a second manner more sophisticated than the first manner,
the man-machine section including:
  a first movable body adaptive for an automatic motion to provide an equivalent service to the required service in the first manner; and
  a second movable body competent to exercise a voluntary motion combinable with the automatic motion to provide an equivalent service to the required service in the second manner;
first control means operative:
  in a first mode thereof for controlling the first moving body to exercise the automatic motion and
  in a second mode thereof for adapting the first movable body to cooperate with the second movable body so that the automatic motion is combined with the voluntary motion; and
second control means for controlling the first control means to select one of the first and second modes, wherein
the first control means is adapted to learn a difference between the automatic motion and the voluntary motion so that the automatic motion provides a sophisticated service;
the required service includes handling a work for one of a transfer assistance and a positioning assistance; and
the first moving body comprises one of:
  a first assist arm device adapted for the transfer assistance with a restricted motion range,
  a second assist arm device power-aided for the transfer assistance,
  a third assist arm device adapted for the positioning assistance,
  a fourth assist arm device adapted for the positioning assistance on a follower, and
  a fifth assist arm device adapted for the positioning assistance with a flexible clearance.

61. A production facility comprising:

a man-machine section requiring one of:
  a movement service,
  a handling service and
  a production service to be provided in one of
    a first manner and
    a second manner more sophisticated than the first manner,
the man-machine section including:
  a first movable body adaptive for an automatic motion; and
a second movable body competent to exercise a voluntary motion for an equivalent service to the required service in the first manner and to cooperate with the first movable body for employing the automatic motion as one of an assistance and a teaching to sophisticate the voluntary motion;
first control means operative:
  in a first mode thereof for controlling the first moving body to exercise the automatic motion and
  in a second mode thereof for adapting the first movable body to cooperate with the second movable body so that the voluntary motion is sophisticated to be capable of achieving an equivalent service to the required service in the second manner; and
second control means for controlling the first control means to select one of the first and second modes, wherein
the first control means is adapted to learn a combination of the automatic motion and the voluntary motion so that the automatic motion provides a sophisticated service;
the first movable body has a first motion range defined for the automatic motion, including a first allowance therefor;
the second movable body has:
  a second motion range defined for the voluntary motion, including
  a second allowance therefor; and
the first control means includes:
  safety control means for
    recognizing an interference region in which the first and second motion ranges interfere with each other,
    detecting an intersection between the interference region and the second motion range, and
    responding to the detected intersection to provide a detection signal.

62. A production facility comprising:

a man-machine section requiring one of:
  a movement service,
  a handling service and
  a production service to be provided in one of
    a first manner and
    a second manner more sophisticated than the first manner,
the man-machine section including:
  a first movable body adaptive to exercise an automatic motion; and
  a second movable body competent to exercise a voluntary motion for an equivalent service to the required service in the first manner and
  to cooperate with the first movable body for employing the automatic motion as one of an assistance and a teaching to sophisticate the voluntary motion;
first control means operative:
  in a first mode thereof for controlling the first moving body to exercise the automatic motion and
  in a second mode thereof for adapting the first movable body to cooperate with the second movable body so that the voluntary motion is sophisticated to be capable of achieving an equivalent service to the required service in the second manner; and
second control means for controlling the first control means to select one of the first and second modes, wherein
the first control means is adapted to learn a combination of the automatic motion and the voluntary motion so that the automatic motion provides a sophisticated service;
the required service includes handling a work for one of a transfer assistance and a positioning assistance; and
the first moving body comprises one of:
  a first assist arm device adapted for the transfer assistance with a restricted motion range, a second assist arm device power-aided for the transfer assistance,
a third assist arm device adapted for the positioning assistance,
a fourth assist arm device adapted for the positioning assistance on a follower, and
a fifth assist arm device adapted for the positioning assistance with a flexible clearance.

63. A production facility comprising:
a man-machine section requiring one of:
   a movement service,
   a handling service and
   a production service to be provided in one of
      a first manner and
      a second manner more sophisticated than the first manner,
the man-machine section including:
   a first movable body adaptive for an automatic motion; and
   a second movable body competent to exercise a voluntary motion for an equivalent service to the required service in the first manner and to cooperate with the first movable body for employing the automatic motion as one of an assistance and a teaching to sophisticate the voluntary motion;
first control means operative:
   in a first mode thereof for controlling the first moving body to exercise the automatic motion and
   in a second mode thereof for adapting the first movable body to cooperate with the second movable body so that the voluntary motion is sophisticated to be capable of achieving an equivalent service to the required service in the second manner; and
   second control means for controlling the first control means to select one of the first and second modes, wherein
the first control means is adapted to learn a difference between the automatic motion and the voluntary motion so that the automatic motion provides a sophisticated service;
the first movable body has:
   a first motion range defined for the automatic motion, including
      a first allowance therefor;
the second movable body has a second motion range defined for the voluntary motion, including:
   a second allowance therefor; and
the first control means includes:
   safety control means for
      recognizing an interference region in which the first and second motion ranges interfere with each other,
      detecting an intersection between the interference region and the second motion range, and
      responding to the detected intersection to provide a detection signal.

64. A production facility comprising:
a man-machine section requiring one of:
   a movement service,
   a handling service and
   a production service to be provided in one of
      a first manner and
      a second manner more sophisticated than the first manner,
the man-machine section including:
   a first movable body adaptive for an automatic motion; and
   a second movable body competent to exercise a voluntary motion for an equivalent service to the required service in the first manner and
      to cooperate with the first movable body for employing the automatic motion as one of an assistance and a teaching to sophisticate the voluntary motion;
first control means operative:
   in a first mode thereof for controlling the first moving body to exercise the automatic motion and
   in a second mode thereof for adapting the first movable body to cooperate with the second movable body so that the voluntary motion is sophisticated to be capable of achieving an equivalent service to the required service in the second manner; and
   second control means for controlling the first control means to select one of the first and second modes, wherein
the first control means is adapted to learn a difference between the automatic motion and the voluntary motion so that the automatic motion provides a sophisticated service;
the required service includes handling a work for one of a transfer assistance and a positioning assistance; and
the first moving body comprises one of:
   a first assist arm device adapted for the transfer assistance with a restricted motion range,
   a second assist arm device power-aided for the transfer assistance,
   a third assist arm device adapted for the positioning assistance,
   a fourth assist arm device adapted for the positioning assistance on a follower, and
   a fifth assist arm device adapted for the positioning assistance with a flexible clearance.

* * * * *